United States Patent
Zavattieri et al.

(10) Patent No.: US 12,415,475 B2
(45) Date of Patent: Sep. 16, 2025

(54) PHASE TRANSFORMING CELLULAR MATERIALS

(71) Applicants: Purdue Research Foundation, West Lafayette, IN (US); GM Global Technology Operations LLC, Detroit, MI (US)

(72) Inventors: Pablo Zavattieri, West Lafayette, IN (US); Yunlan Zhang, Foothill Ranch, CA (US); Nilesh Mankame, Ann Arbor, MI (US); David Restrepo, San Antonio, TX (US); Gordon Jarrold, Chicago, IL (US); Maria Milian Velay-Lizancos, West Lafayette, IN (US)

(73) Assignees: Purdue Research Foundation, West Lafayette, IN (US); GM Global Technology Operations LLC, Detroit, MI (US)

( * ) Notice: Subject to any disclaimer, the term of this patent is extended or adjusted under 35 U.S.C. 154(b) by 678 days.

(21) Appl. No.: 17/599,154

(22) PCT Filed: Mar. 27, 2020

(86) PCT No.: PCT/US2020/025197
§ 371 (c)(1),
(2) Date: Sep. 28, 2021

(87) PCT Pub. No.: WO2020/205508
PCT Pub. Date: Oct. 8, 2020

(65) Prior Publication Data
US 2022/0154702 A1 May 19, 2022

Related U.S. Application Data

(60) Provisional application No. 62/826,376, filed on Mar. 29, 2019.

(51) Int. Cl.
*F03G 7/06* (2006.01)
*B60C 7/14* (2006.01)
(Continued)

(52) U.S. Cl.
CPC ............... *B60R 21/34* (2013.01); *B60C 7/14* (2013.01); *B62D 25/105* (2013.01); *B62D 25/12* (2013.01);
(Continued)

(58) Field of Classification Search
None
See application file for complete search history.

(56) References Cited

U.S. PATENT DOCUMENTS

| | | | |
|---|---|---|---|
| 6,170,202 B1 | 1/2001 | Davoodi et al. | |
| 6,515,382 B1 * | 2/2003 | Ullakko | H02N 2/023 310/26 |

(Continued)

FOREIGN PATENT DOCUMENTS

WO 2018130410 7/2018

OTHER PUBLICATIONS

Restrepo et al. Phase transforming cellular materials. Extreme Mechanics Letters. Aug. 13, 2015 (Aug. 8, 2015). [retrieved on May 19, 2020] Retrieved from the Internet: <https://nanohub.org/resources/28890/download/Phase_transforming_celluler_materials_article_1.pdf>. pp. 52-60.

*Primary Examiner* — George Wyszomierski
(74) *Attorney, Agent, or Firm* — David E. Novak; Brannon Sowers & Cracraft PC

(57) ABSTRACT

A phase transformational cellular material, including a plurality of bistable cells, each respective bistable cell operationally connected to at least one other respective bistable cell. Each bistable cell enjoys a first stable phase and a second stable phase. The first stable phase is a first geometric (Continued)

configuration and the second stable phase is a second geometric configuration different from the first geometric configuration. An energy transaction is required to shift each respective cell between stable phases. A mechanical energy transaction is required to shift from the first to the second phase, while a thermal energy transaction is required to shift from the second to the first phase.

21 Claims, 51 Drawing Sheets

(51) Int. Cl.
*B60R 21/34* (2011.01)
*B62D 25/10* (2006.01)
*B62D 25/12* (2006.01)
*C22F 1/00* (2006.01)
*E04H 9/02* (2006.01)
*F16F 3/02* (2006.01)

(52) U.S. Cl.
CPC ........... *C22F 1/006* (2013.01); *E04H 9/0237* (2020.05); *F03G 7/06115* (2021.08); *F16F 3/023* (2013.01); *F16F 2224/02* (2013.01); *F16F 2224/0208* (2013.01)

(56) References Cited

U.S. PATENT DOCUMENTS

| | | |
|---|---|---|
| 2006/0192465 A1 | 8/2006 | Kornbluh et al. |
| 2008/0217485 A1* | 9/2008 | Ikeda ........................ F15D 1/12 244/204.1 |
| 2011/0168313 A1 | 7/2011 | Ma et al. |
| 2011/0240194 A1 | 10/2011 | Summers et al. |
| 2020/0035390 A1* | 1/2020 | Hu ........................ B81B 3/0032 |

* cited by examiner

Triangular 2D PXCM   Square 2D PXCM

*Zhang et al., submitted, 2019*

*Level 1
Unit Cell*

*Level 2
PXCMs*

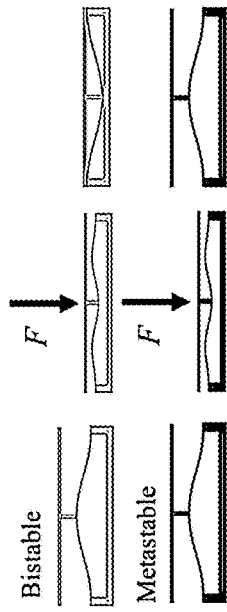
FIG. 17G
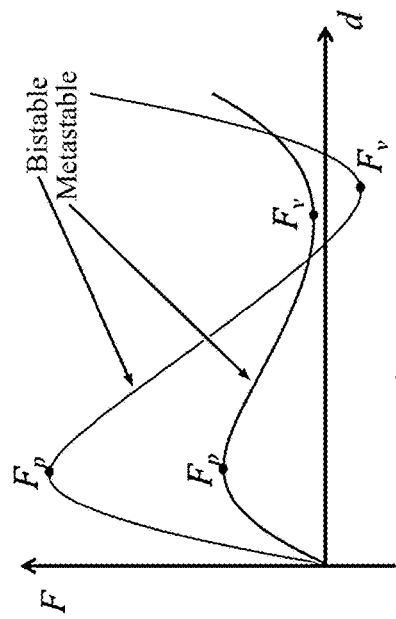
FIG. 17H
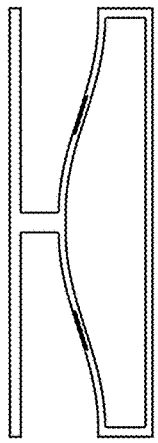
FIG. 17K
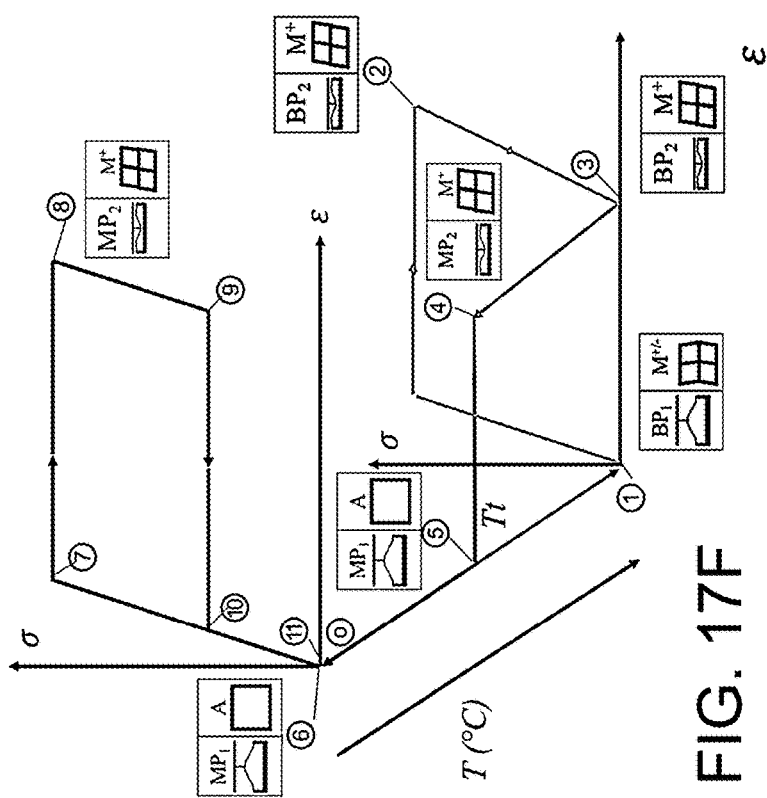
FIG. 17F
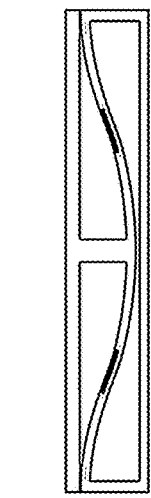
FIG. 17J
FIG. 17I

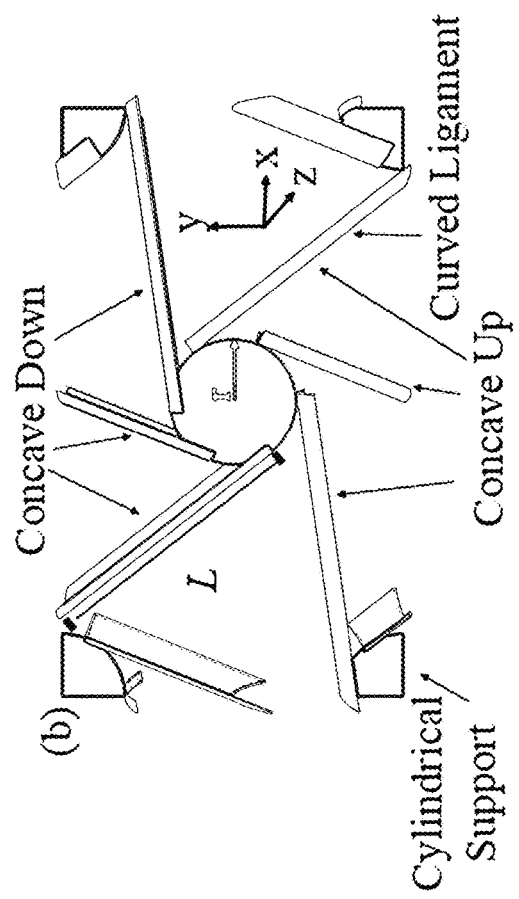
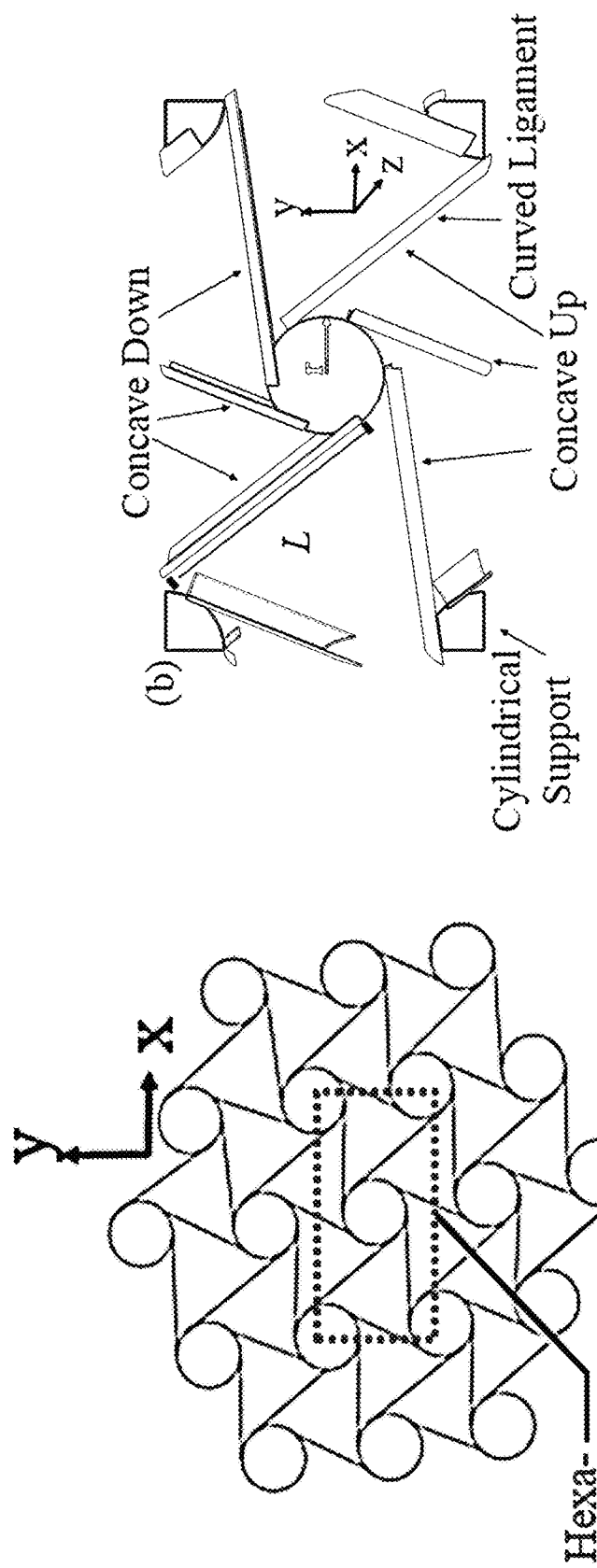
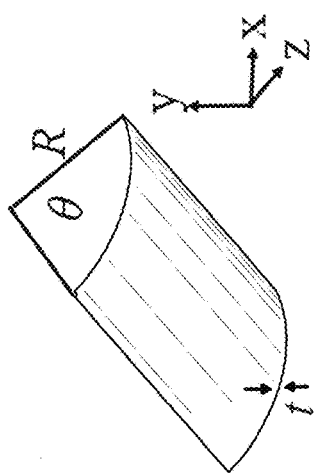
FIG. 21B
FIG. 21C
FIG. 21A

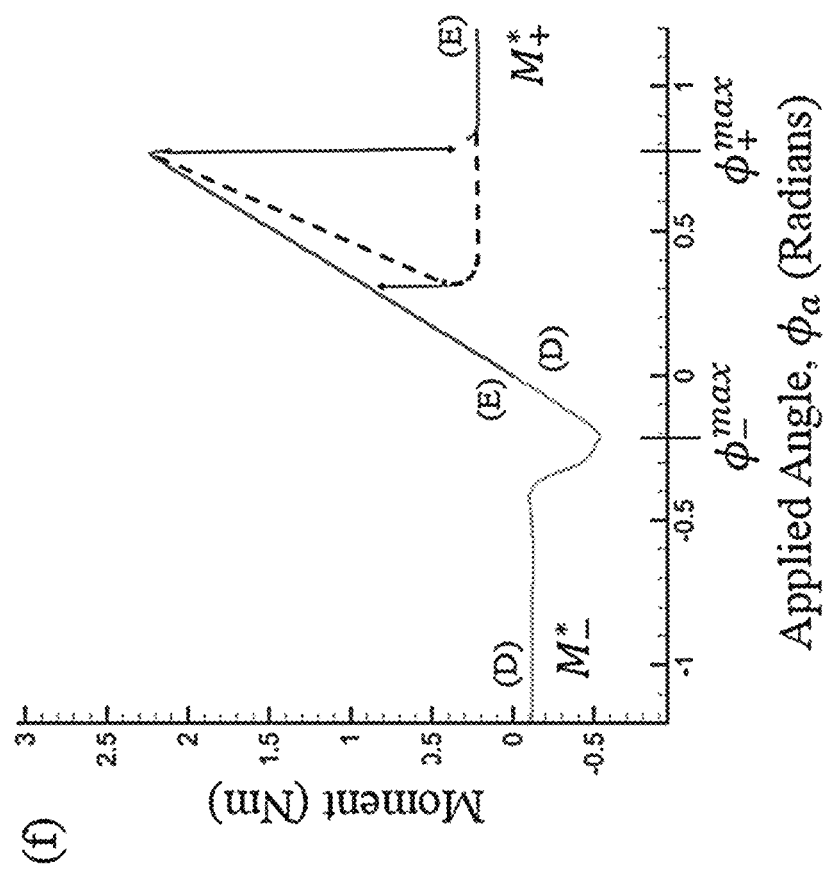
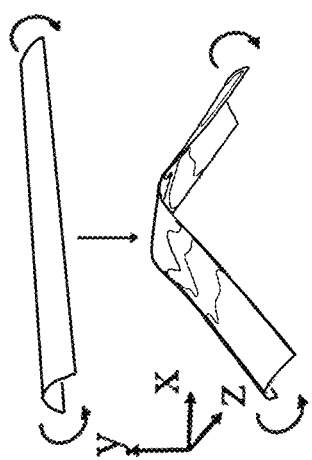
FIG. 21D
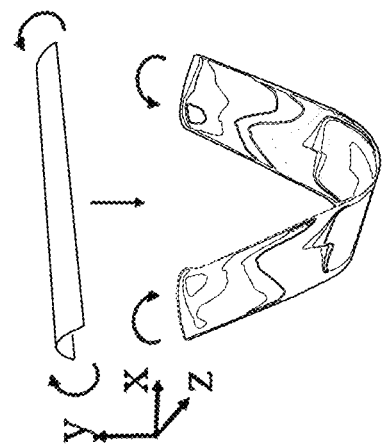
FIG. 21E
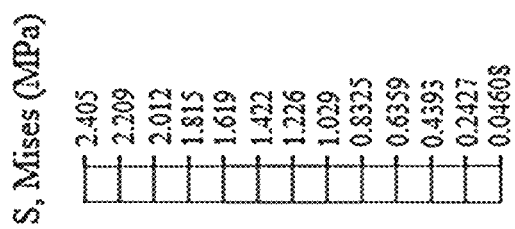

(a)

PHASE TRANSFORMING CELLULAR MATERIALS

CROSS-REFERENCE TO RELATED APPLICATIONS

This patent application claims priority to U.S. provisional patent application Ser. No. 62/826,376, filed on Mar. 29, 2019.

FUNDING STATEMENT

This invention was made with government support under CMMI1538898 awarded by the National Science Foundation. The government has certain rights in the invention.

TECHNICAL FIELD

The present novel technology relates generally to structural or building materials, and, more specifically, to phase-transformable cellular materials.

BACKGROUND

A phase transformation is the change of a thermodynamic system from one phase to another. Martensitic phase transformations play a fundamental role in the behavior of a large class of active materials which include shape memory, ferroelectric and some magnetostrictive alloys. Typical solid-state phase transformations in materials result from a change in the packing arrangement of the atoms in the unit cell. At the micro level, these changes can be viewed as multi-stable devices that deform switching between locally stable configurations, and macroscopically the switching phenomena manifest through the evolution of the domain microstructures in which the associated energy landscapes are usually extremely wiggly. However, there remains a need to extend this notion of solid-state phase transformations to cellular materials, where phase transformations are represented by changes in the geometry of its microstructure. The present novel technology addresses this need.

BRIEF DESCRIPTION OF DRAWINGS

FIGS. 17F-17K schematically illustrate the effects of increasing temperature on thermally actuated bistable and metastable phase transforming cells.

FIG. 21A schematically illustrates the auxetic hexachiral structure.

FIG. 21B schematically illustrates a unit cell of a hexachiral phase transforming cellular material (h-PXCM).

FIG. 21C is a perspective view of a curved ligament of FIG. 21B.

FIG. 21D is a perspective view of the ligament of FIG. 21C under bending.

FIG. 21E is a perspective view of the ligament of FIG. 21D under reverse bending.

FIG. 21F graphically illustrates the relationship between moment and applied angle for the ligaments of FIGS. 21D-E.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

Overview

The present novel technology relates to a novel cellular material exhibiting discrete phase transformations. Phase transformations are iniated by introducing changes to the geometry of the unit cells that define these materials while keeping topology constant. Phase transformations may be introduced into the novel cellular materials via bistable/metastable compliant mechanisms to form the microstructure of cellular materials.

Figure 1A:
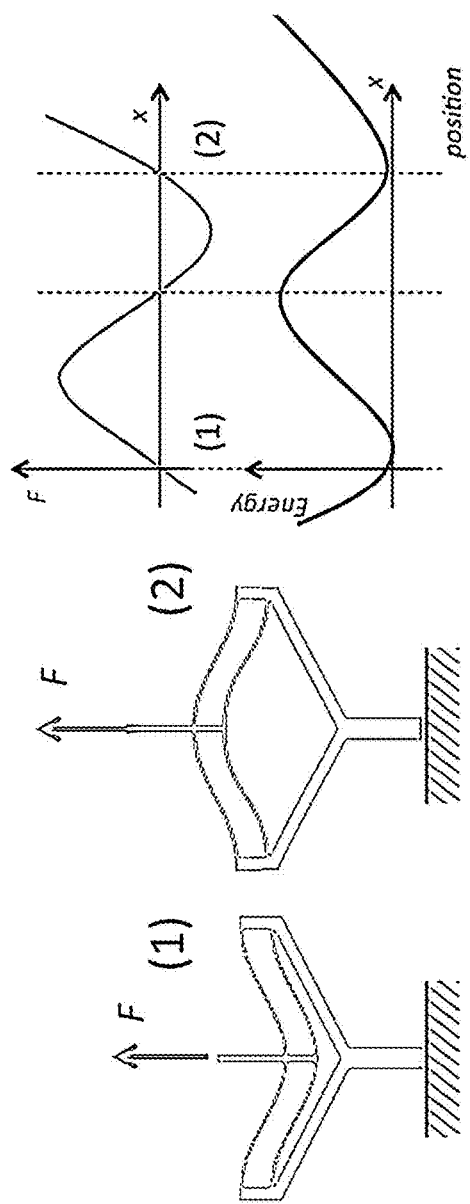
FIG. 1A is a schematic illustration of a phase transforming unit cell of a first embodiment of the present novel technology.
Figure 1B:
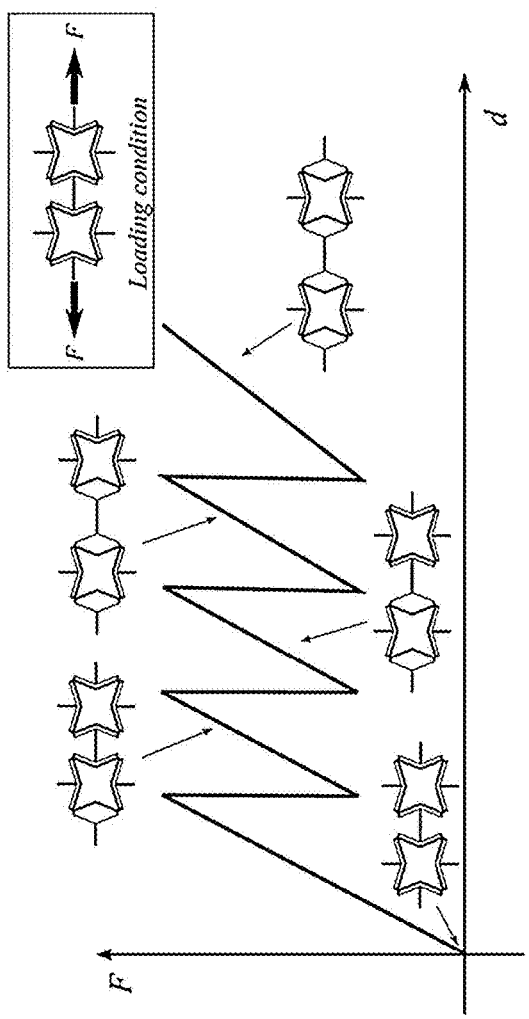
FIG. 1B schematically illustrates the force/displacement relationship of a plurality of operationally connected phase transforming cells of FIG. 1A.
Figure 2:
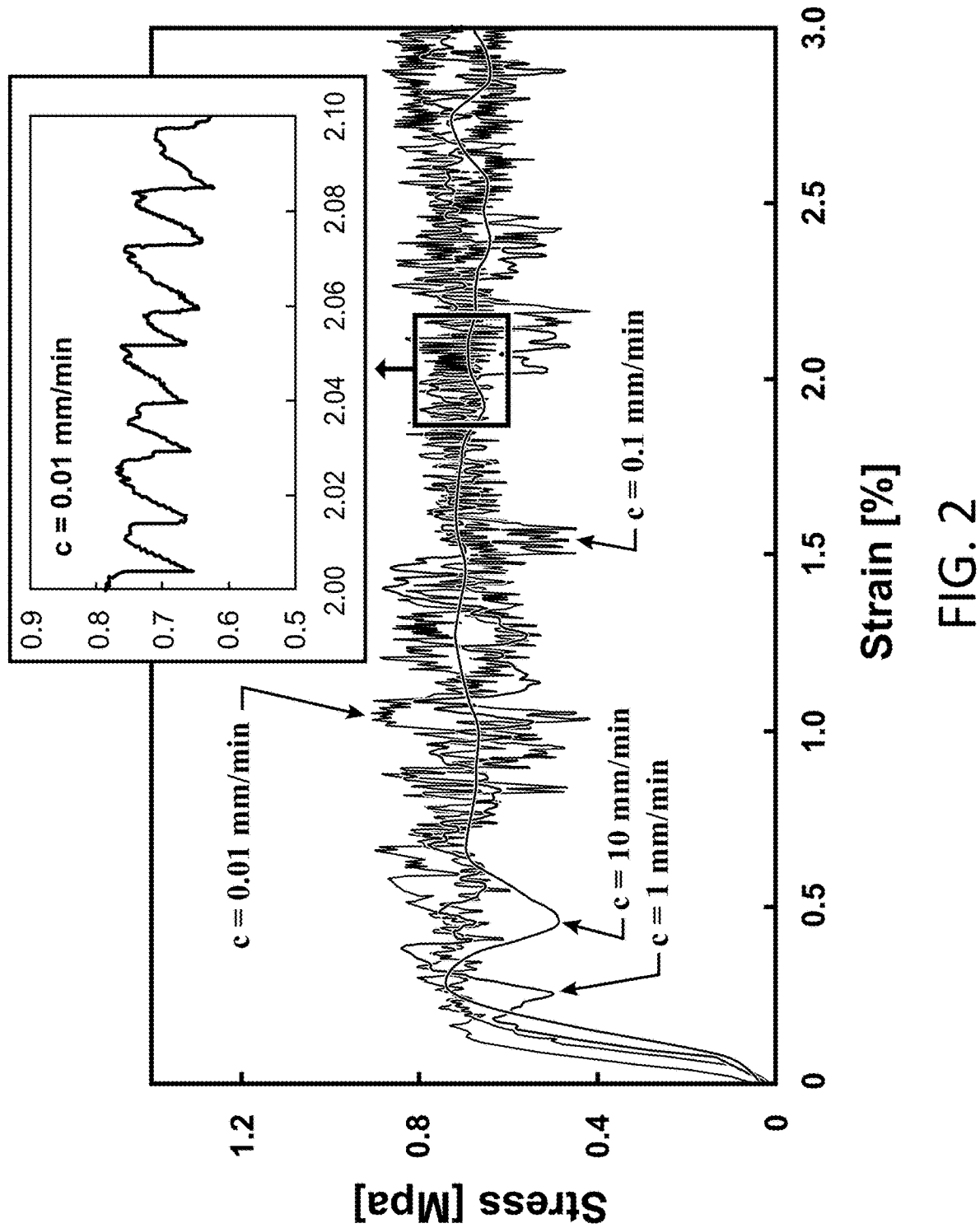
FIG. 2 graphically illustrates the stress-strain relationship of phase transforming cells.

The novel cellular material includes bistable or metastable mechanisms as a unit cell for its microstructure. A bistable mechanism has two stable configurations when unloaded. Once this mechanism is in one stable configuration, it remains there unless it is provided with enough energy to move to the other stable configuration. A metastable mechanism corresponds to a special case of stability in which a small disturbance can lead to another stable state that has a lower potential energy. The phase transformation capability of this new type of cellular material will be attained mainly by proper choice of base material, cell topology and geometrical design of the unit cell (see FIG. 1A). The unit cell of the microstructure comprises a bistable mechanism in which the two stable configurations correspond to stable configurations of the phase transforming material. FIG. 1B illustrates a combination of these unit cells to form a 1D periodic cellular structure. Phase transformation occurs when there is a progressive change of configurations from cell to cell leading to a saw-tooth like force-displacement behavior. The same saw-tooth pattern has been observed experimentally in the stress induced phase transformation of a NiMnGa (see FIG. 2). Phase transforming materials based in cellular solids allow for an increased application of cellular materials in areas like wave guiding, energy harvesting, energy dissipation and material actuation, enabling new applications that were not possible before.

Wave Guiding Metamaterials

Figure 3A:
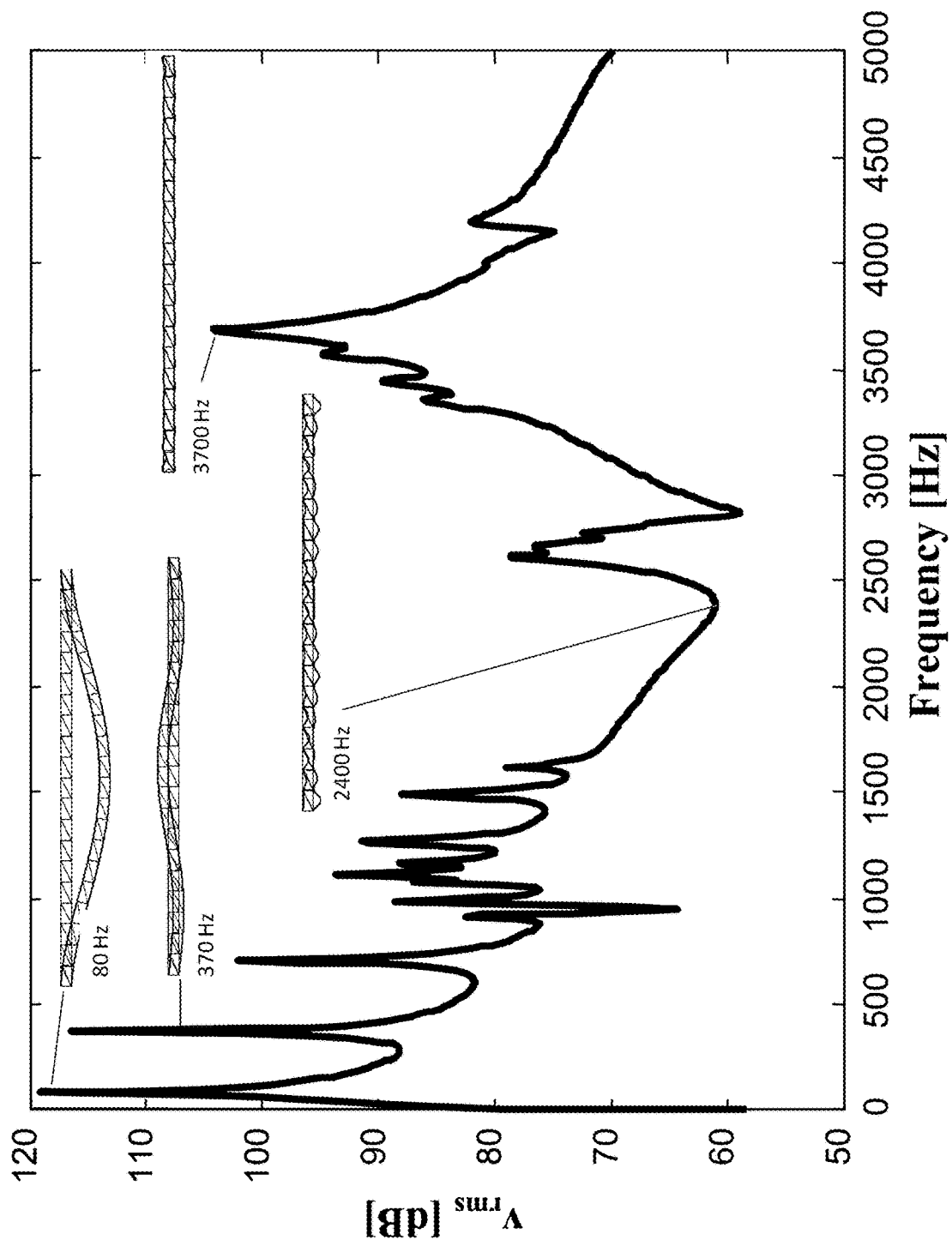
FIG. 3A graphically illustrates the RMS velocity-frequency relationship for a phase transforming metamaterial.
Figure 3B:
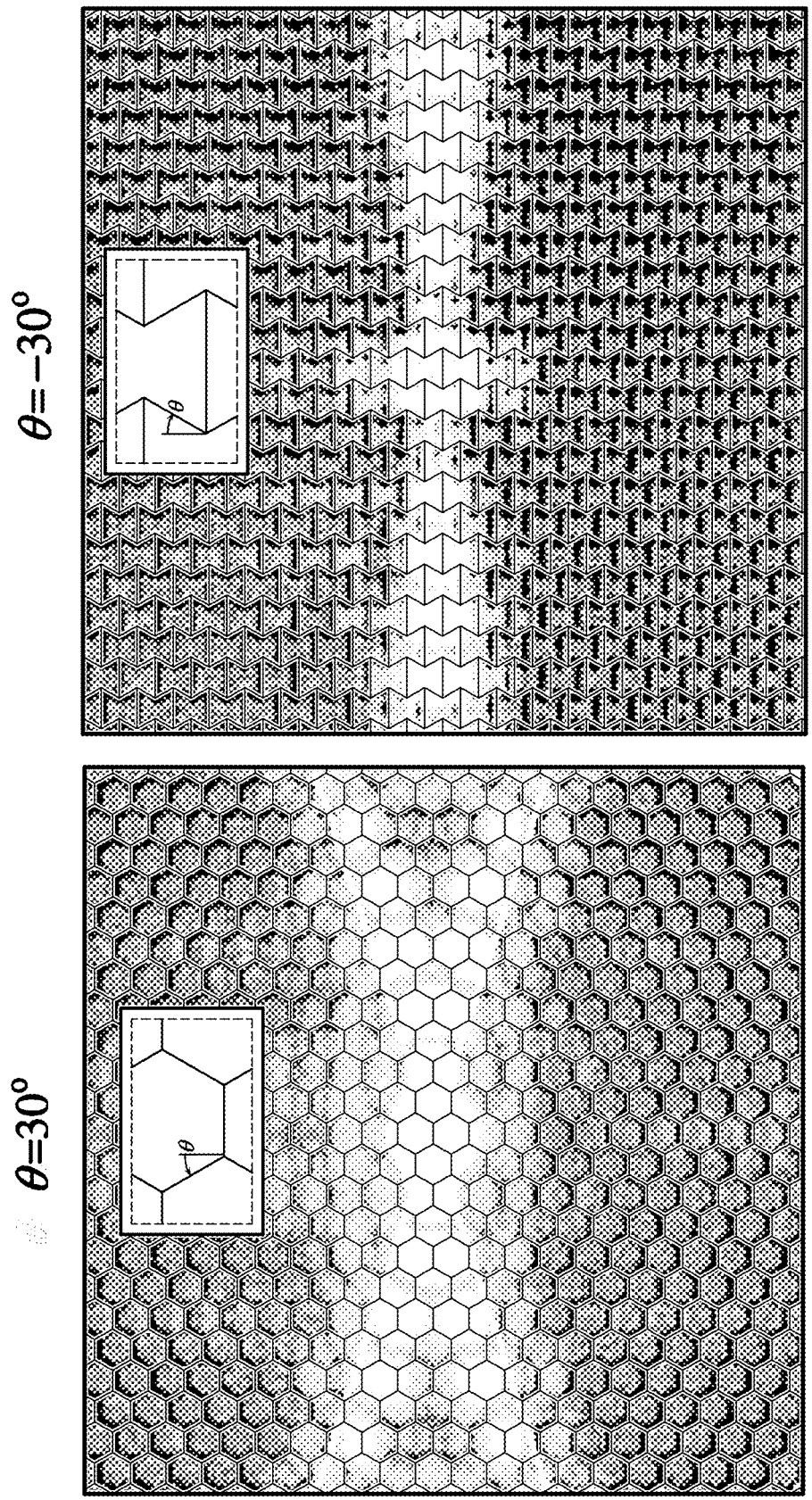
FIG. 3B illustrates normalized out-of-plane displacement amplitudes for the metamaterial of FIG. 3A.

In conventional structural elements, such as plates, the structural, noise, and vibration responses are strongly coupled through shared design parameters (such as thickness). The microstructure in a cellular solid can partially decouple these responses, enabling the creation of structural elements with inherently better noise and vibration mitigation properties than conventional structural elements. The periodicity of the cellular materials structure leads to two interesting phenomena concerning the propagation of mechanical vibrations in these materials. First, the frequency response of cellular materials show alternating regions of marked attenuation (stop bands) and propagation (pass bands). The former are characterized by vibration modes that are localized to a unit cell, while the latter correspond to modes that span multiple unit cells (see FIG. 3A). The transmission loss in the stop bands is comparable to that achieved by conventional damping treatment (e.g. constrained layer damping coatings) in higher frequency ranges. Second, wave propagation in cellular materials exhibit strong directionality. Waves can propagate more easily along some favored directions than others (see FIG. 3B). Moreover, the set of favored directions, as well as the amplitude modulation within this set, is strongly dependent on the frequency of the vibrations relative to the natural frequencies of the component made from the cellular material. Hence, the wave propagation behavior of the distinct stable configurations of a phase transforming cellular material is significantly different.

Energy Harvesting

Figure 4:
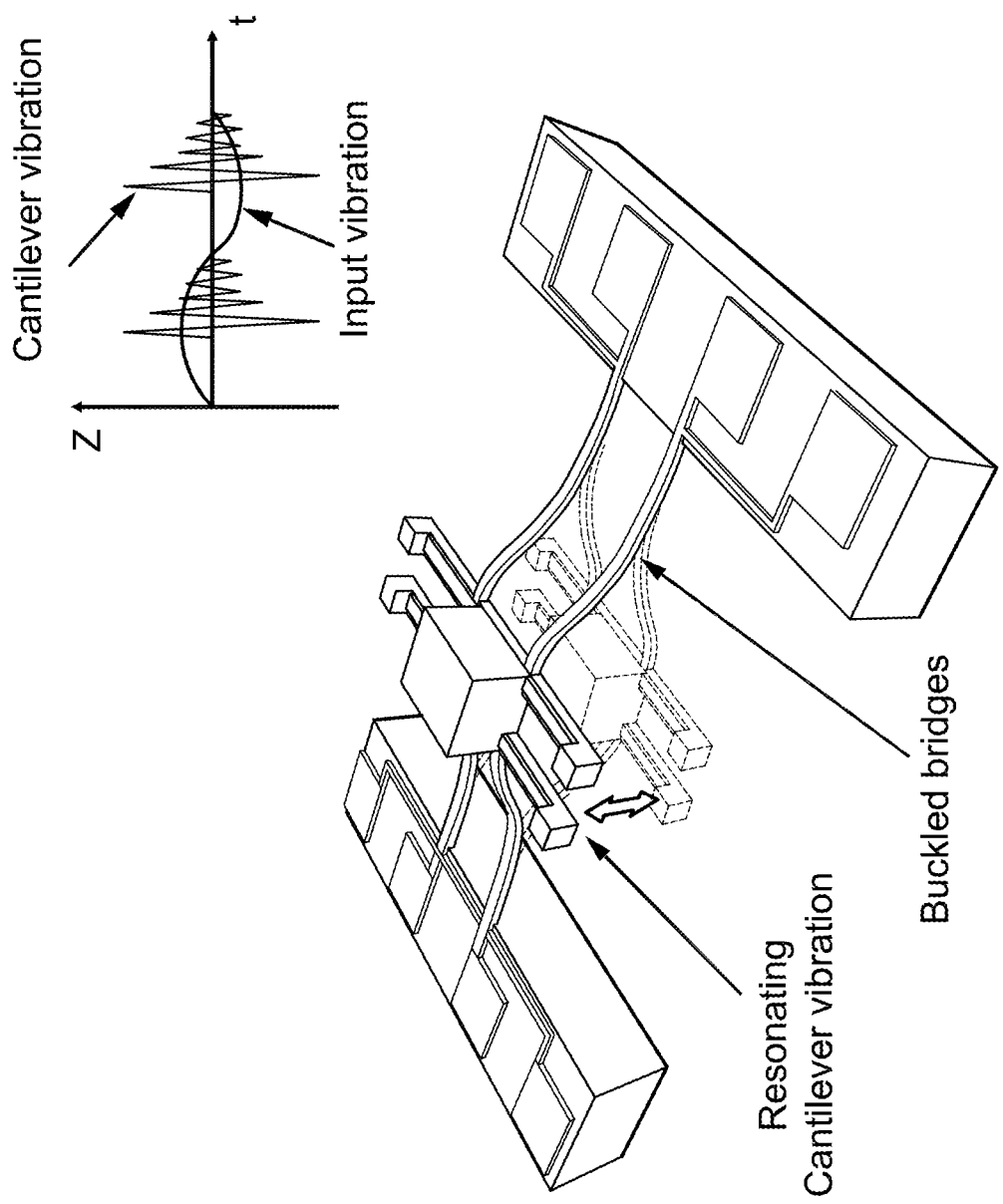
FIG. 4 schematically illustrates an energy harvesting device utilizing phase transforming cellular technology of FIG. 1A.

Energy harvesting consists of capturing energy from external sources (such as solar, wind, mechanical, and the like) and storing said energy for later use. Recently, interested in this field has been directed to kinematic energy generators which convert energy in form of mechanical movement (vibrations, displacements, forces) into electrical energy using electromagnetic, piezoelectric or electrostatic mechanisms. Among the different alternatives for kinematic energy harvesting, piezoelectrics have attracted considerable attention for its capacity of provide continuous and stable power supply. A cantilever structure with piezoelectric material attached to the top and bottom surfaces has been a traditional geometry for harvesting energy from vibrations, however, such devices have a narrow bandwidth, hence practical applications of such devices is difficult as the vibration frequency often varies with time which results in a power reduction. New devices based on snap-through buckling allow frequency tune up enabling wide-bandwidth operations at an ambient vibration frequency, resulting in highly efficient energy harvesting (see FIG. 4). These new devices open the door for the design of new multistable materials for energy harvesting applications. Phase transforming cellular materials made of piezo-responsive materials (bulk or coatings) enable massive parallelization of energy harvesting and offer the potential to integrate energy harvesting into the structure.

Energy Absorption

Figure 5A:
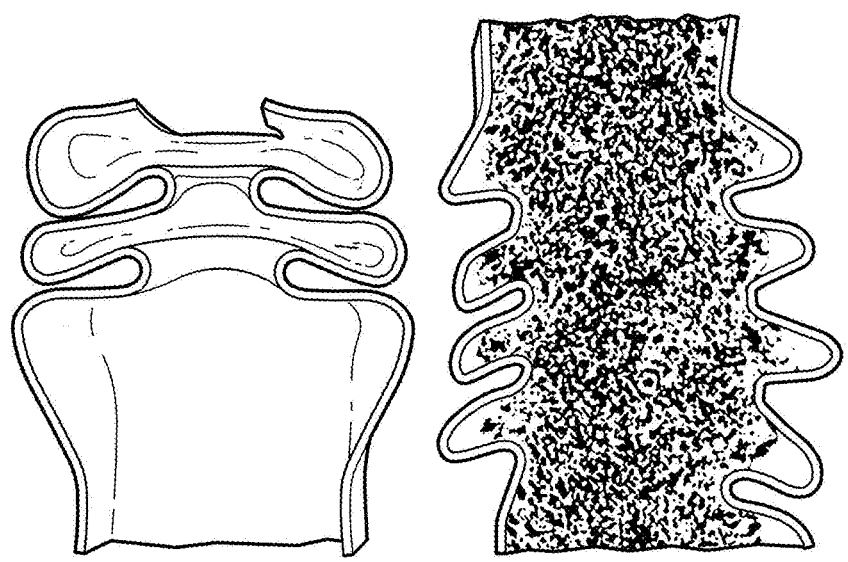
FIG. 5A is a cross-sectional view of crushed tubes with and without fillings of the metamaterial of FIG. 1A.
Figure 5B:
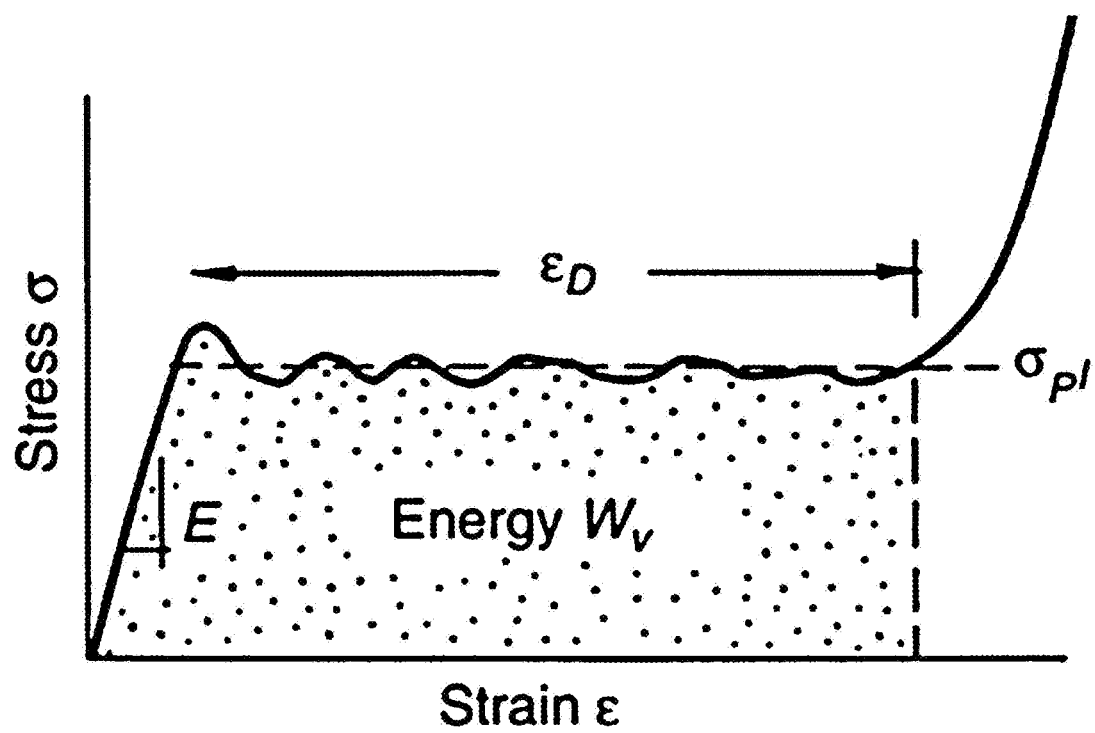
FIG. 5B graphically illustrates the stress-strain relationship of the filled tube of FIG. 5A.

Materials with good energy absorption characteristics are used for packaging fragile objects, personal protection equipment such as helmets and blast protection panels for military vehicles, and the like. These materials typically exhibit a long plateau in the stress-strain response after the limit point is passed. With the judicious selection of cell topology, cell geometry, wall material, and relative density, cellular materials can be designed to provide outstanding properties for energy absorption (see FIG. 5A-5B). Recent advances in the development of materials for energy absorption have been based on the understanding of absorbing mechanisms that are present in nature. A wide range of bio-mechanical phenomena is attributed to bistability and multistability behavior, such as the unfolding and folding of titin protein and compression of sarcomeres in limb muscles. Systems that show bistable and multistable behaviors have been shown to be excellent for energy dissipation. Phase transforming cellular materials have the potential to integrate energy absorption into structural elements thereby reducing the need for add-on noise and vibration mitigation treatments. One potential application could be the use of phase transforming cellular materials in football helmets to reduce impact-induced brain injuries. For such case, both energy absorption and wave guiding properties may be exploited.

Figure 6A:
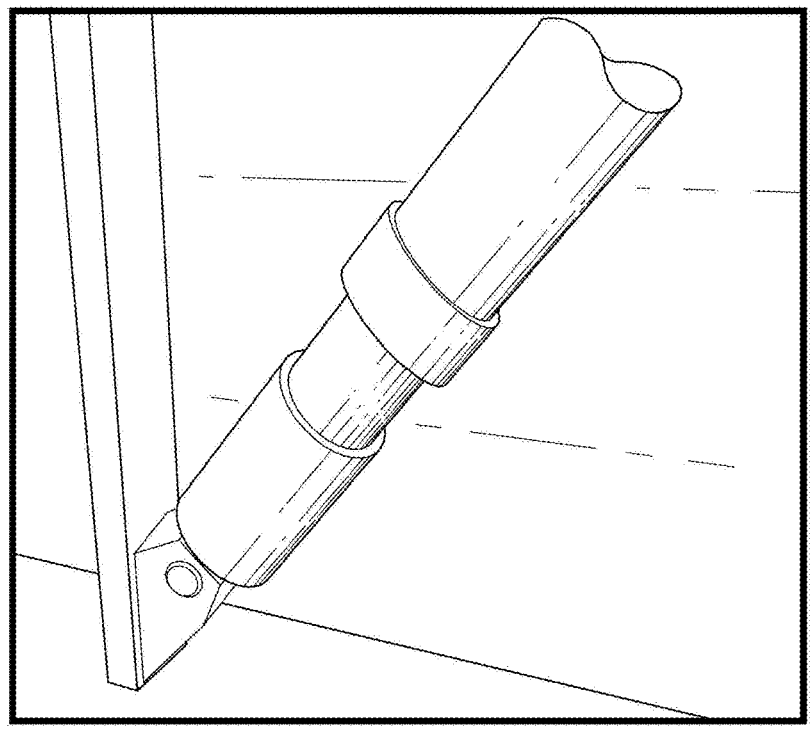
FIG. 6A illustrates a prior art fluid viscous damper.
Figure 6B:
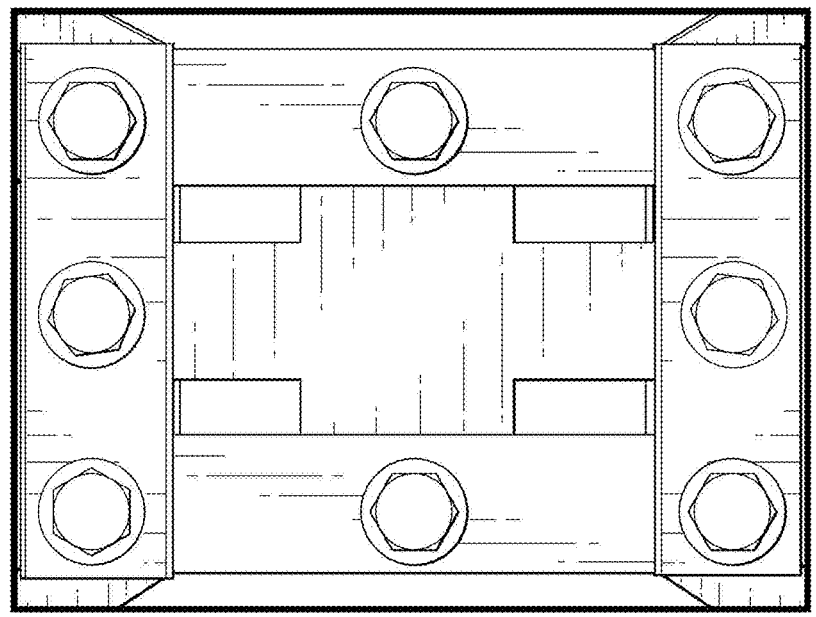
FIG. 6B illustrates a prior art metallic damper.

From the energy absorption point of view, phase transforming cellular materials enable new designs of passive energy dissipation systems for seismic applications. Passive energy dissipation devices are used in high rise buildings to limit damaging deformations in structural components. These devices are grouped in two broad categories: rate-dependent and rate-independent devices (see FIG. 6A-6B). Rate-dependent devices consist mainly in dampers whose force output is dependent of the rate of change of displacements across the damper. Examples of these systems include viscoelastic fluid dampers and viscoelastic solid dampers. The disadvantages of rate-dependent devices include limited deformation capacity, change of the properties of the viscoelastic component due to frequency and temperature, and the maintenance cost associated to wear of seals. On the other hand, rate independent systems consist of dampers whose force output is not dependent on the rate of change of displacement across the damper but rather upon the magnitude of the displacement and possibly the sign of the velocity. The behavior of these devices is described using hysteretic models and examples include metallic and friction dampers. Metallic dampers exhibit hysteretic behavior associated with the yield of mild steel while friction dampers exhibit essentially bilinear hysteretic behavior with very initial high stiffness. The main disadvantage of rate-independent devices for passive energy dissipations is that these systems suffer damage after an earthquake and require to be replaced, also in the case of friction dampers, the sliding interface may change with time. The main characteristics that make of phase transforming cellular materials good candidates for the design of passive energy dissipation systems are: dissipation of energy due to hysteretic behavior with recoverable deformations and large displacements, long term reliability and stability to changes in environmental conditions, such as temperature changes.

Shape Morphing Structures

Figure 7A:
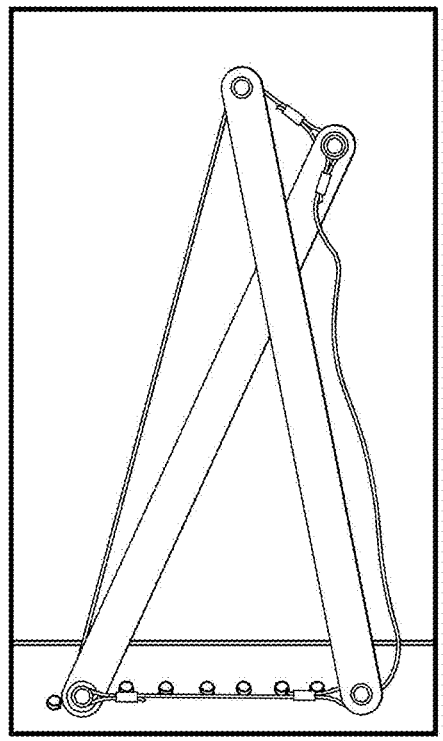
FIG. 7A is a perspective view of a shape morphing tensegrity structure.
Figure 7A:
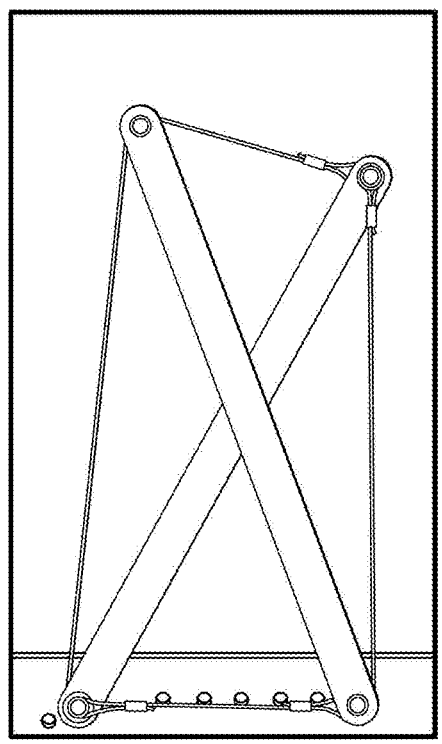
Figure 7B:
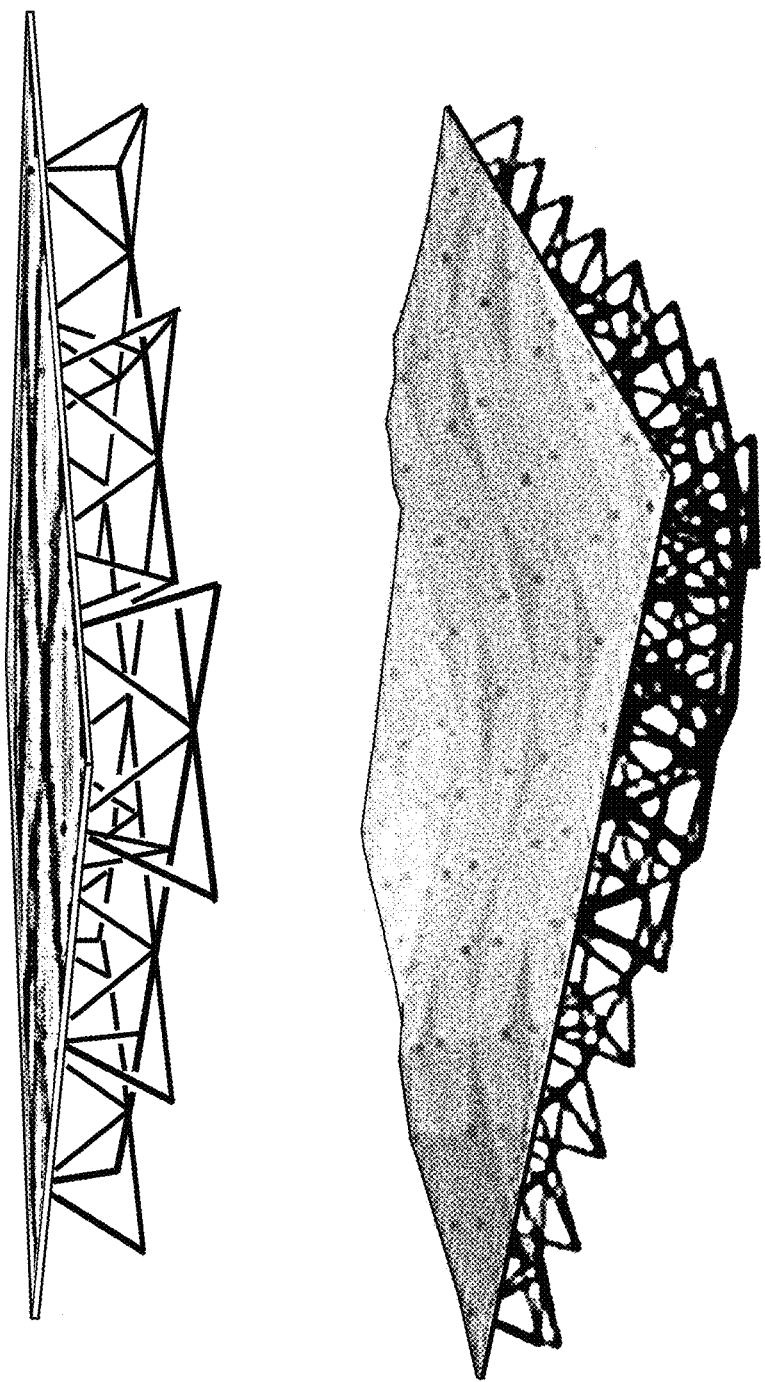
FIG. 7B is a perspective view of a shape morphing elastic tailored structure.
Figure 7C:
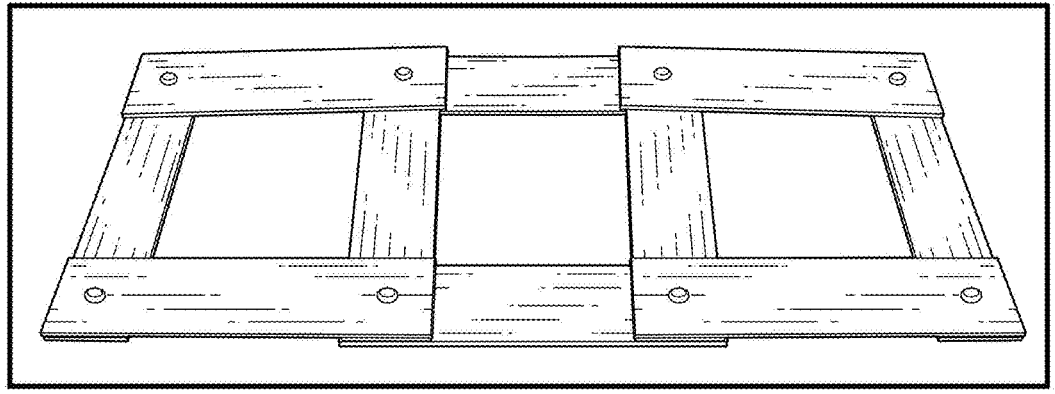
FIG. 7C is a perspective view of a shape morphing multistable composite structure.
Figure 7C:
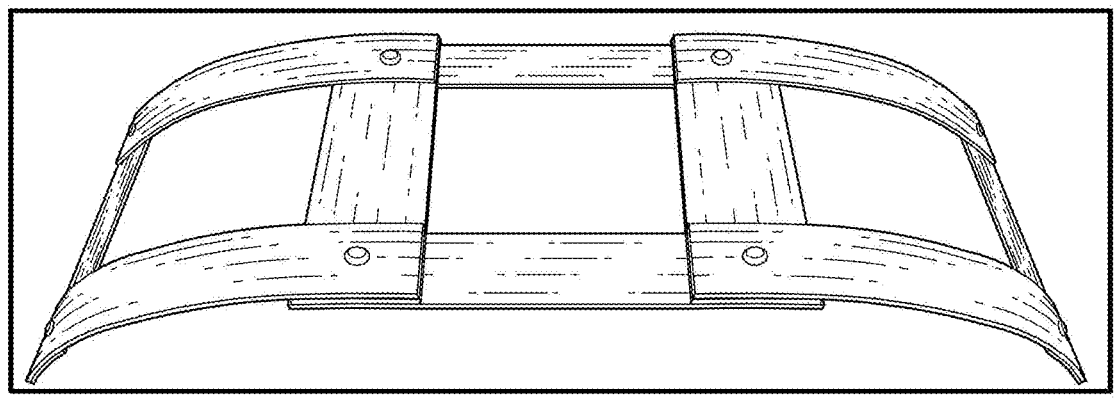

A morphing structure refers to a system or assembly with the ability to produce large deformations while bearing load. Deployable structures such as those used in stadium roofs, satellites, stents and vehicle roofs are common examples of morphing structures. Approaches to creating morphing structures include tensegrity structures (see FIG. 7A), elastically tailored structures, active structures controlled by distributed sensor-actuator systems (see FIG. 7B) and multistable composites (see FIG. 7C). Elastically tailored structures are mainly based on the concepts employed in compliant mechanisms in which transmission of force and motion is obtained by deformation instead of the connection of rigid bodies by joints. Morphing of a sandwich panel with a Kagome truss core has been demonstrated by replacing some truss members actuators. Active structures allow for large changes in area, but they do not provide good load bearing capabilities. Phase transforming cellular materials can be designed to exhibit a large change in volume accompanying a change between stable configurations while retaining sufficient mechanical properties for structural applications.

Switchable Hydrophobic/Hydrophilic Surfaces

A switchable surface combines the attributes of both superhydrophilic and superhydrophobic surfaces and can be used in a variety of applications including microfluidic pumps, drug delivery systems, windshield coatings, and protein concentrators. One method to generate reversible wettability upon switching between superhydrophobicity and superhydrophilicity is achieved by biaxially extending and unloading an elastic polyamide film with triangular net-like structure composed of fibers of about twenty micrometers in diameter. The average side of the triangle of the net-like structure is around two-hundred micrometers before biaxial extending (superhydrophobic with a contact angle of 151.2 degrees) and four hundred and fifty micrometers after extension (superhydrophilic with a contact angle of 0±1.2 degrees). The mechanical actuation drives an increase in the liquid/solid interface resulting in the modification of the apparent contact angle rather than directly modifying the surface wetting properties, which depend on the chemical composition of the surface. A thin layer of a phase transforming cellular material can be used in a similar manner wherein a change in phase leads to a change in the apparent contact angle at the surface. If a bi-stable unit cell is used in the phase changing material, an external energy source such as an applied voltage can be used only to transition the surface between its phases while no energy is needed to maintain the current phase.

Choice of Unit Cell for Phase Transforming Cellular Materials

Figure 8A:
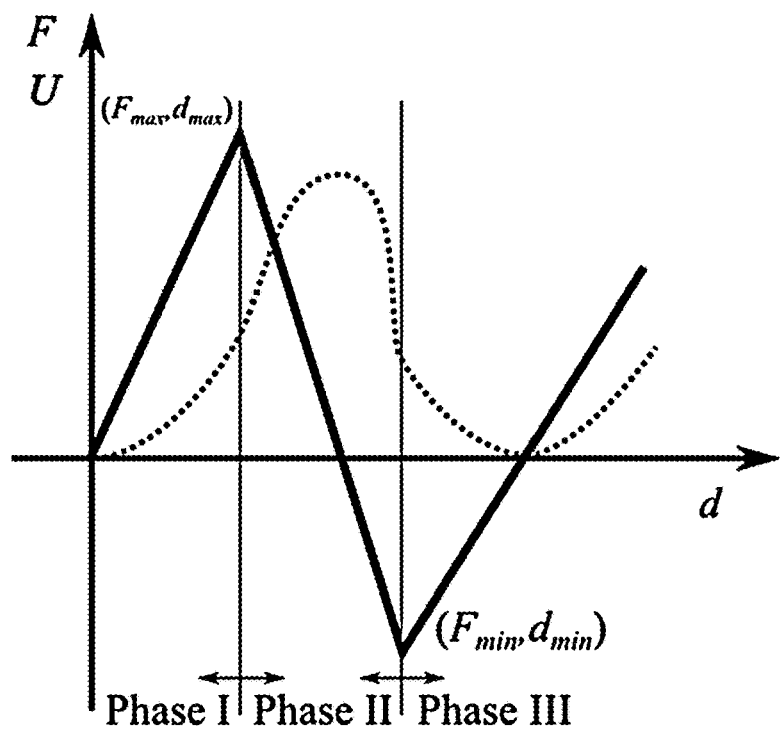
FIG. 8A graphically illustrates the force-displacement and energy-displacement curves for a bistable mechanism.
Figure 8B:
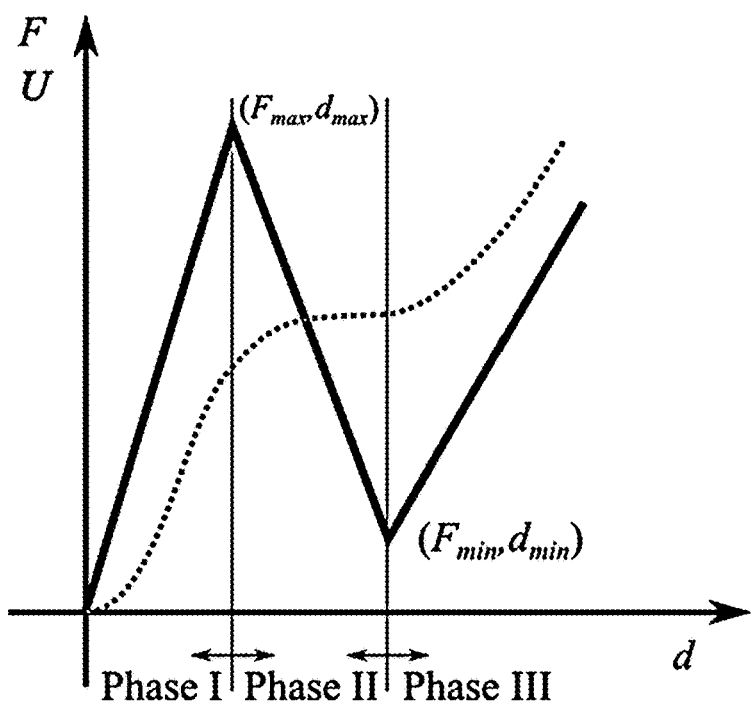
FIG. 8B graphically illustrates the force-displacement and energy-displacement curves for a metastable mechanism.

Extension of the notation of phase transformation of solids to cellular materials can be obtained by the formation of interconnected chains with a proper choice of a unit cell that replicates the saw-tooth like load-displacement behavior characteristic of a phase transformation. In this sense, the unit cell is typically suitable to present snap-trough instabilities when loaded, and when these instabilities at the cell level are triggered it is considered that a phase transformation of the cellular material has occurred. Snap-trough is typically associated with a buckling instability in which at a certain point under loading the force starts to decrease while the displacement is increasing. In some cases, instabilities in the unit cells occur during the elastic regime of the base material and can be recovered, therefore unit cells based on bistable/metastable compliant mechanisms are good candidates. Compliant mechanisms are a type of mechanisms that employ elastic body transformations instead of traditional joints to transfer force or motion. Compliant bistable and metastable mechanisms are a particular class of compliant mechanisms in which the force-displacement presents three phases: in phase I the load increases with the displacements until a critical load ($F_{max}$) in which snap-trough instability initiates, at this point phase II starts and the load keeps decreasing until a minimum load ($F_{min}$) at which phase III begins and the load starts to rise again with displacement (see FIG. 8A-8B). In the case of a bistable mechanisms there are two stable configurations when unloaded. Once this mechanism is in one stable configuration, it remains there unless it is provided with enough energy to move to the other stable configuration (see FIG. 8A). Whereas a metastable mechanism corresponds to a mechanism that is in a special case of stability in which a small disturbance can lead to another stable state that exist nearby and has a lower potential energy (see FIG. 8B).

Figure 9A:
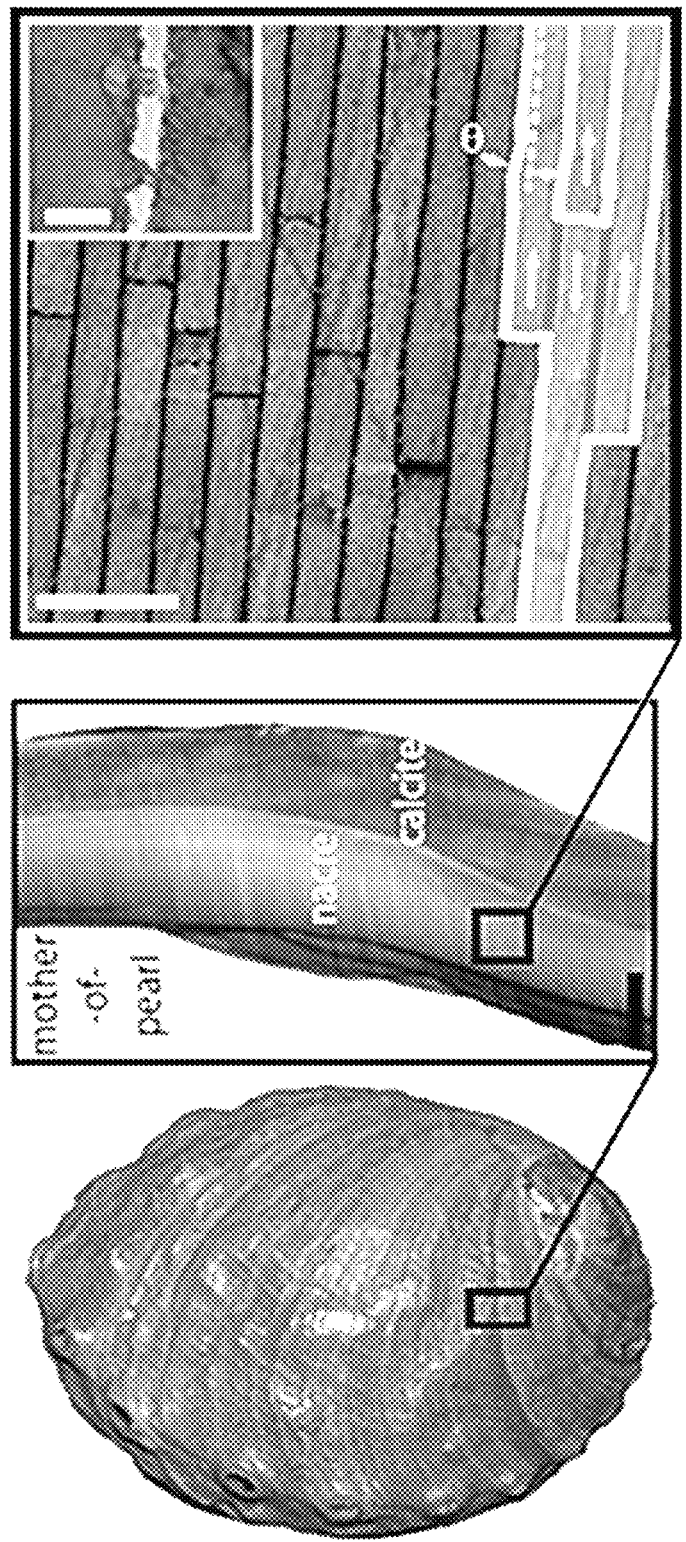
FIG. 9A compares the microstructure of nacre to brick and mortar microstructure.
Figure 9B:
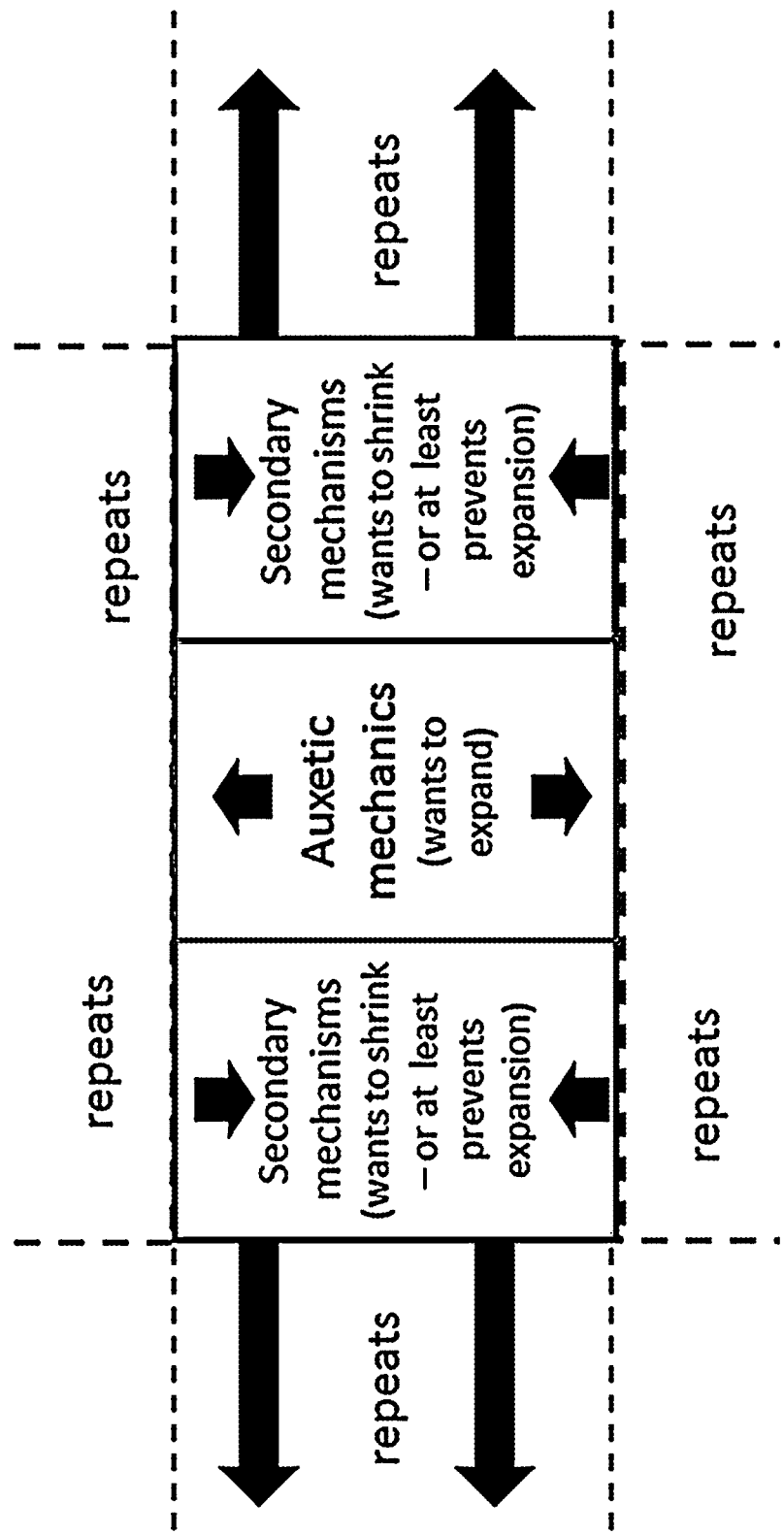
FIG. 9B schematically illustrates a comparison of brick and mortar compression/tension mechanisms to nacre.
Figure 10:
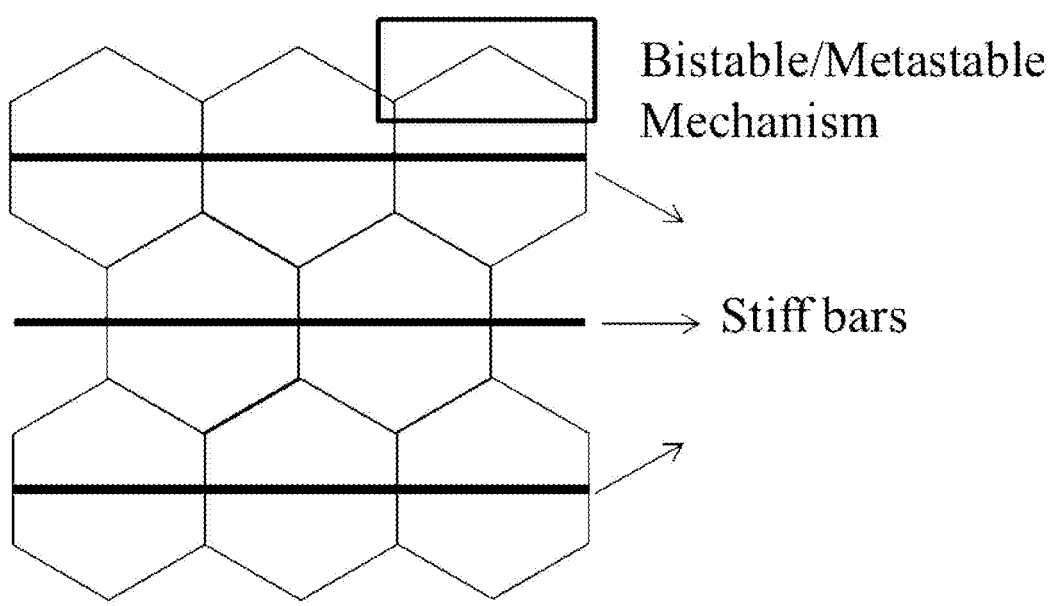
FIG. 10 graphically illustrates bistable/metastable cell configuration that mimics the nacre compression/tension.

In order to use bistable/metastable compliant mechanisms as a base for the unit cell of a phase transforming cellular material, it is helpful to form a microstructure that allow the boundary conditions on each mechanism to be maintained so as to allow the change from one stable configuration to the other upon loading of the cellular material. The microstructure of nacre provides a bio-inspired solution to maintain these conditions. This microstructure is formed by a wavy "brick and mortar system" (see FIG. 9A). The wavy bricks, in conjunction with the mineral bridges and the organic glue activate a very unique competition between a compression and a tension mechanism. When the tension mechanism wants to expand, the compression mechanism shrinks preventing the expansion (see FIG. 9B). These competition mechanisms can be approximated by the introduction of stiff horizontal walls to a regular hexagonal cellular microstructure (see FIG. 10A). Under compressive loading, the regular hexagonal material will try to expand but the stiff walls will prevent that expansion. These competition mechanisms will allow the inclined walls that form the regular hexagonal microstructure to act as a bistable/metastable mechanism, therefore under continuation of the compressive loading, the material will typically undergo the transformation to the second phase that correspond to an inverted hexagonal configuration (see FIG. 10B).

Figure 11A:
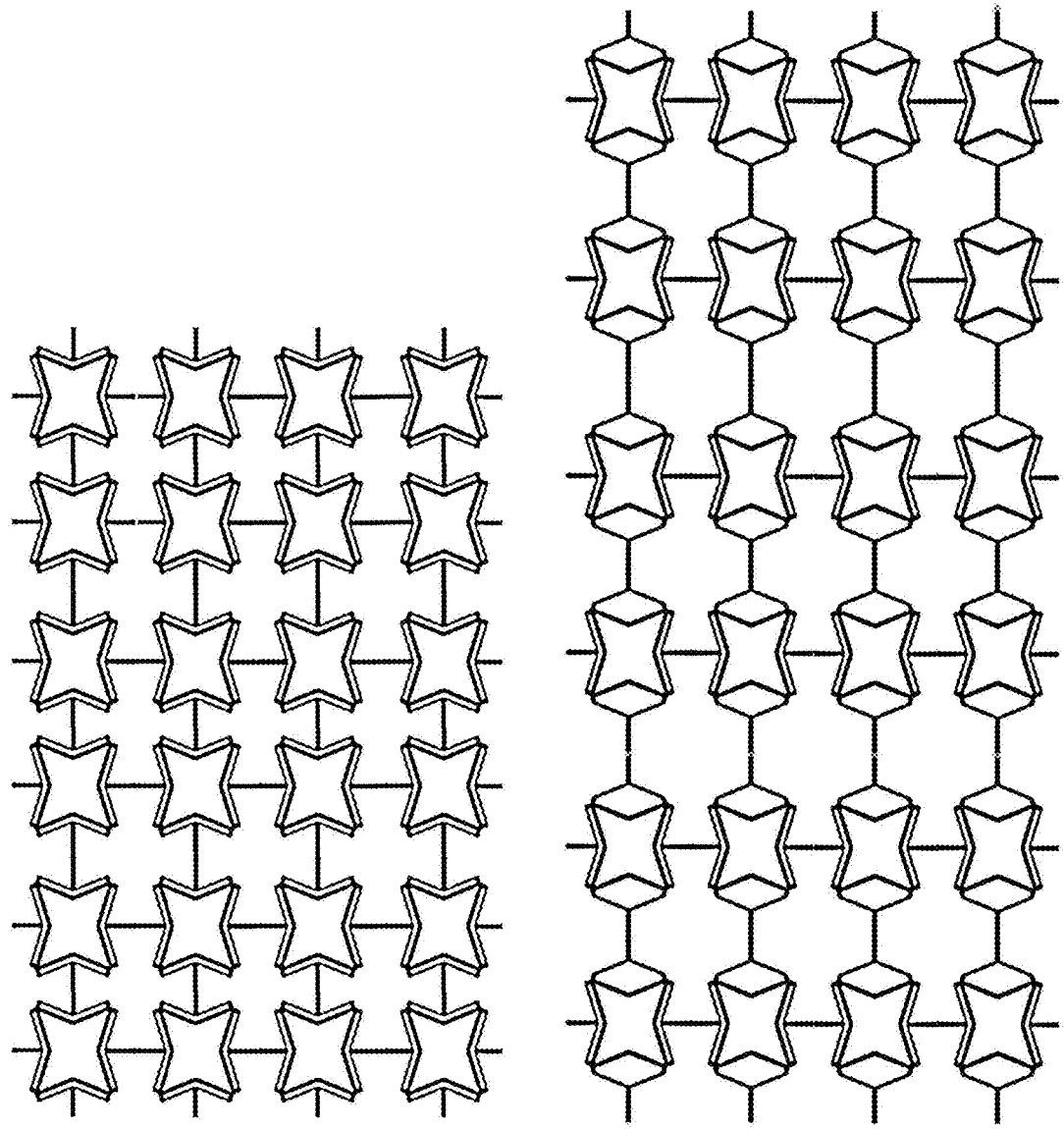
FIG. 11A schematically illustrates phase transforming unit cells organized as a 2-dimensional array.
Figure 11B:
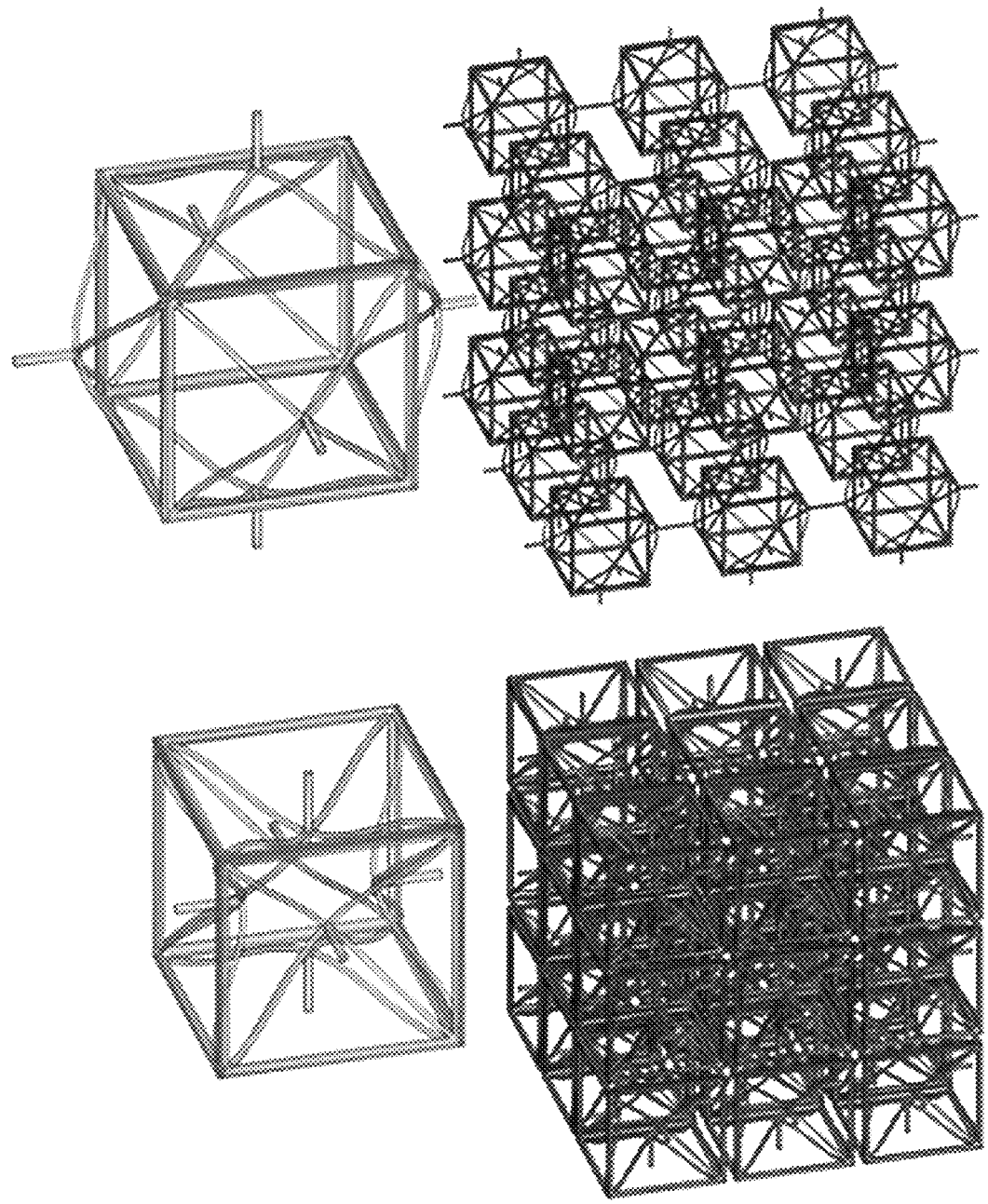
FIG. 11B schematically illustrates phase transforming unit cells organized as a 3-dimensional array.
Figure 12A:
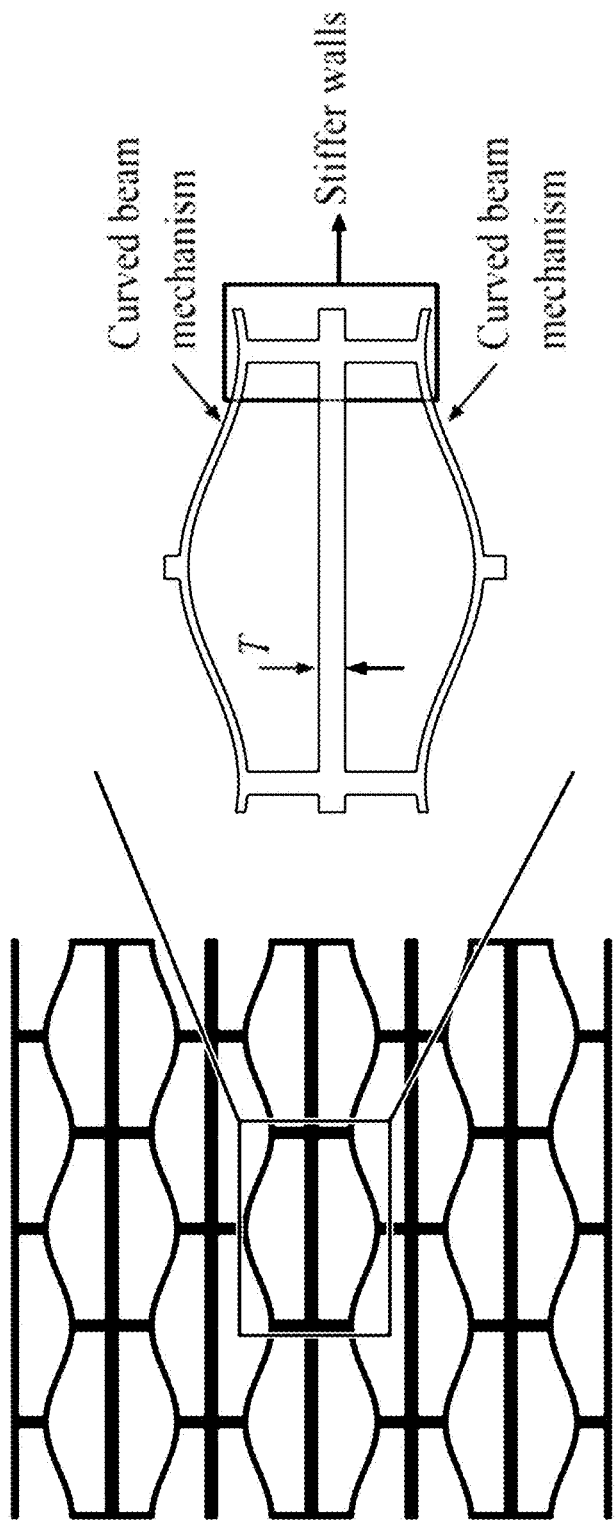
FIG. 12A schematically illustrates a quasi-hexagonal array of phase transforming bistable cells having curved-beam walls.
Figure 12B:
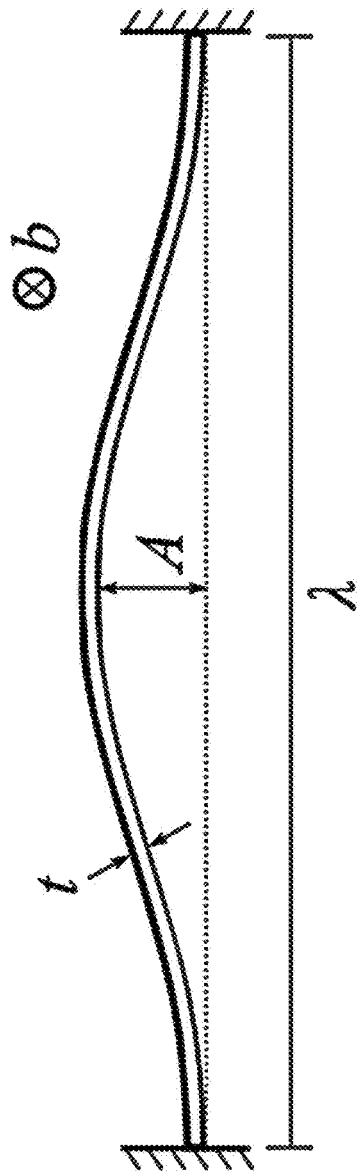
FIG. 12B is an enlarged view of a curved-beam wall of FIG. 12A.
Figure 12C:
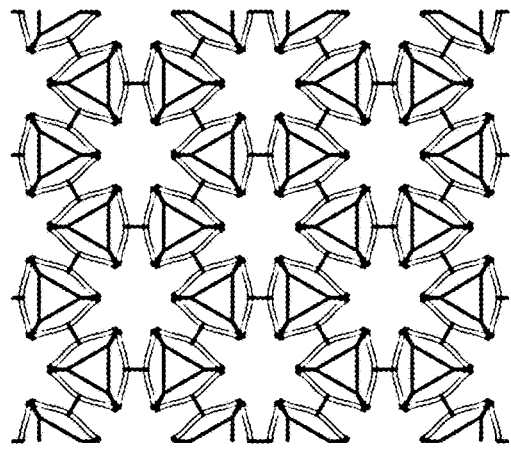
FIG. 12C is a schematic view of 2-dimensional arrays of curved-beam triangular and rectangular cells, respectively.
Figure 12C:
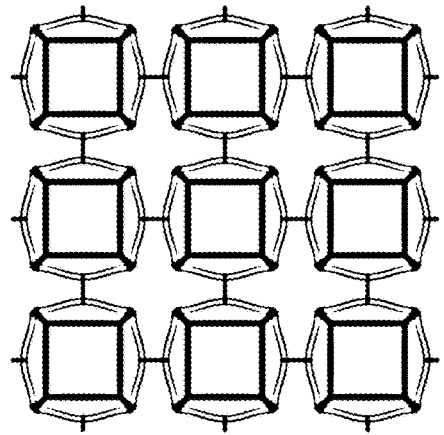
Figure 12C:
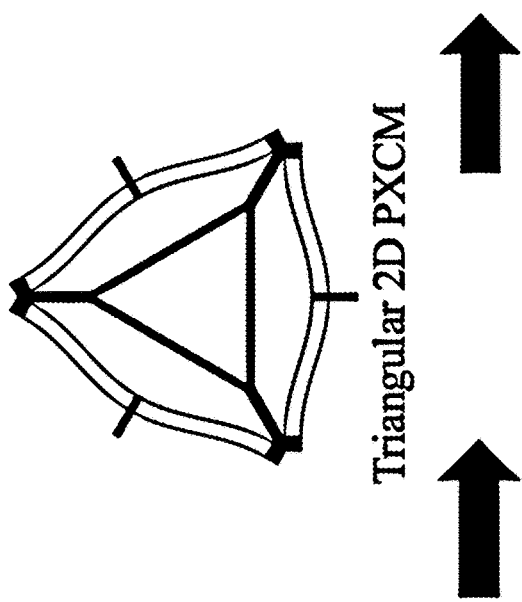
Figure 12C:
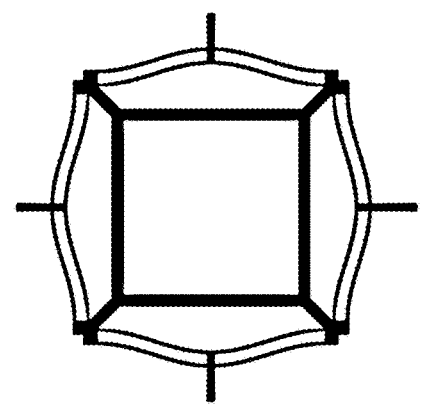
Figure 12C:
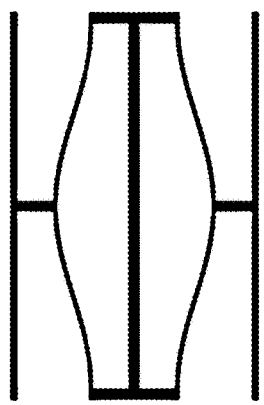

The idea of competition mechanisms and the curved beam mechanisms as a base for phase materials can be extrapolated to produce bi-directional instabilities in 2D plane honeycombs and 3D foams. FIG. 11A shows the 2D structure where the triggering of stable configurations has two preferential directions. The same concept applies for a 3D structure shown in FIG. 11B. In order to reduce the stress concentration at the joints of the hexagonal phase transforming material shown in FIG. 10, the inclined walls of the mechanism are replaced by a curved beam mechanism (see FIG. 12A). The typical implementation of this mechanism consists of a cosine shaped monolithic beam described by the thickness t, depth b, wavelength $\lambda$, amplitude A. the cosine shape of the curved beam mechanisms is given by equation 1 (see FIG. 12B).

$$\overline{A}(x) = A\left[1 - \cos\left(2\pi\frac{x}{\lambda}\right)\right] \quad (1)$$

In order to obtain snap-trough, the geometry constant $Q=A/t$ is typically greater than or equal to 6 and the behavior a single curved mechanism can be approximated by:

$$F_{max} = 740\frac{EIA}{\lambda^3}d_{max} = 0.16A \quad (2)$$

$$F_{min} = 370\frac{EIA}{\lambda^3}d_{min} = 1.92A \quad (3)$$

where E corresponds to the Young's modulus of the mechanism material and I is the moment of inertia of the curved beam. To ensure an elastic and reversible change between phases, the maximum strain of the curved beam during the deflection should be kept below the yield point of the material. The maximum strain during deflection can be estimated by using equation 3.

$$\varepsilon_{max} = 2\pi^2\frac{tA}{\lambda^2} \quad (4)$$

Mechanical Behavior of Phase Transforming Cellular Materials

Figure 13:
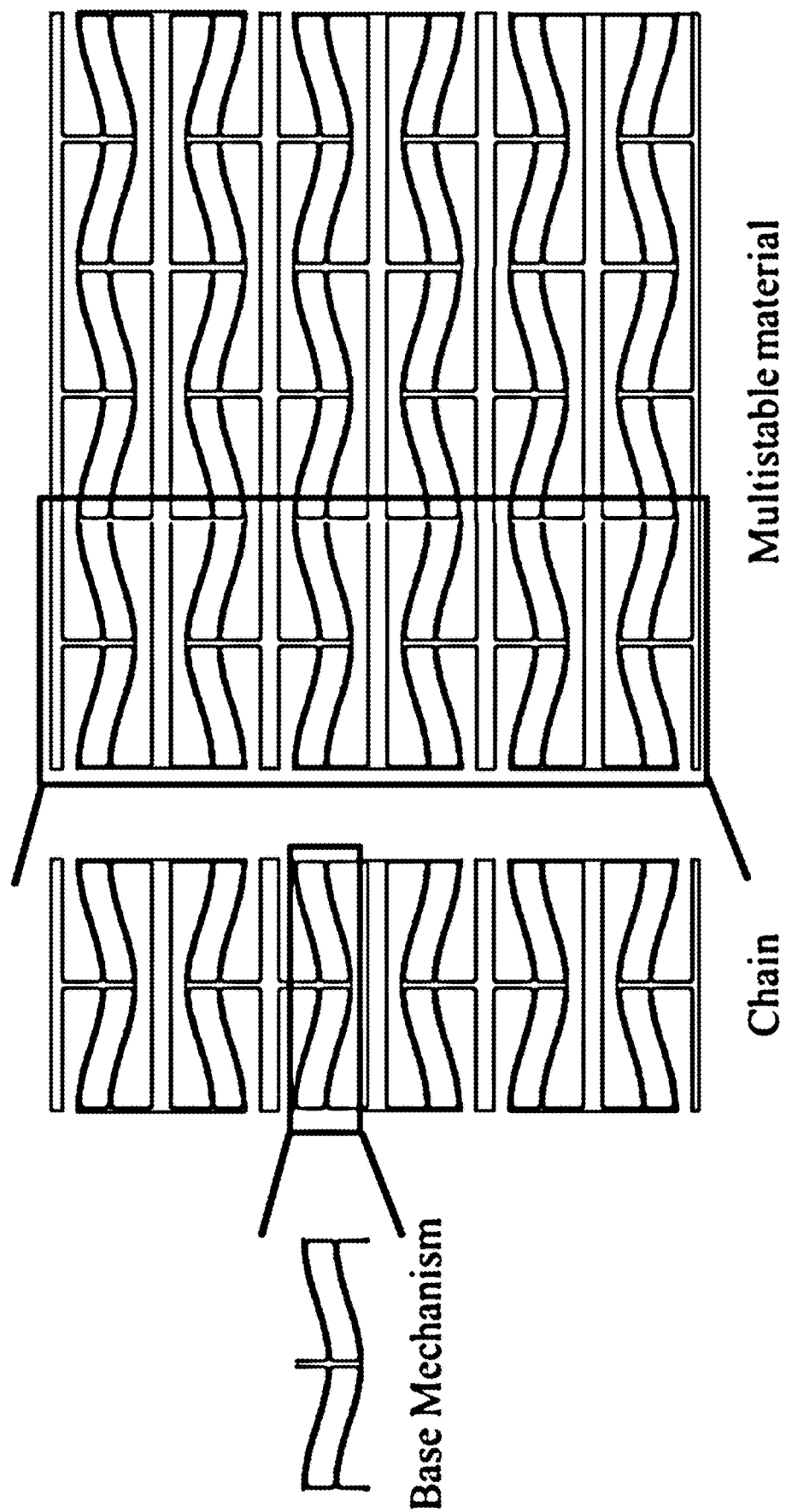
FIG. 13 schematically illustrates a 2-dimensional array made from linear cahins of phase-transforming cells.

A construction of a phase transforming material may be obtained by assembling an array of $N_c$ chains composed by Nunit cell mechanisms in series (see FIG. 13). Using equations 1-3, the displacement as a function of the force of the base mechanism on each phase can be approximated using a linear system defined between $F_{min}$ and $F_{max}$ as follows:

$$\text{Phase I: } x_I(F) = \frac{F}{k_1} \text{ for } x_I < d_{max} \quad (5)$$

-continued

Phase II: $x_{II}(F) = \frac{F + k_2 d_{max} - F_{max}}{k_2}$ for $d_{max} < x_{II} < d_{min}$ Phase III: $x_{III}(F) = \frac{F + k_3 d_{min} - F_{min}}{k_3}$ for $x_{III} > d_{min}$ Under the assumption that the system is overdamped (i.e. all the excess of energy from the change of phase of a mechanism is dissipated into heat) and defining $P_I$, $P_{II}$, and $P_{III}$ as the number of mechanisms in Phase I, Phase II and Phase III respectively, the force-displacement behavior for a chain can be found using:

$$X(F) = P_I x_I(F) + P_{II} x_{II}(F) + P_{III} x_{III}(F) \text{ with } F_{min} < F < F_{max}$$
$$\text{and } P_I + P_{II} + P_{III} = N \qquad (6)$$

Then, the total force-displacement behavior on the materials is given by $$X_T(F) = N_c X(F) \qquad (7)$$

Figure 14:
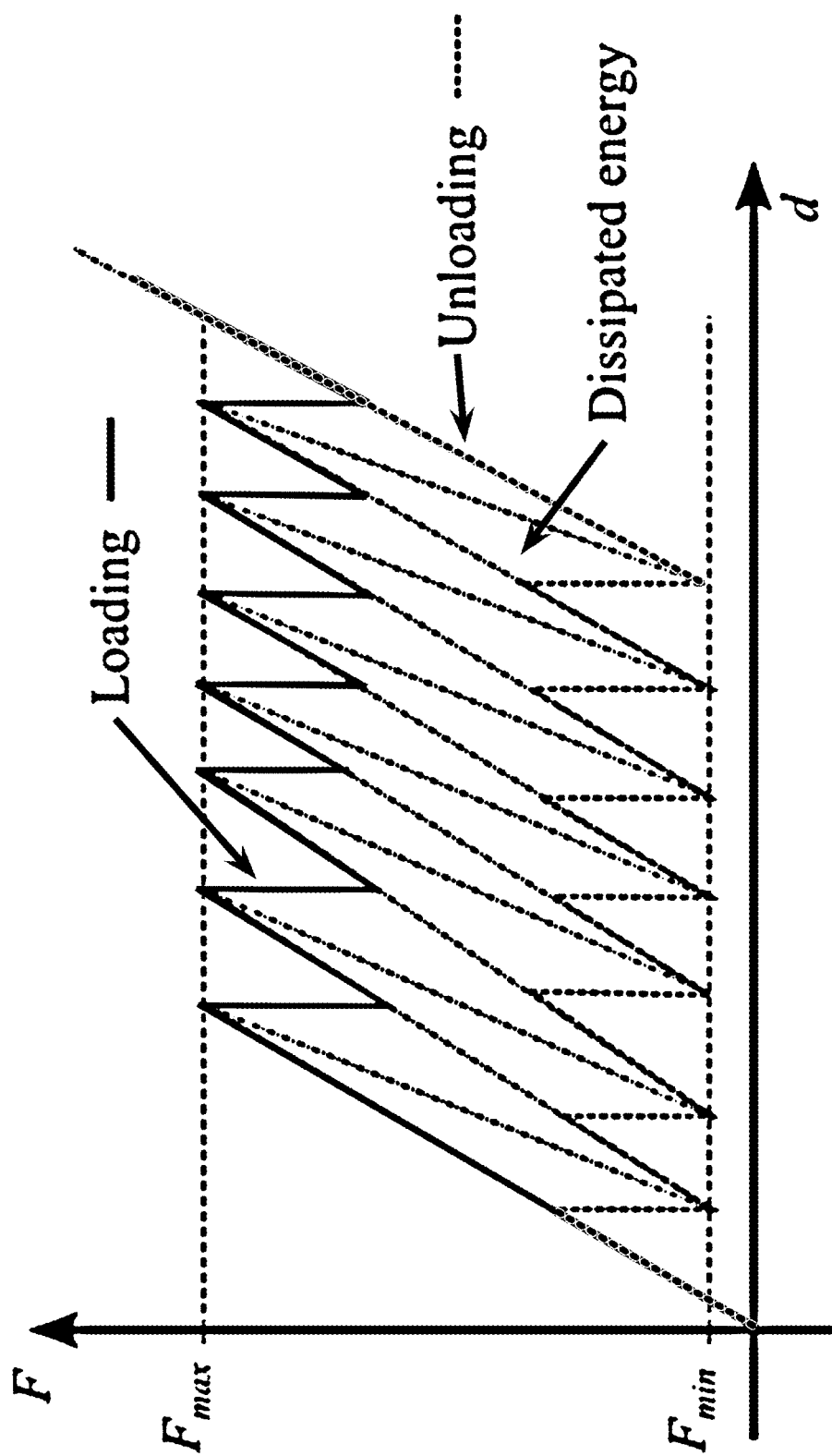
FIG. 14 is graphically illustrates energy dissipation due to hysteresis from loading/unloading phase-transforming cells.

A special case in the force-displacement behavior of a phase transforming cellular material occurs when $(P_I/k_1 + P_{III}/k_3) < |k_2|$, in which case there is a hysteresis between the loading and unloading path of the material due to snap-back instabilities. This hysteresis produces energy dissipation that can lead to novel energy absorption mechanisms (see FIG. 14). In general, structural cellular materials absorb energy via a plastic deformation mechanism. However, a phase transforming cellular material may absorb energy via recoverable elastic deformation, allowing the material to bounce back to its original configuration after the load is released.

Loss coefficient ($\eta$) is a dimensionless parameter used to characterize the energy that a material dissipates by intrinsic damper and hysteresis. $\eta$ is defined in equation 8 and corresponds to the energy loss per radian divided by the maximum elastic strain energy (U).

$$\eta = \frac{\Delta U}{2\pi U} \qquad (8)$$

Typically, for material selection in engineering applications the loss coefficient is related to the damping ratio ($\zeta$) by using:

$$\zeta = \frac{\eta}{2} \qquad (9)$$

Materials and Methods

Experimental

Figure 15A:
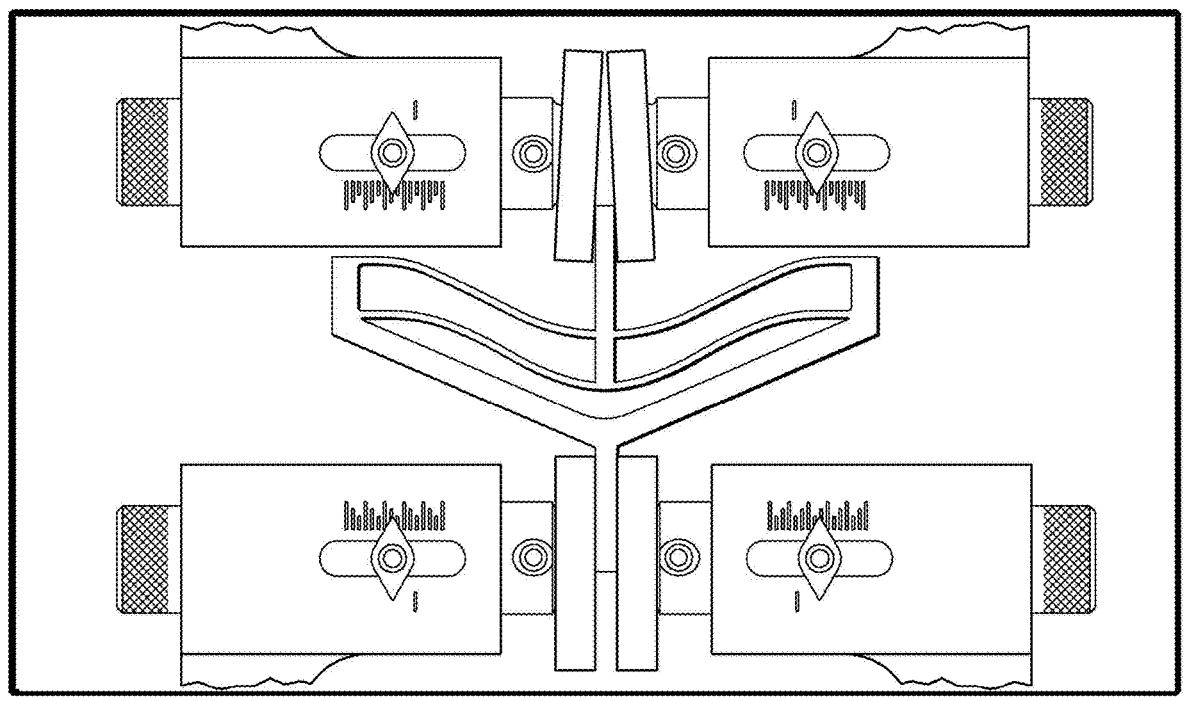
FIG. 15A is a top plan view of a base-cell according to FIG. 1A.
Figure 15B:
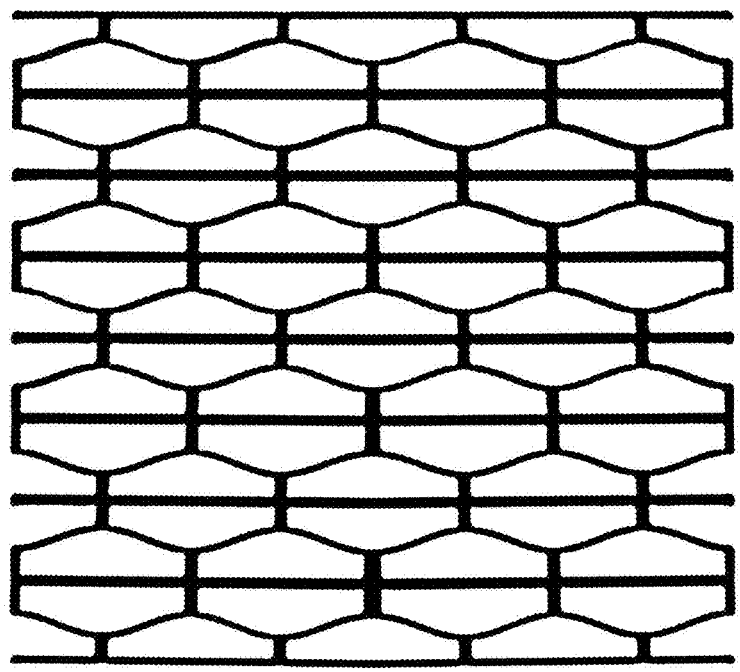
FIG. 15B is a top plan view of a multicellular phase-transforming array.

Prototypes of the base unit cell mechanism and phase transforming materials were manufactured a multi-material 3D printer using a rigid material as a base (see FIG. 15). The tensile properties of the base material are listed in table 1.

TABLE 1

Properties of base material

| Property | Unit | Metric |
|---|---|---|
| Modulus of elasticity | MPa | 1053.83 ± 58.036 |
| Yield strength | MPa | 19.306 ± 1.284 |
| Strain at yield | [ ] | 0.0485 ± 0.00213 |

TABLE 1-continued

Properties of base material

| Property | Unit | Metric |
|---|---|---|
| Ultimate tensile strength | MPa | 18.0976 ± 0.3277 |
| Strain at break | [ ] | 0.3209 ± 0.036167 |

Computational

Computational simulations of the base unit cell and the phase transforming cellular material were made using explicit FEM under displacement control boundary conditions. Plane strain elements with four nodes and four integration points were used (CPE4) for the meshes of the models.

RESULTS

Figure 16A:
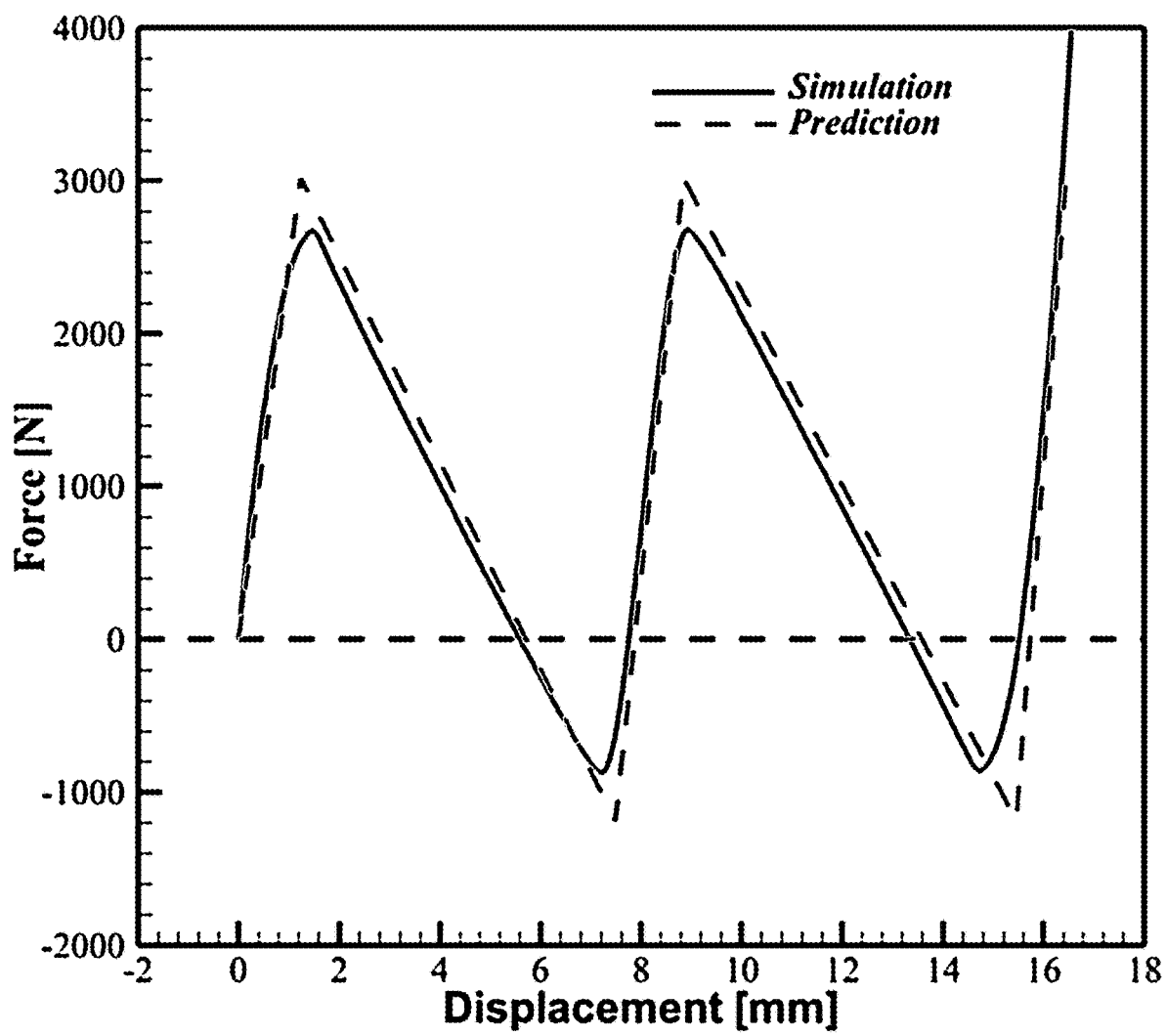
FIG. 16A graphically illustrates the force-displacement relationship for a chain of 2 base cells of FIG. 15A.
Figure 16B:
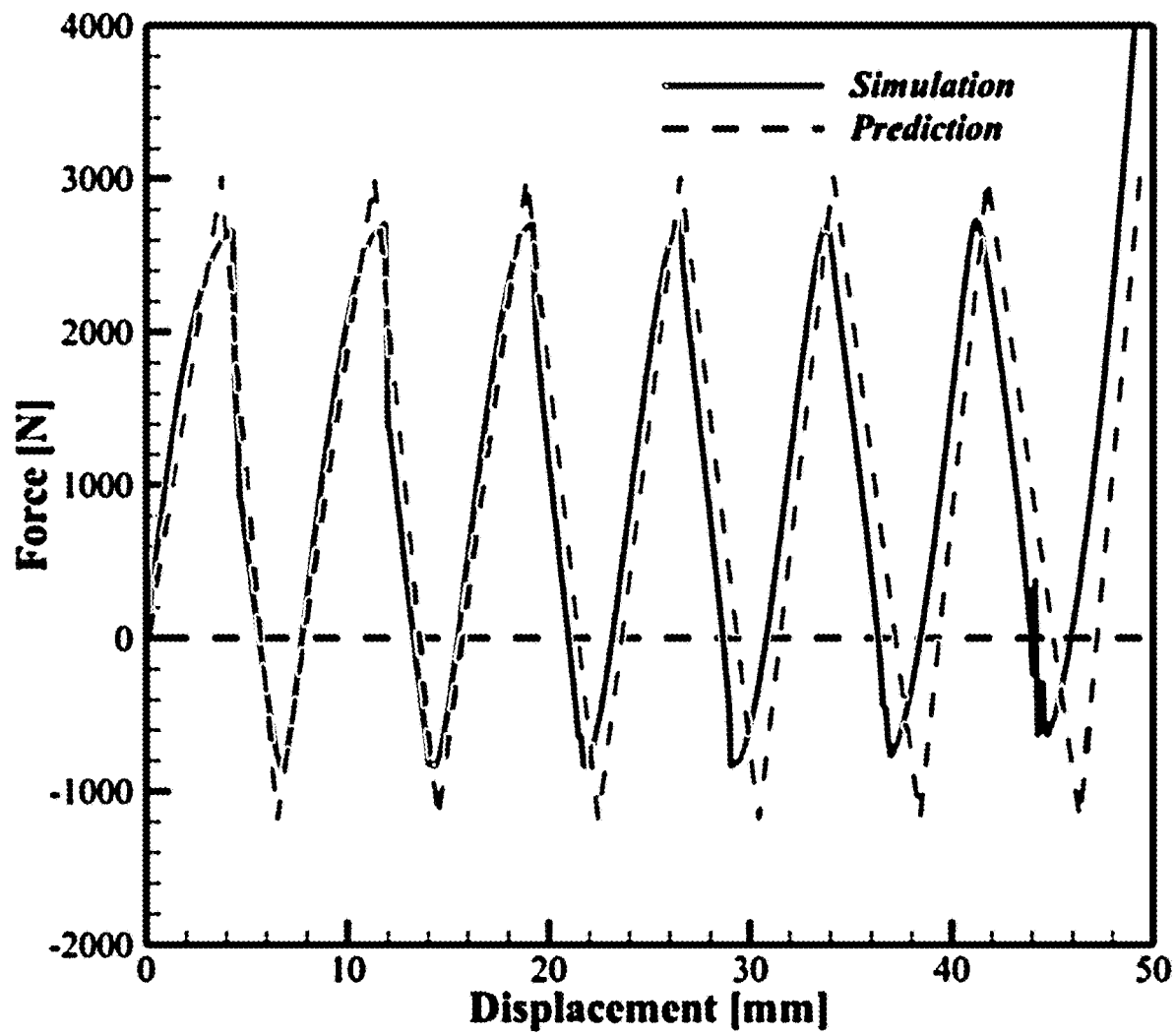
FIG. 16B graphically illustrates the force-displacement relationship for a chain of 6 base cells of FIG. 15A.
Figure 16C:
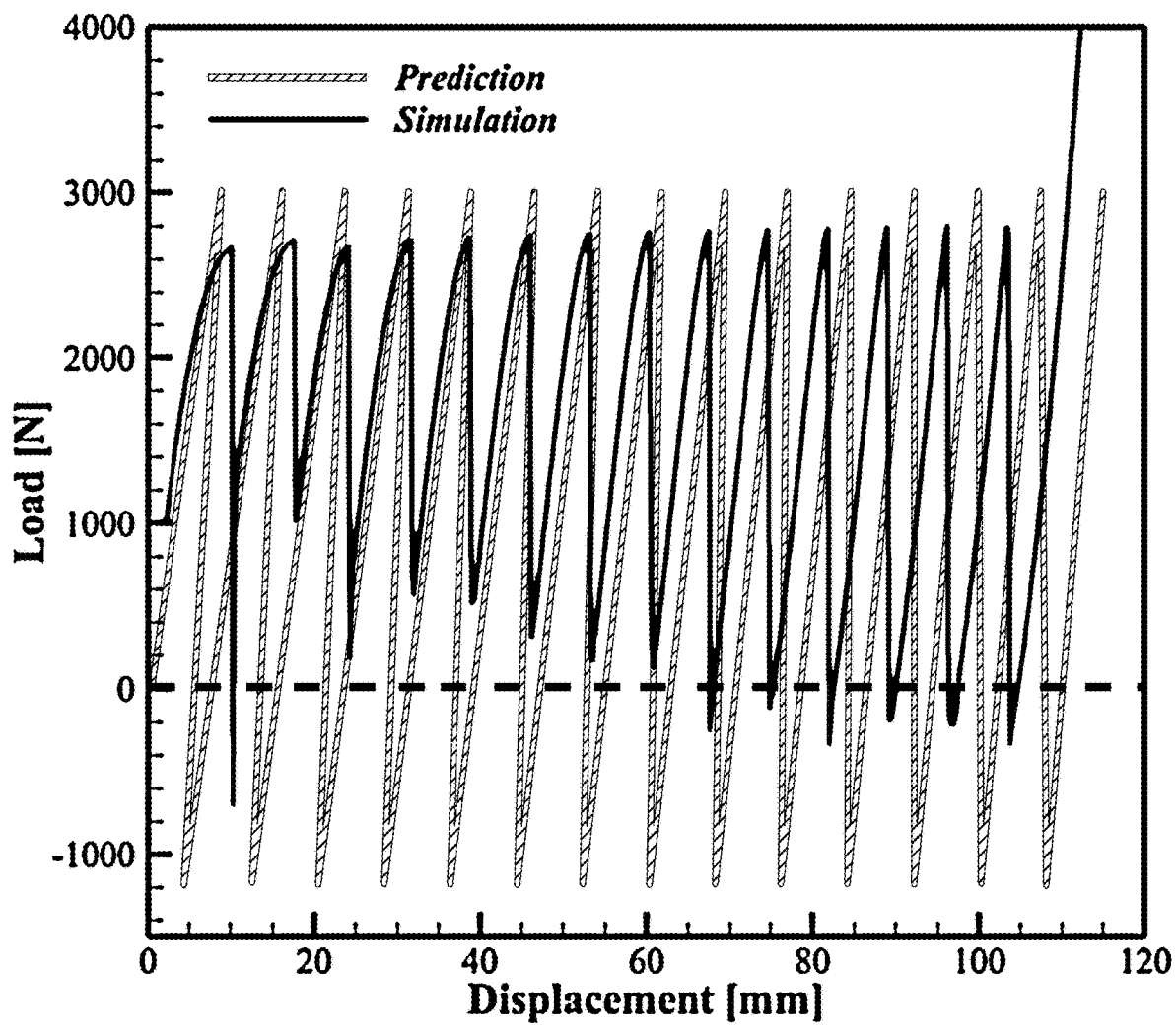
FIG. 16C graphically illustrates the force-displacement relationship for a chain of 14 base cells of FIG. 15A.

FIGS. 16A-16C present a comparison between predictions using the analytical model given in equation 6 and simulations for chains formed by 2, 6 and 14 double curved beam mechanisms in series. The geometrical parameters considered in the base mechanisms are: t=0.866 mm, b=10 mm, λ=58.47 mm and A=10 mm. In general, a good agreement is founded between the numerical and the analytical model, but as the number of unit cells in the chain increases, instabilities introduce nonlinearities that are not captured for the analytical model. In the case of FIG. 16C, enough mechanisms are stacked to produce snap-back behavior.

Figure 16D:
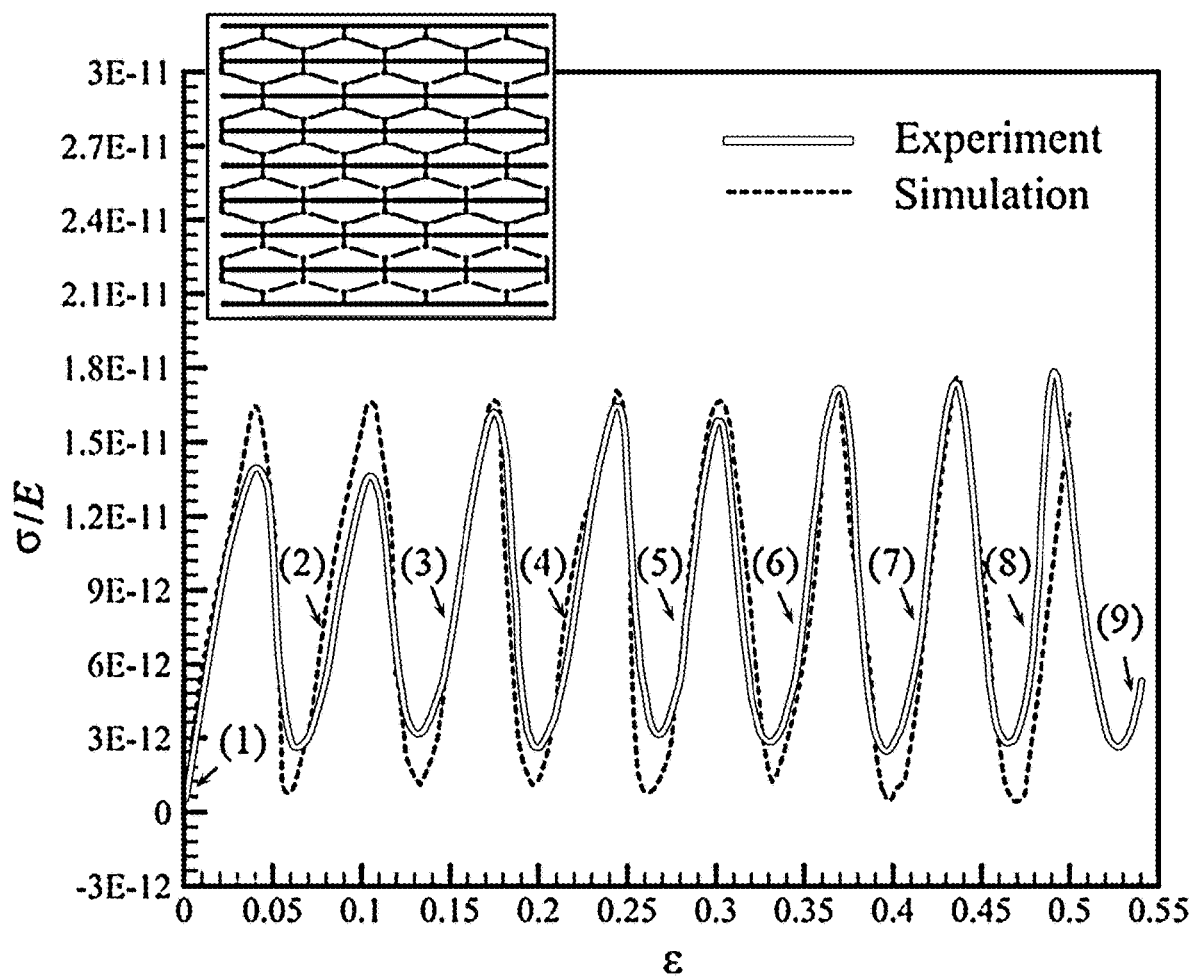
FIG. 16D graphically plots $\sigma/E$ vs. $\varepsilon$ for the array of FIG. 15B.
Figure 16E:
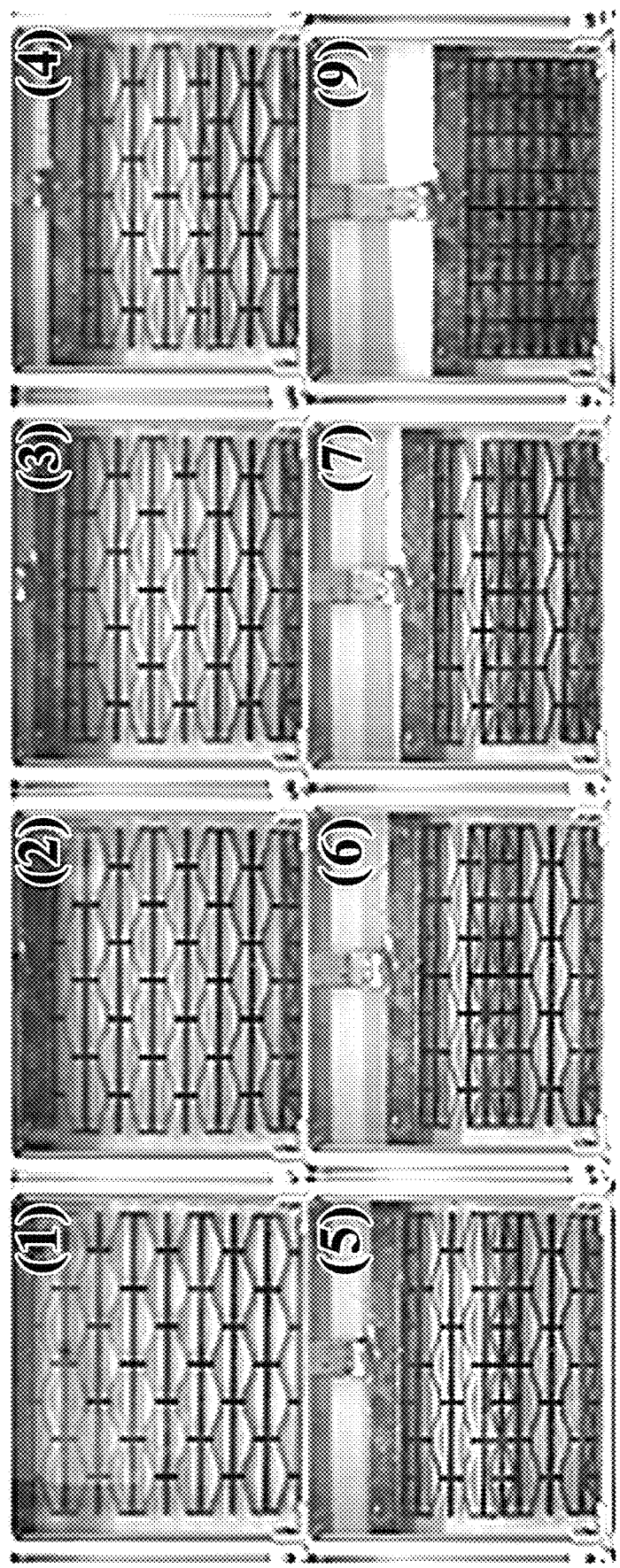
FIG. 16E illustrates the array of FIG. 15B under increasing compression.
Figure 17A:
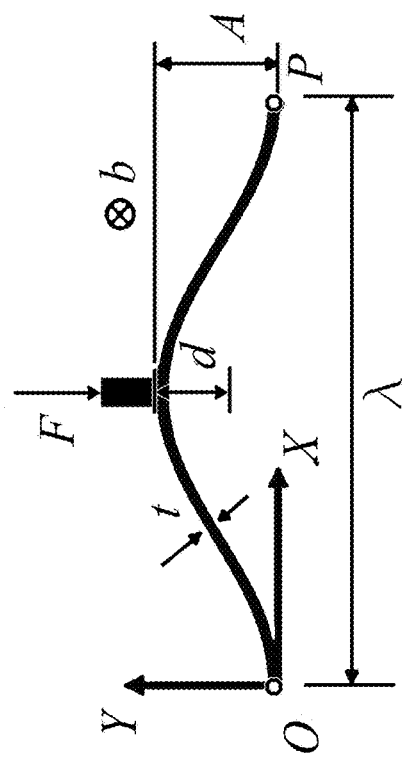
FIG. 17A schematically illustrates the forces on a curved wall.
Figure 17B:
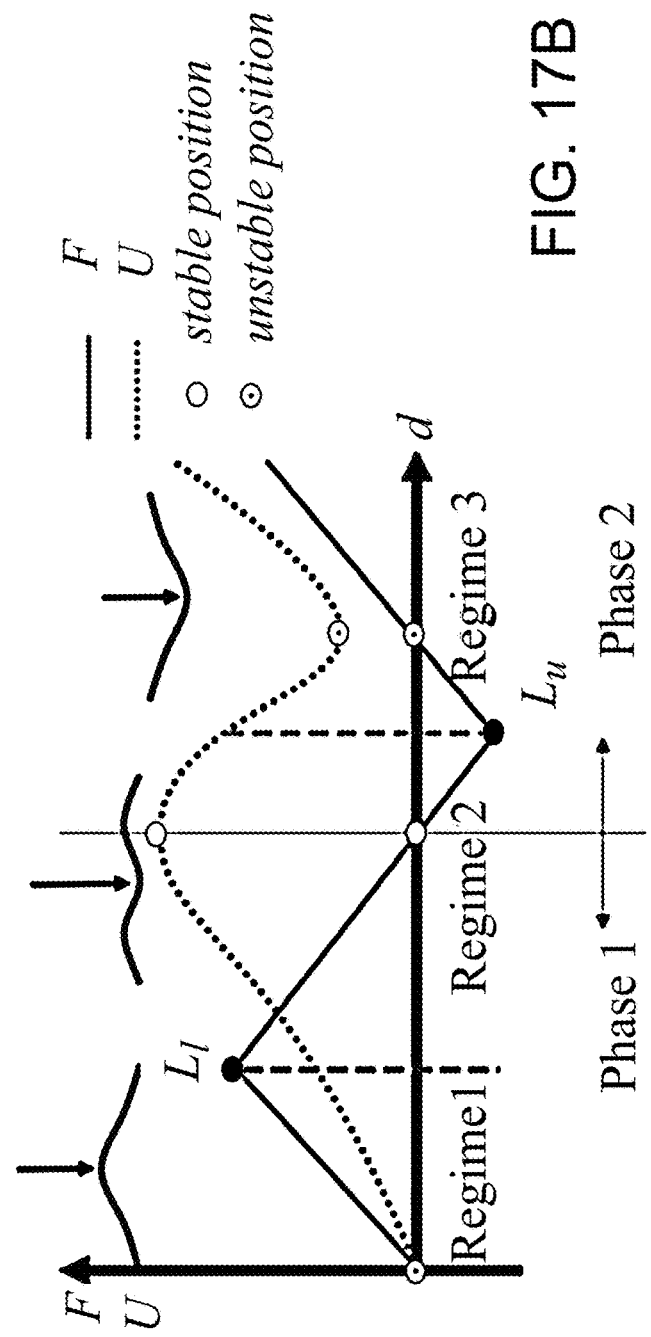
FIG. 17B schematically illustrates the force-displacement relationship for a curved wall undergoing phase change.
Figure 17C:
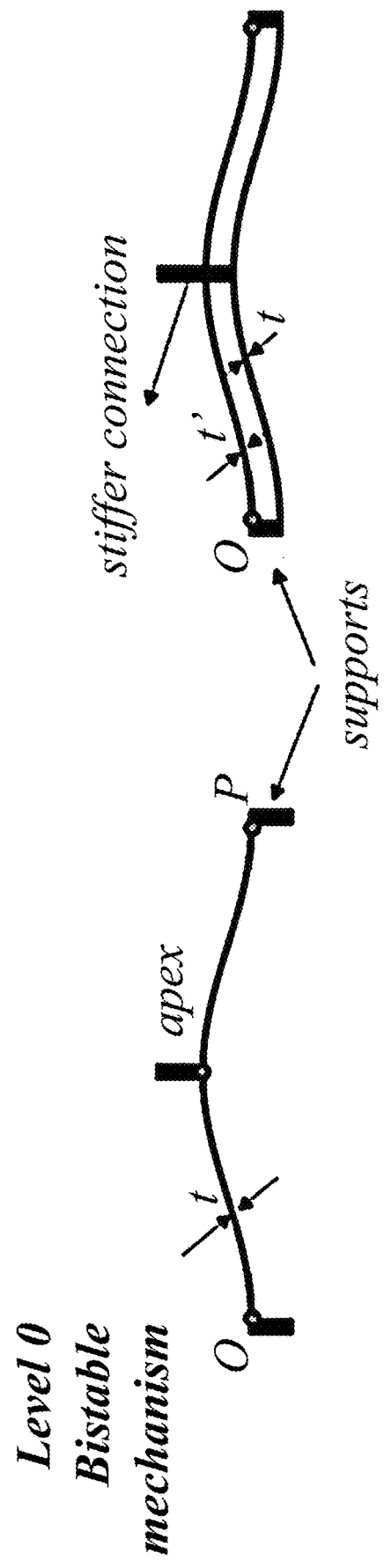
FIG. 17C graphically compares a single walled bistable mechanism to a reinforced double walled bistable mechanism.
Figure 17D:
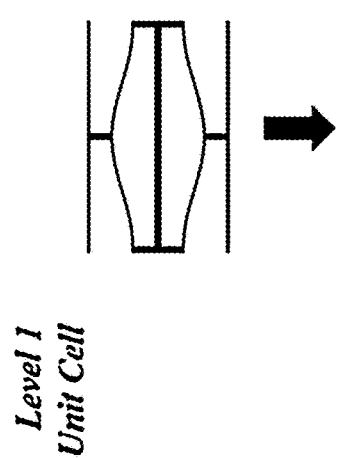
FIG. 17D schematically illustrates triangular and square multistable unit cells.
Figure 17D:
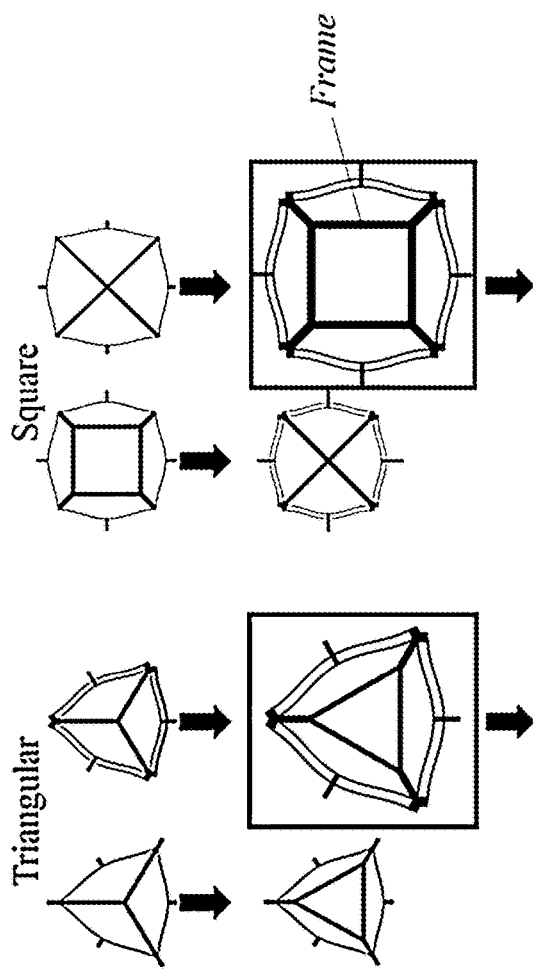
Figure 17E:
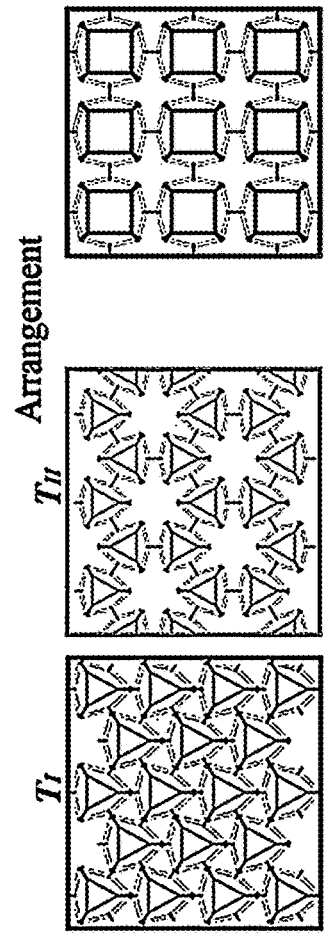
FIG. 17E schematically illustrates arrays of triangular and square multistable unit cells.
Figure 18A:
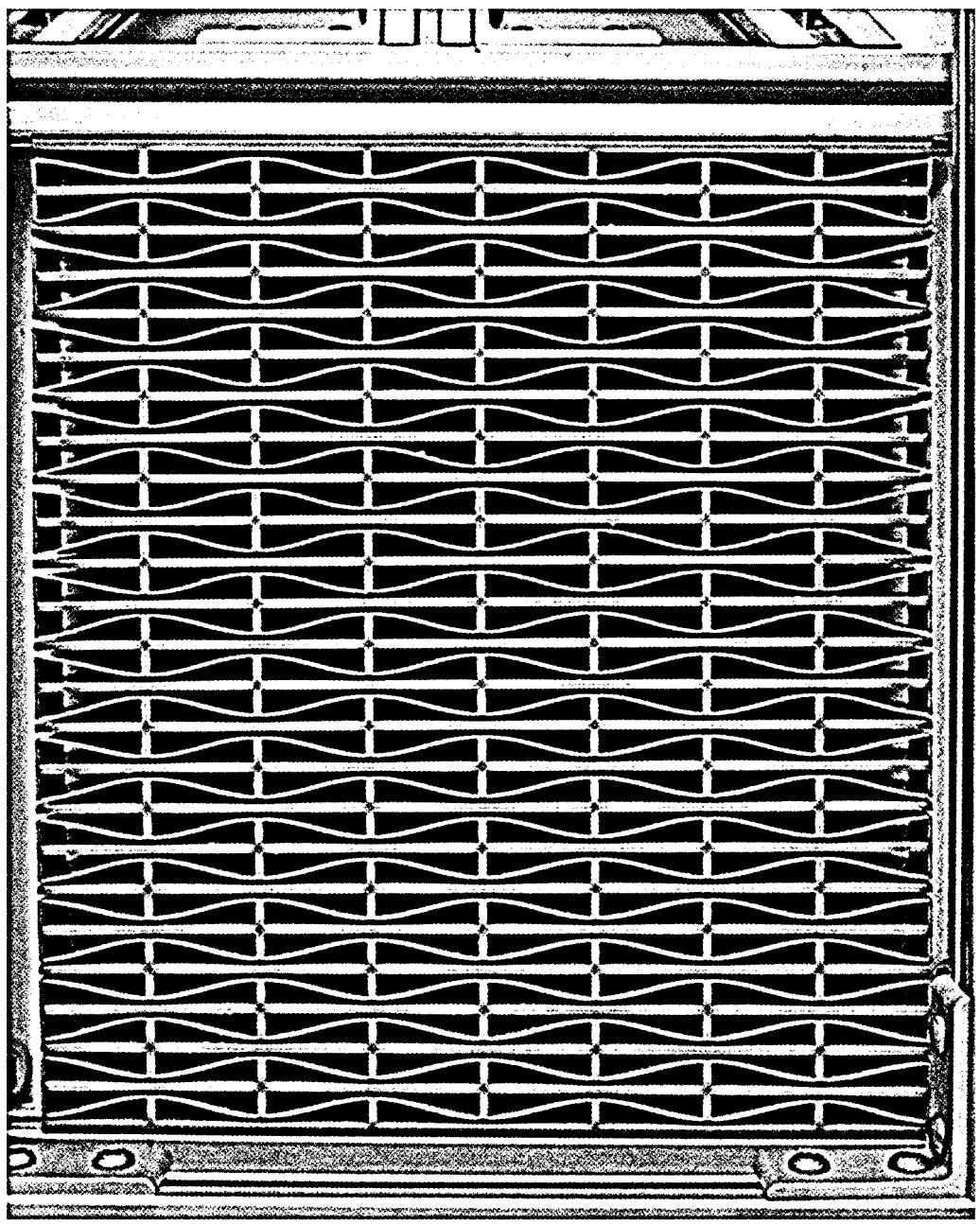
FIG. 18A is a plan view of a phase transforming cellular material made up of curved-beam bistable unit cells.
Figure 18B:
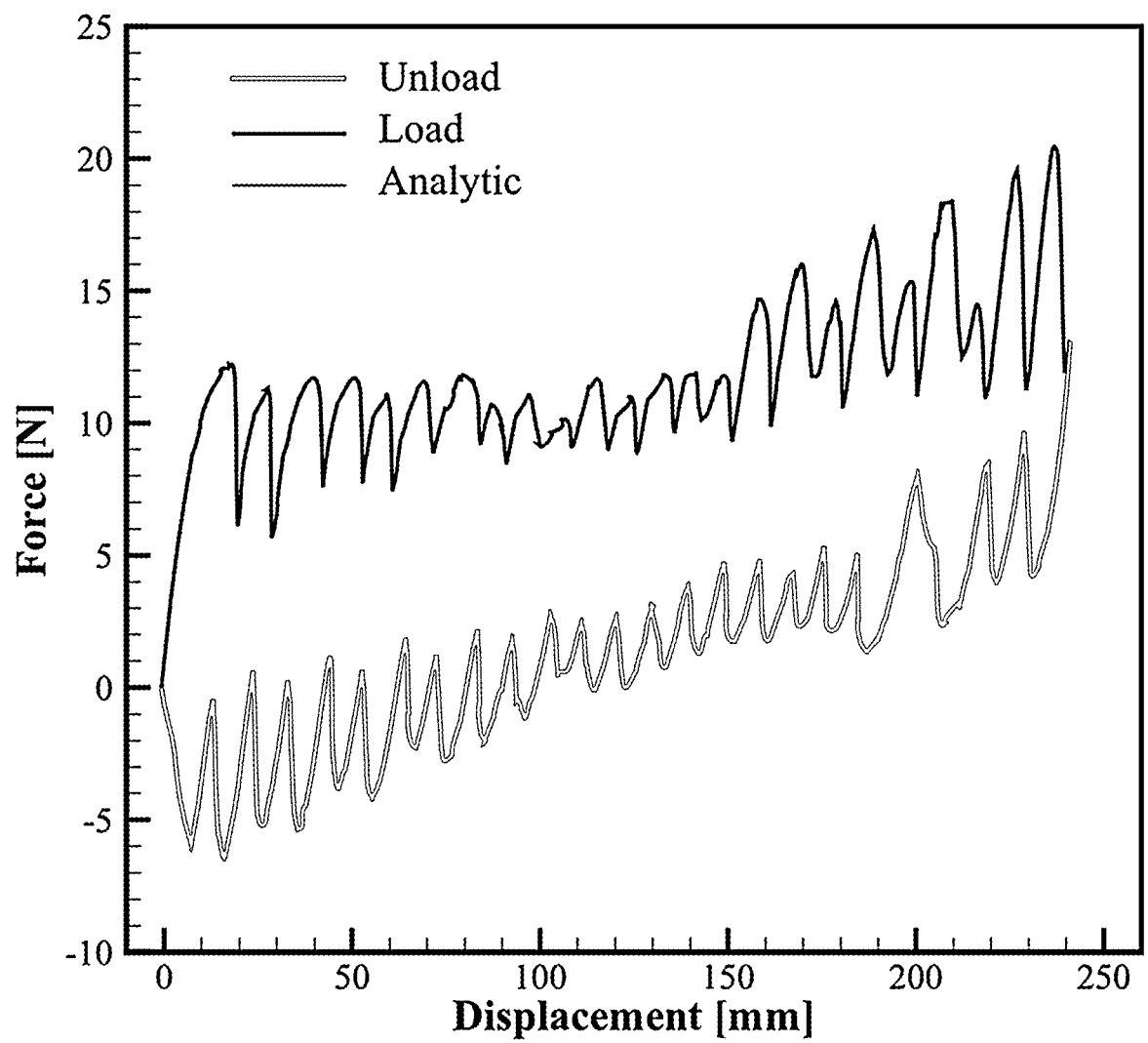
FIG. 18B graphically illustrates the force/displacement relationship of FIG. 18A during loading and unloading.

FIG. 16D-16E illustrate a comparison between experiments and simulations for a multistable programmable material. In general, good agreement was found between simulations and the experiment. The geometry of the unit cell was designed such that the experiment can be run in compression and consists on a single curved beam mechanism. The single beam mechanism produces metastable behavior; therefore, the cells recovered its original size when the load was released. Another observation made experimentally (and confirmed by simulations) is that the cell transformation from one state to the other takes place one row at the time. The geometry of the unit cell considered for this material is given by: t=0.72 mm, b=10 mm, λ=60 mm and A=5.04 mm, T=1.08 mm. Using the same parameters for the base mechanism, a bigger material consisting of 12×4 cells was printed and tested for loading and unloading (see FIG. 18). This material exhibited hysteresis as predicted by the use of equation 7. Also, a damping ratio of 7% was calculated for the experiment using equation 9.

Thermal-Induced Recovery Phase Transforming Cellular Materials

Phase transforming cellular materials (PXCMs) are a subset of the architectured materials discussed above whose unit cells have multiple stable configurations and can absorb energy by allowing non-equilibrium release of stored energy through controlled elastic limit point transitions as the cells transform between different stable configurations. Prior art materials with elastic limit point transitions have focused on material behavior under mechanical loading. The forward transformation in these materials always happens under an applied mechanical load, while the reverse transformation can be driven either by elastic energy stored in the material during the forward transformation (metastable PXCMs) or by an external force acting in the direction opposite to that of the force applied during the forward transformation. The novel PXCM differ insofar as the forward transformation still happens under an external applied force but the reverse transformation is driven by a thermal stimulus (see FIGS. 17A-17E AND 19A-19K). A family of bi-material PXCMs exhibiting this behavior is discussed below. FE simulations in addition to examples of 3D printed samples illustrate the underlying mechanics.

The novel PXCMs may be envisioned as programmable metamaterials that can mimic the shape memory effects of Shape Memory Alloys (SMAs), and which may be tuned to have geometrical phase transformation through physical stimulus. Having tunable phase transformation enables these materials applications of actuation, energy harvest, and energy dissipation. Temperature variation on thermal PXCMs changes their heterogeneity, triggering phase transformation in addition giving rise to shape memory effect. Therefore, thermal PXCMs have potential on creating auction and energy harvest devices. Many studies have been investing manmade metamaterials to achieve this shape memory effect.

Thermal PXCMs Design

To mimic the shape memory effect of SMAs, three thermal PXCMs designs have been identified based on 1D PXCMs. Each unit cell contains a bent beam, stiffer walls at center, ends and center (see FIG. 17A). The shape of the bent beam is described by the expression $$Y = \left(\frac{A}{2}\right)[1 - \cos(2\pi X/\lambda)] \quad (10)$$

Q=A/t determines the bistability each unit cell. A force may be applied to a unit cell to cause it to transform from Phase I into Phase II. When Q>2.31, release this force, the bent beam remains in the Phase II. When Q<2.31, the bent beam recovers back to Phase I. Distinct from 1D PXCMs, bistability of thermal PXCMs is not only depends on the geometry properties but also surrounding temperature. At low temperature, thermal PXCMs are bistable and at high temperature, they are metastable. Therefore, thermal stimulus can trigger phase transformation.

All three designs are composed of two types of base material with different thermomechanical properties. Most portion of a unit cell is made of a material ($M_1$) which is not sensitive to the thermal stimulus. A small portion of the mechanism is made of the material ($M_2$) whose mechanical properties reduce dramatically when the temperature increases. $M_1$ and $M_2$ have similar mechanical properties at the low temperature. As the result, although PXCMs comprise two types of materials, they are approximately homogeneous at low temperature. Therefore, at low temperature, Q is still the factor that governs bistability of thermal PXCMs. When Q>2.31, thermal PXCMs can be bistable at low temperature. While temperature increasing, the mechanical properties of two materials departure rapidly. Once the temperature exceeds a critical value, the mechanical properties $M_2$ become quite low compared with $M_1$. This heterogeneity of the materials causes the mechanism becomes metastable.

Analytical Model

The analytical model is helpful to understand and design the Type III thermal PXCMs which can recover at desired temperature. It is created based on the analytical model of 1D PXCMs (FIGS. 17A-17E and 19A-19K). Type III thermal PXCMs comprise a numerous of periodically arranged unit cells. Each unit cell is composed of a bent beam and stiffer walls at bottom, top, and ends. $M_2$, which is assigned on the boundary stiffer walls, has the elastic modulus varies rapidly with temperature. It provides different levels of transitional constraints based on the temperature. Therefore, the unit cell of type III thermal PXCMs is modeled as a bent beam with one end clamped and the other end series connected with a translational spring. The stiffness of this translational spring varies from rigid to zero when temperature increase from low to high. When the stiffness of the translational spring approaches infinity, the model is equivalent to a bent beam with clamped-clamped boundary condition, which is the analytical model of 1D PXCMs. When the stiffness of the translational spring approach to zero, the model is equivalent to a bent beam clamped at one end and free to extend at the other end. The force-displacement relation of type III thermal PXCMs are shown. The performance of mechanism under mode 1 and mode 3 are given as $F_1$ and $F_3$-d relations. N is dimensionless parameter after normalizing the axial force. c is the coefficient that describes the stiffness of translational spring provided to the unit cell. $F_1$ depends on both parameters Q and C. $F_3$ is only linear depends on d. The intersections between $F_1$-d and $F_3$-d are where the mechanism switch from mode 1 to mode 3. When the translational spring stiffness $k_s$ approaches to be rigid, c becomes infinitely close to 1. When c decreases, the bistability of the unit cell decrease.

Design Based on Analytical Model

Under the temperature when two materials have similar mechanical properties, the parameter determines the bistability of thermal PXCMs is Q, which is same for 1D PXCMs. Under other temperatures, c is the parameter determines bistability of thermal PXCMs. There is a critical value c at the point when a bistable mechanism transfers into a metastable mechanism. This critical value is defined as the parameter $c_{critical}$. Every Q of a bent beam has a $c_{critical}$ value which captures the transition from bistable to metastable. FEA and analytical models are used to obtain the $c_{critical}$ corresponding to different Q. They are plotted together in FIG. 19E and show agreement.

For a bent beam with given Q, the temperature of any geometry and thermomechanical combinations of bent beam and stiffer walls that satisfies $c=c_{critical}$ is the recovery temperature.

$$F_1 = \sum_{j=1,5,9,13\ldots}^{\infty} \frac{4(N^2 - N_1^2)}{N_j^2(N^2 - N_j^2)^2} F_1^2 - \quad (11)$$

$$N_1^2 F_1 + \frac{N^2(N^2 - N_1^2)^2}{12Q^2 c} - \frac{N_1^2 N^2(N^2 - 2N_1^2)}{16} = 0$$

$$F_2 = \frac{1}{\sum_{j=1,5,9,13\ldots}^{\infty} \frac{8}{N_j^2(N_2^2 - N_j^2)^2}} \left(\frac{N_2^2}{N_2^2 - N_1^2} - \Delta\right) \quad (12)$$

$$F_3 = \frac{1}{\sum_{j=1,5,9,13\ldots}^{\infty} \frac{8}{N_j^2(N_3^2 - N_j^2)^2}} \left(\frac{N_3^2}{N_3^2 - N_1^2} - \Delta\right) \quad (13)$$

$$N^2 = \frac{pl^2}{EI} \quad (14)$$

$$c = \frac{1}{k_a/k_s + 1} \quad (15)$$

Experiments and FEA Validation

Figure 19A:
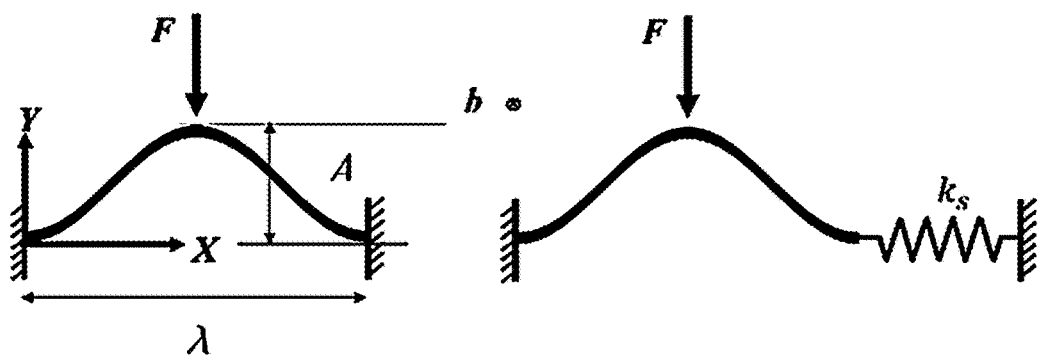
FIG. 19A-K graphically and schematically illustrate the properties of thermal phase transforming cellular materials.
Figure 19B:
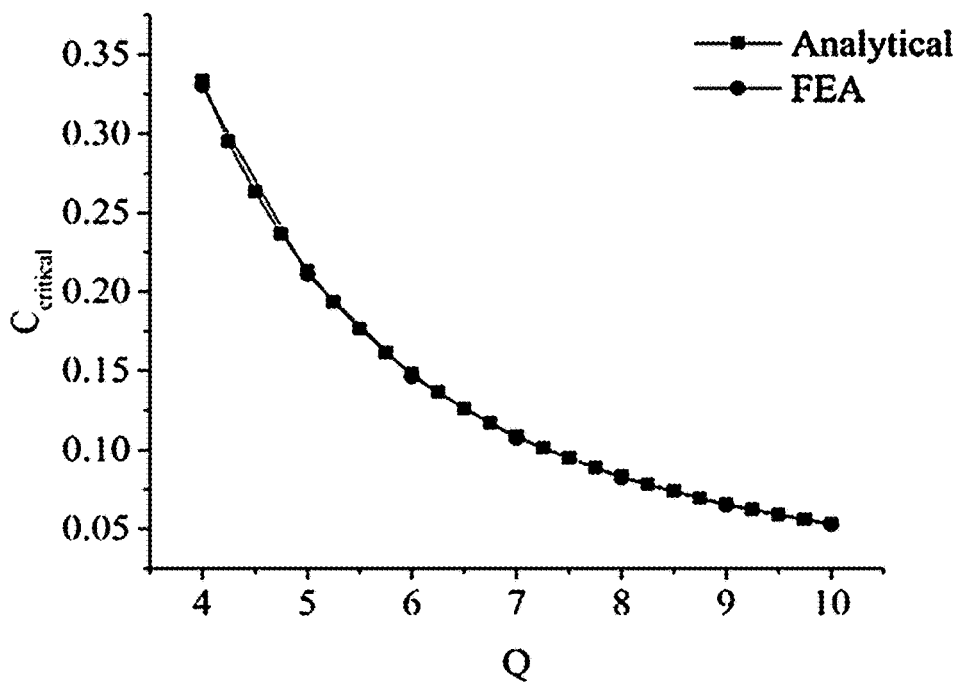
Figure 19C:
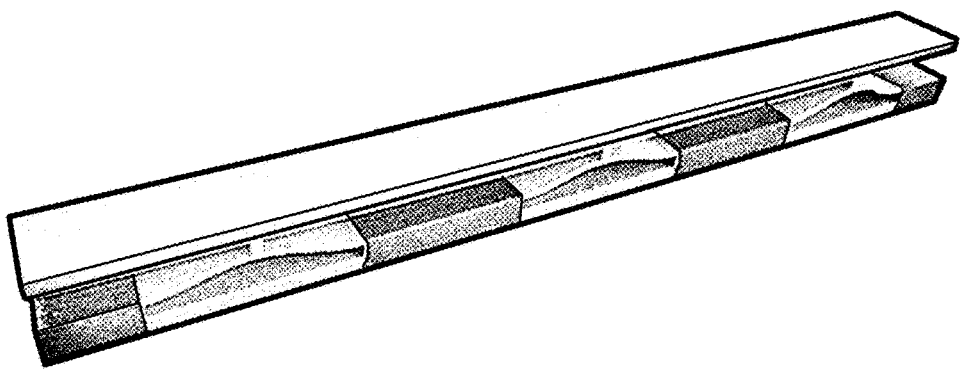
Figure 19D:
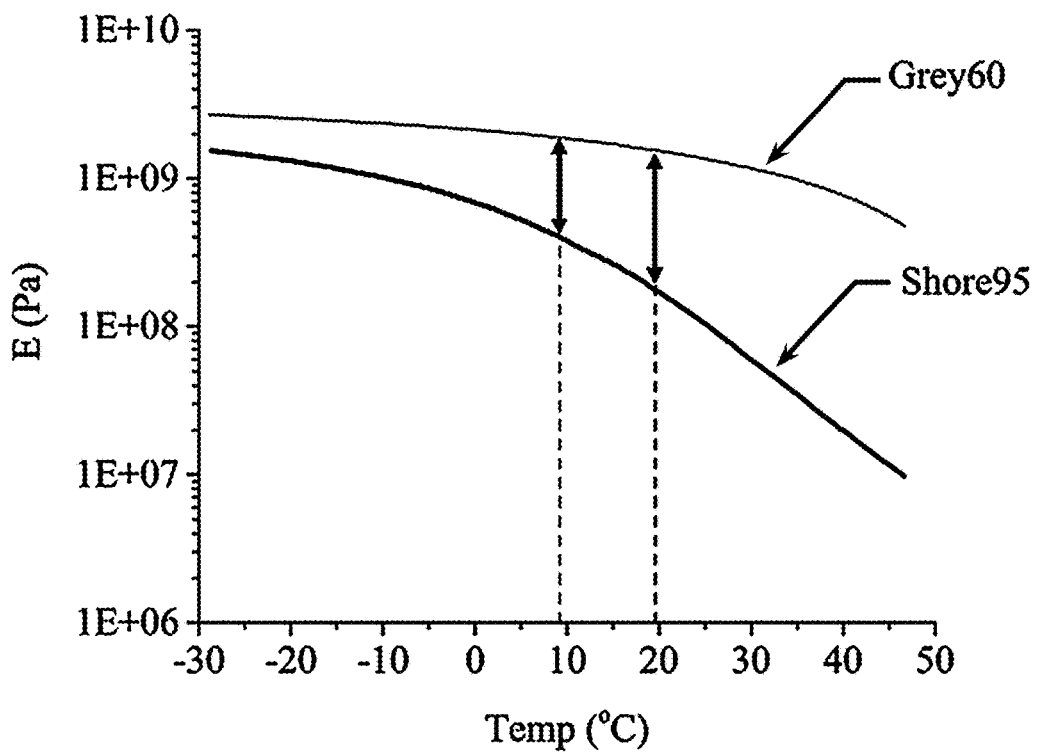
Figure 19E:
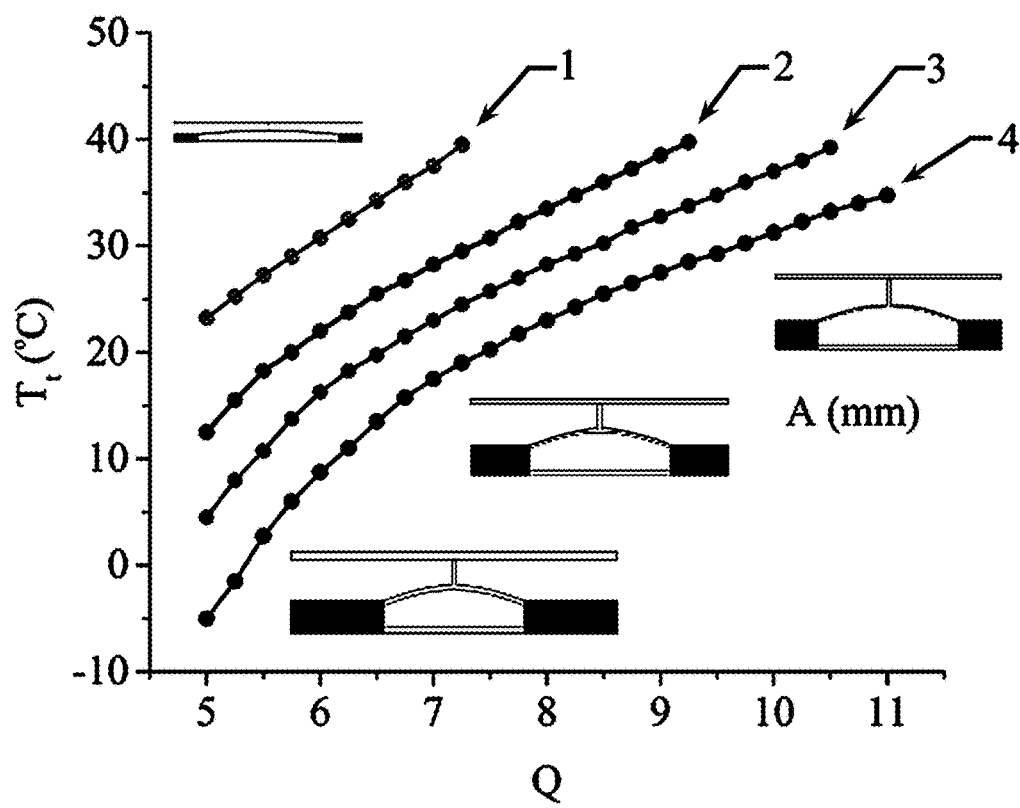

The analytical equations suggest that for given materials $M_1$ and $M_2$, type III thermal PXCMs can be designed to have shape memory effect. The recovery temperature depends on the $c_{critical}$ which is determined by the geometry details of bent beam and stiffer walls. To evaluate this design concept, FEA simulation and experiment are conducted on a prototype (FIG. 19C). Grey 60, which has less sensitivity to the temperature variation, is used as $M_1$. Shore 95 is used as $M_2$ since its elastic modulus decreases rapidly when temperature increases (FIG. 19D). FIG. 19E illustrates how thermal PXCMs with same wavelength and different amplitude to recovery at different temperature by using these two materials. More examples are demonstrated in supplementary materials.

Figure 19F:
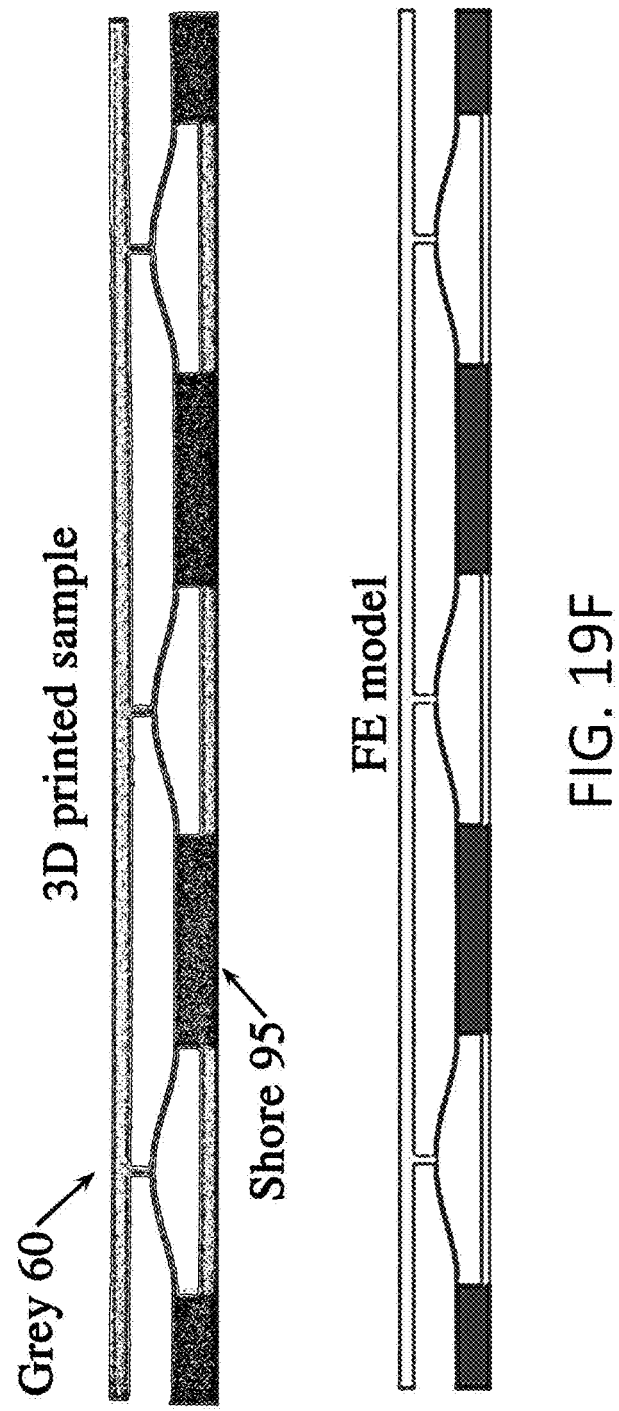
Figures 19G, 19H, 19I, 19J, 19K:
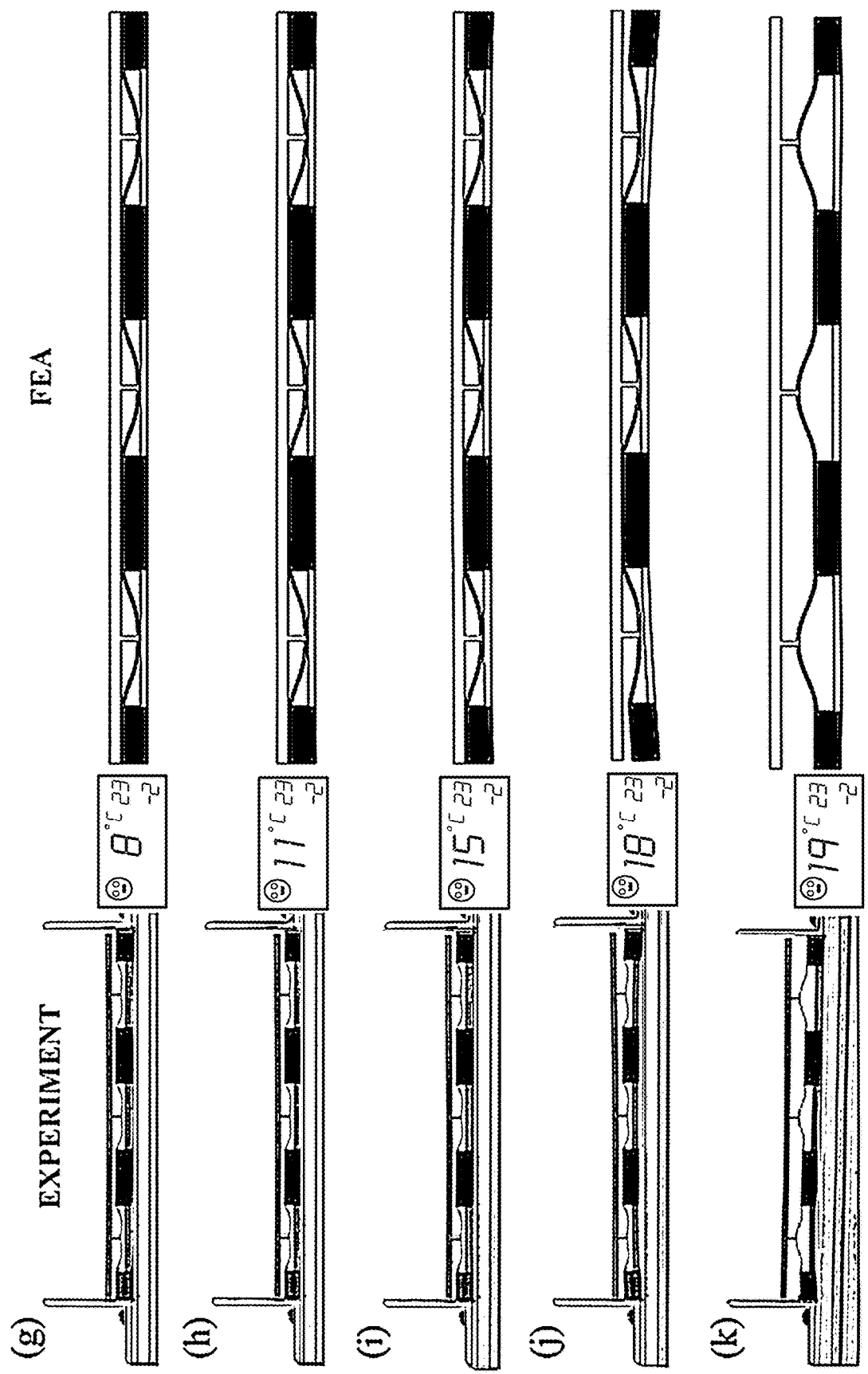

The prototype was fabricated by multi-material polymer printer. Both FE model and specimen are shown in FIG. 19F. We design the recovery temperature of this specimen is 18° C. The thickness of the stiffer walls are designed to ensure $c=c_{critical}$ at this recovery temperature 18° C. The specimen is placed on an aluminum 8020 frame. Two L shape angles are fixed on both side of the specimen to eliminate the move in X direction. The testing procedure is as show as follow, (1) Compress the prototype to transfer from Phase I to Phase II under 8° C. (2) Let the sample remains in Phase II under the same temperature for 10 minutes to eliminate the shape recovery effects from viscosity. (3) After 10 minutes increase temperature gradually to 22° C. FE simulation and experiments are shown from FIG. 19G-19K. As expected, the specimen can remain bistable for 10 minutes at 8° C. Therefore, viscosity of base materials did not play the role in recovery. As temperature increase, there are no obvious recovery could be observed. When the temperature increases to 18° C. the bottom stiffer bar of the prototype started to lift and eventually at 19° C. the specimen is fully recovered.

Thermal PXCMs exhibit shape memory effects from both FEA simulation and experiment. Furthermore, we investigate whether thermal PXCMs can be used as thermal-actuator devices like SMAs. FIG. 20A shows the F-d relation of a thermal PXCM unit cell under the temperature varies from 5 to 30° C. It is observed that the valley force $F_v$ increases from negative to positive when temperature increases. At 15° C., the unit cell becomes metastable and $F_v=0$ N. If a weight W is applied on the unit cell, the transition would happen when the $F_v=W$ N. Therefore, higher temperature is required to achieve phase transformation if a unit cell under a dead load.

The weight a mechanism can lift is equivalent to the valley force of a type III thermal PXCMs under the recovery temperature. A test procedure is facilitated as below.
1. Transfer a thermal PXCM unit cell from $BP_1$ to $BP_2$ under an initial temperature where two materials have relatively close mechanical properties.
2. After the mechanism transformed, released the force.
3. Applying a weight to the unit cell.
4. Increase the temperature until the mechanism recovery with the weight block.
5. Applying the force on a mechanism under this recovery temperature
6. Record the valley force $F_v$ of the mechanism under this recovery temperature
7. Compare the applied weight W and valley force $F_v$.

Figure 20B:
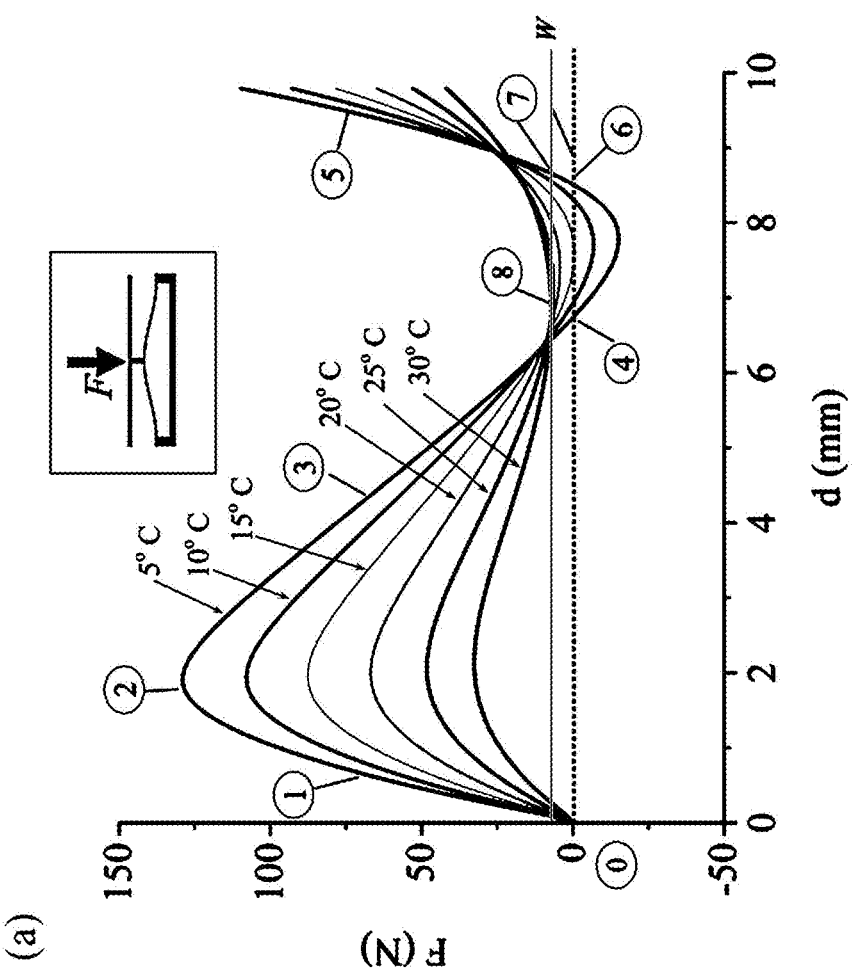
FIG. 20B schematically illustrates the force-displacement relationship of FIG. 20A over a range of temperatures.
Figure 20A:
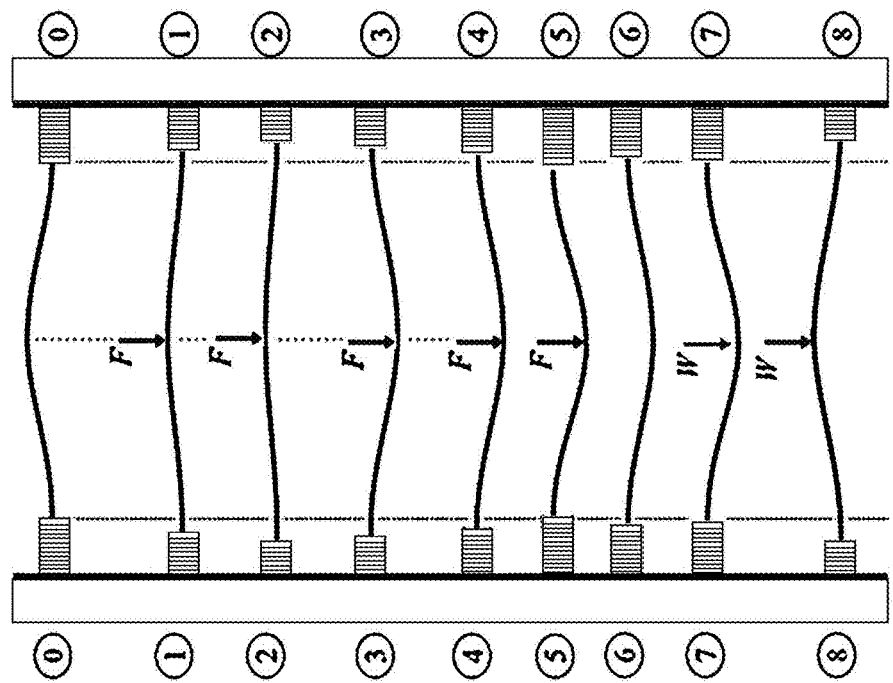
FIG. 20A graphically illustrates the force-displacement relationship of a thermal phase transforming unit cell over a range of temperatures.

FIG. 20B demonstrates how the stiffer walls response during this process. At point 0 stiffer walls are located at an original position. When the force applied to the mechanism, the stiffer walls are compressed due to the axial force during the phase transformation. The contraction of stiffer walls reaches the maximum value (point 2) at the peak load $F_p$ and then started to reduce. From point 3 to 5, the axial force caused by phase transformation reduces therefore the deformation of stiffer walls release gradually. When the force is released, the stiffer walls are compressed more to hold the bent beam in $BP_2$. When a weight is applied, the stiffer walls become less compressed. When the temperature increases the deformation of the stiffer walls increase again because reduction of the stiffness. Eventually, the mechanism will recovery back to its original configuration since not enough constrain can be provided from the stiffer walls. This process happened by changing the stiffness of the constraints.

Figure 20D:
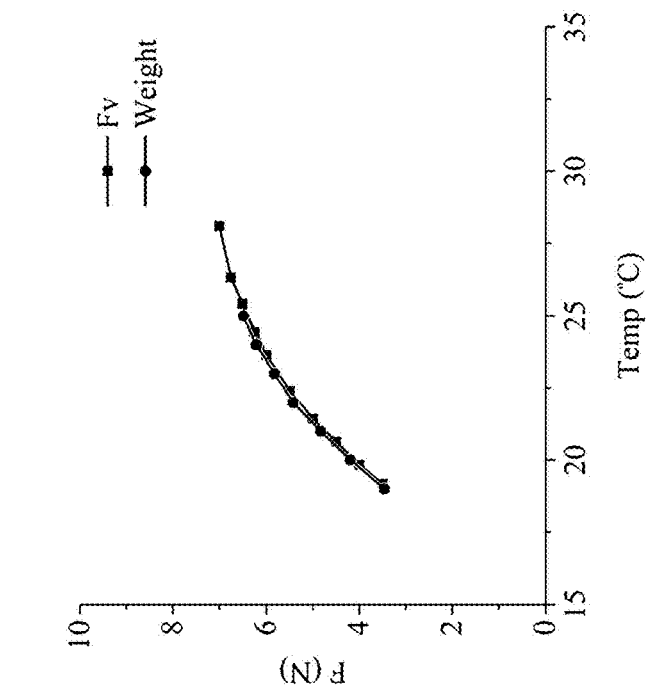
FIG. 20D graphs the temperature-force relationship for Fv.
Figure 20C:
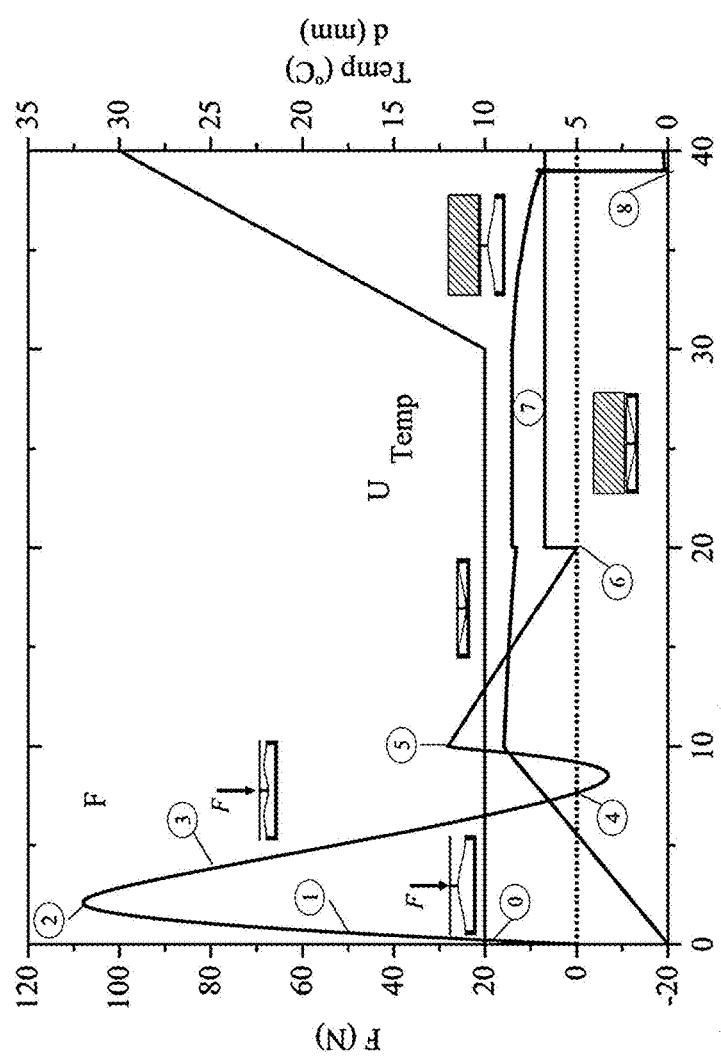
FIG. 20C graphically illustrates the force/time/temperature interrelationships for a thermal phase transforming unit cell.
Figure 22:
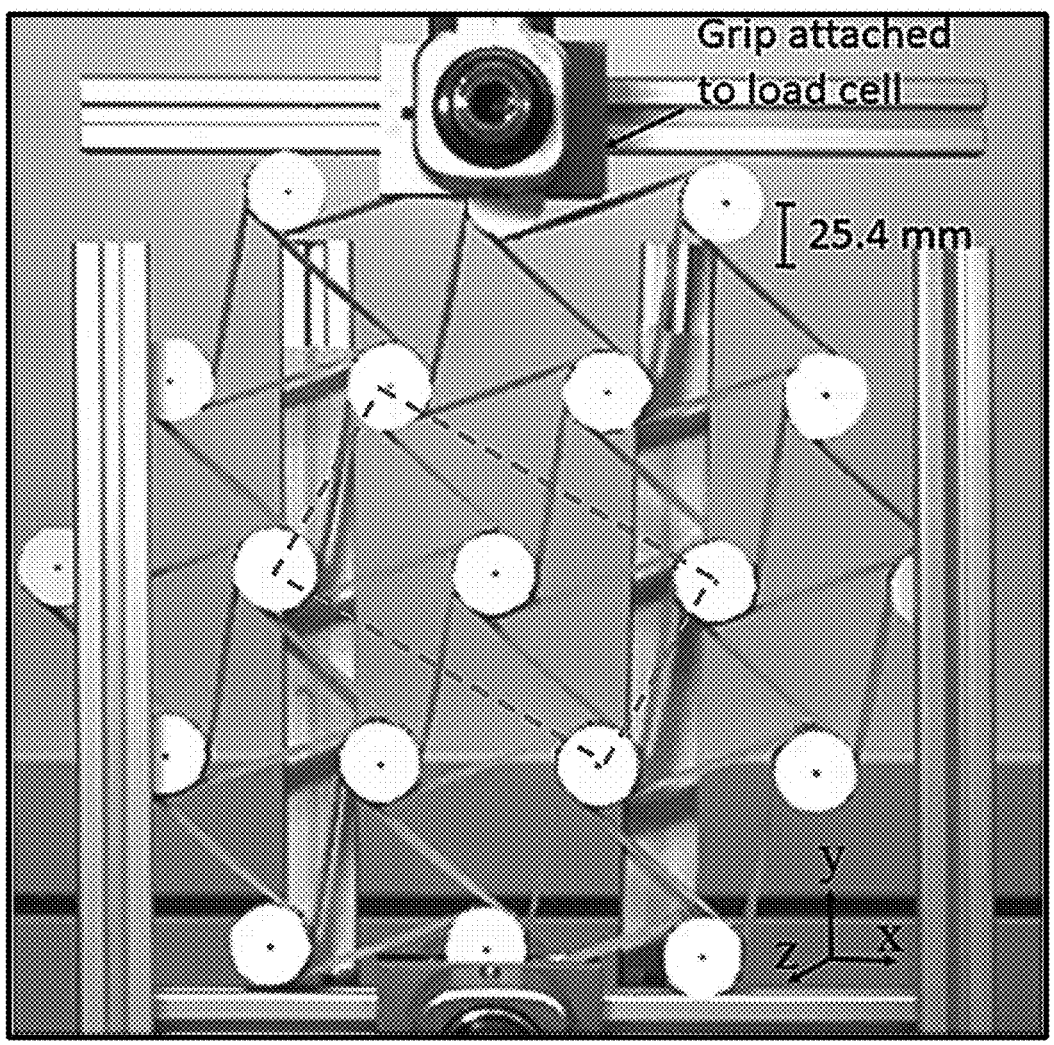
FIG. 22 is a view of a displacement measuring device for chiral PXCMs.

A number of simulations are created followed by this test procedure are shown in FIG. 20D. The valley forces of the mechanism under different temperature are plotted by the red dots and the weights of a mechanism can lift among different temperature are plotted by black dots. The two curves almost overlap each other.

Chiral Honeycombs with Phase Transformations

A phase transformation in a cellular material corresponds to the change in geometry of its unit cell from one stable configuration to another stable (or metastable) configuration while keeping its original topology. The capability of a cellular material to undergo phase transformation is attained mainly by a proper choice of an elastic base material and the topological and geometrical design of the unit cell in order to allow the elastic reversibility of the transformation. Cellular materials that exhibit phase transformations show hysteresis and their response is characterized by long, serrated loading and unloading plateaus, making these materials attractive for energy absorption applications. In this section, a new class of phase transforming cellular material (PXCM) based on a hexachiral motif is introduced and discussed. In this new PXCM, the ligaments of a regular hexachiral honeycomb are replaced by segments of cylindrical shells. These segments themselves exhibit a metastable snap-through under compression. The energy dissipation behavior of PXCMs with ligaments that only exhibit elastic buckling has been shown to exhibit size dependence—the dissipation behavior is only seen in samples that comprise a minimum number of unit cells. Unlike these PXCMs, the PXCMs presented in this work use the inherent snap-through behavior of their ligaments to exhibit energy dissipation behavior even in samples as small as one unit cell. The hexachiral PXCMs presented here also constitutes a material that exhibits phase transformation in any loading direction in the plane of the sample, thereby corresponding to the first real 2D PXCM. The novel PXCMs are approached with a combined framework that includes analytical, experimental and computational analysis. From these analyses, the hexachiral PXCM was been observed to exhibit energy dissipation and hysteresis without dependence on size effects or plastic deformation. In addition, the hexachiral PXCM requires a relatively low plateau stress in order to achieve relatively large energy dissipation, giving this material a new location on the Ashby Plot.

Architectured materials known as phase transforming cellular materials are composed of periodic unit cells, each of which consisting of a compliant snapping mechanism that can be metastable or bistable. The load-displacement behavior of each constitutive unit cell is characterized by three fundamental regimes bounded by two limiting points, $(d_I, F_I)$ and $(d_{II}, F_{II})$ known as the critical displacements and loads. Regimes I and III of a unit cell display a positive stiffness, since these two regimes represent the material undergoing deformation whilst in its stable configurations. These stable configurations correspond to a local minima of the potential energy in the unit cell. Regime II displays a negative stiffness which corresponds to the unit cell transitioning between the limiting points mentioned above.

Each of the unit cells in a PXCM utilize the snap-through instability of its constituent mechanism. A snap-through instability is a phenomena which is only achieved by structures that exhibit snap-back upon loading. Snap-back occurs when a structure experiences a reversal in displacement along with a reduction in equilibrium force, which is required by the material to induce a phase transformation. The instabilities induced in PXCMs such as these allow these materials to dissipate energy over the course of a loading and unloading cycle. However, in order to achieve snap-through and thus energy dissipation, the effective stiffness of the portion of a PXCM in regimes I and III must satisfy the following condition:

$$\left(\frac{n_I}{k_I} + \frac{n_{III}}{k_{III}}\right)^{-1} \leq |k_{II}| \tag{16}$$

where $n_I$ is the number of unit cells in regime I, $k_I$ is the stiffness of each unit cell in regime I, $n_{III}$ is the number of unit cells in regime III, $k_{III}$ is the stiffness of each unit cell in regime III, and $k_{II}$ is the stiffness of each unit cell in regime II. Thus, there is a size effect imposed on previous PXCM that effects whether or not they can dissipate energy. Size effects in previous PXCM geometries can also effect plasticity and fracture. In addition, the performance of previous PXCM geometries depended greatly upon the choice of loading direction. However, the dependence on size effects comes from the choice of the PXCM topology as well as the snapping mechanism.

Herein, an isotropic phase transforming cellular material known as the hexachiral PXCM is introduced. The hexachiral PXCM (h-PXCM) utilizes a periodic, chiral topology which consists of a network of unit cells arranged in a hexagonal pattern. Topologies, such as that of the chiral honeycomb, which are isotropic and auxetic along any loading direction. The unit cell consists of cylindrical supports connected via six cylindrical shell ligaments, which are equipped with a transverse curvature orthogonal to the axis along their length. The cylindrical shell ligaments are the snapping mechanisms utilized by the h-PXCM, which can exhibit snap-through instabilities elastically without any dependence upon size effects. The ligaments were rigidly constrained to the supports at their points of contact. The supports were left free to move and rotate only in response to load applied to the ligaments. It is interesting to note that each support was connected rigidly to six ligaments, three of which were oriented concave up, while the other three were oriented concave down. This was done to ensure that the h-PXCM would consist of identical, repeating unit cells.

The Hexachiral PXCM

Geometry and Dimensionless Groups

The general geometry of the h-PXCM unit cell (FIG. 21B) is governed by several physical parameters including: the radius of the supports, r, and the length, L, the angle of curvature, θ, the thickness, t, and the radius of curvature, R, of the ligaments. However, by utilizing the Buckingham Pi Theorem, the physical description of the h-PXCM could be generalized to the following two dimensionless parameters: $\pi_1=L/\rho$, $\pi_2=r/L$, which are termed the slenderness ratio and the ratio of circular support respectively. The slenderness ratio is the relationship between the length of the ligaments and their radius of gyration, ρ. The radius of gyration is given simply as: $\rho=\sqrt{I/A}$, where I is the moment of inertia of the cylindrical shell ligament and A is the cross-sectional area of the ligament.

The h-PXCM exploits the snap-through instability of cylindrical shell ligaments under uniform bending, which can be observed graphically in FIG. 21F with the solid black arrows. Cylindrical shell ligaments can snap-through without any dependence on size effects. However, a cylindrical shell ligament with its cross-section oriented concave down and bending shown in FIG. 1d will not exhibit snap-through when subject to uniform bending. Conversely, a similar cylindrical shell ligament with an identical orientation but opposite bending presented in FIG. 21E will exhibit snap-through. In response to a global compressive loading, the cylindrical shell ligaments of the h-PXCM will experience snap-back and consequentially snap-through without any dependence on size effects or loading direction since the material is isotropic. Structures such as the h-PXCM which consist of snapping mechanisms that phase transform will exhibit irreversible energy dissipation over the course of a loading and unloading cycle as well as non-smooth changes in over-all volume. It is interesting to note that for the purpose of these analyses, the cylindrical shell ligaments were assumed to be under uniform bending.

EXAMPLES

To investigate the energy absorbing capabilities of the h-PXCM, two samples were subjected to loading and unloading cycles under displacement control in an MTS (Materials Testing System) machine using a 10 kN load cell. One sample was fabricated using a tape measure for the cylindrical shell ligaments. Flat steel sheets were used to fabricate flat ligaments for the second sample. The supports for both models were cut from hollow cylindrical aluminum beams. The flat and cylindrical shell ligaments were all made of steel. The flat ligaments were approximately 80 mm by 19 mm and had a thickness of 0.23 mm. The cylindrical shells had a length of 80 mm, a radius of curvature of 11.25 mm, an angle of curvature of 106 degrees, and a thickness of 0.17 mm. The ligaments were screwed into steel cylinders at the appropriate angles to create a hexachiral structure. The cylindrical supports for both models had an outer diameter of 25.4 mm and an inner diameter of 20.32 mm.

Figure 23B:
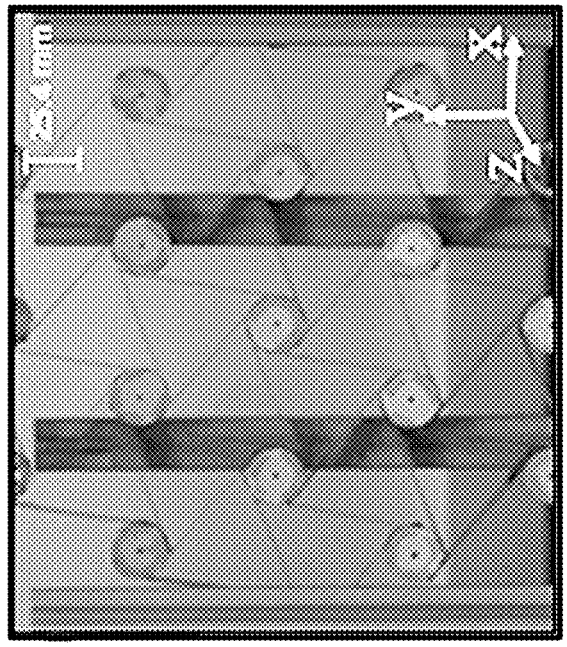
FIG. 23B illustrates a flat ligament h-PXCM array prior to displacement testing.
Figure 23D:
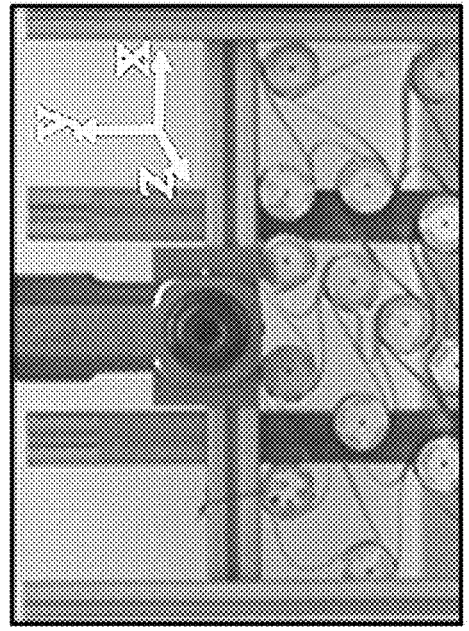
FIG. 23D illustrates a flat ligament h-PXCM array after displacement testing.
Figure 23A:
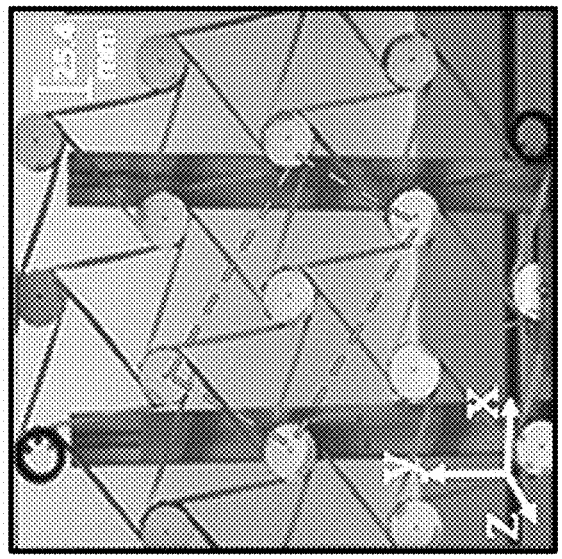
FIG. 23A illustrates a cylindrical shell ligament h-PXCM array prior to displacement testing.

These experimental samples can be viewed in FIG. 23A-23B. Each h-PXCM sample was placed on top of an 8020 beam, which was held in place by a grip, which was itself rigidly attached to the bottom of the MTS machine (not shown). An 8020 beam was placed on top of the sample, which was connected to the 10 kN load cell (not shown) via a grip. Two 8020 beams were placed on the front and back faces of the PXCM and were secured in place via connections to the bottom 8020 beam for the purpose of avoiding out of place buckling in the sample. These beams also made it possible to experiment with a roller connection between the cylindrical supports of the PXCM samples and the top and bottom 8020 beams. Since the hexachiral PXCM was metastable and deformed elastically, no connections were made between the top and bottom 8020 beams and the sample. A strain rate of 1 mm/min was applied to the top of each h-PXCM sample during the tests.

Figure 23C:
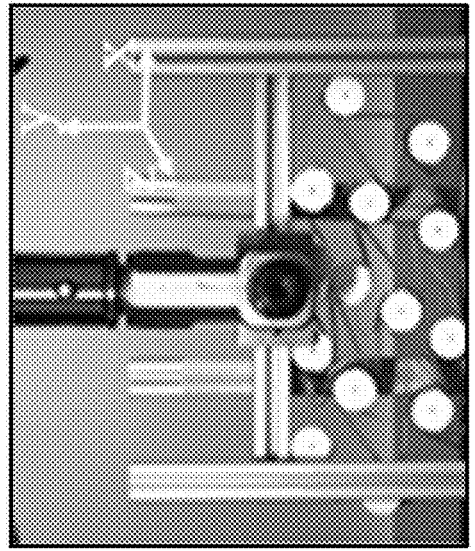
FIG. 23C illustrates a cylindrical shell ligament h-PXCM array after displacement testing.

The cylindrical shells composing the h-PXCM in FIG. 23A exhibited snap through instabilities and as a result hysteresis, which can be observed in FIG. 23C. These instabilities are the result of each cylindrical shell ligament bending in response to the global loading applied by the MTS machine, which allows the material to dissipate energy. In the case of the sample shown below in FIG. 23A, the energy dissipated (extracted from the load displacement curve shown in FIG. 23E) was found to be approximately 815 mJ, which was approximately 34.5% of the energy that was put into the system upon loading. The flat ligament h-PXCM shown in FIG. 23B did not exhibit snap through behavior. However, the sample was observed to dissipate approximately 2086 mJ of energy, which was approximately 18.4% of the energy that was put into the system upon loading.

Figure 23F:
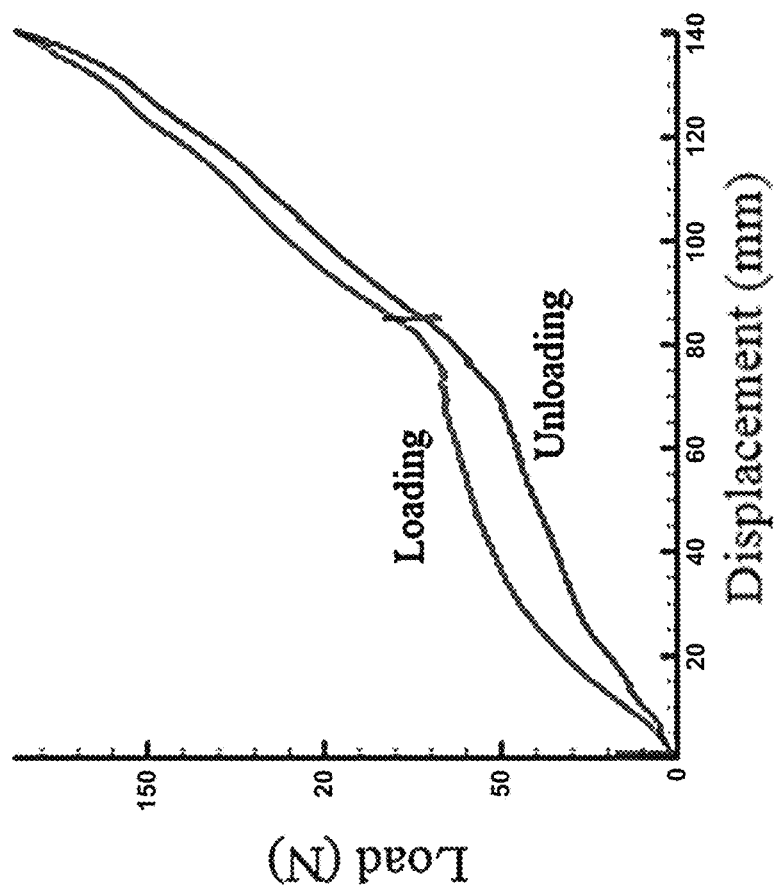
FIG. 23F graphically illustrates the load/displacement relationship for FIGS. 23B, 23D under loading and unloading.
Figure 23E:
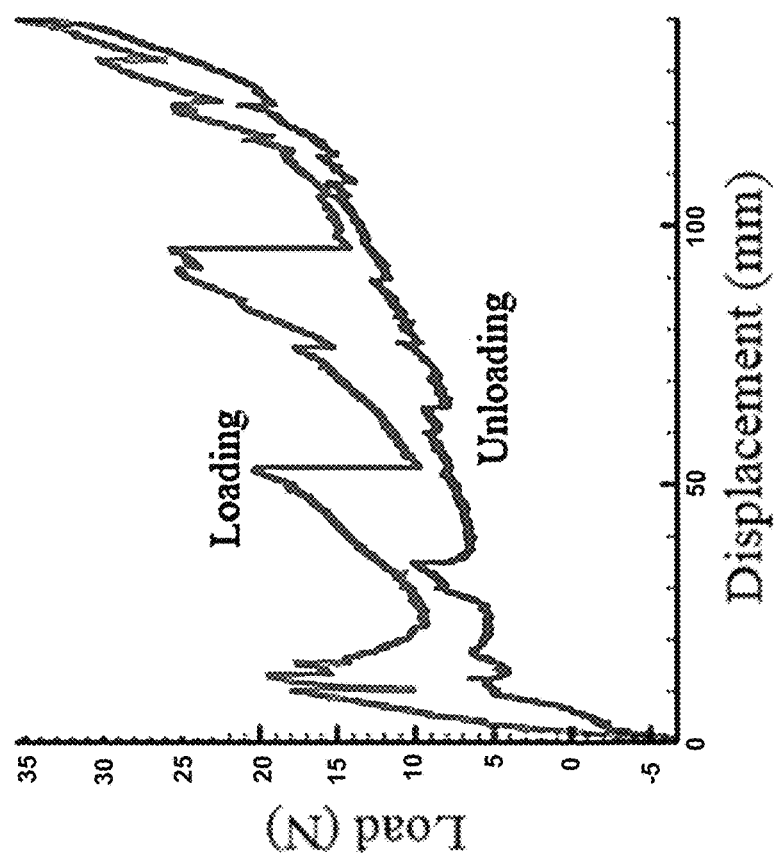
FIG. 23E graphically illustrates the load/displacement relationship for FIGS. 23A, 23C under loading and unloading.

Under ideal conditions, the flat ligament h-PXCM structure would not dissipate energy and any hysteresis exhibited by the load displacement curve shown in FIG. 23F is not due to instabilities within the structure, but rather due to friction between the experimental model and the MTS machine. The same errors also occur within the h-PXCM with curved ligaments, however, under ideal conditions this model would still exhibit snap-through instabilities resulting from the cylindrical shell ligaments phase transforming. These phase transformations are the result of irreversible energy dissipation by the material accompanied with a non-smooth change in volume upon loading and unloading. These experiments demonstrated that an h-PXCM design composed of cylindrical shell ligaments equipped with a non-zero curvature will have a larger percentage of energy dissipated than an equivalent h-PXCM design equipped with flat (zero-curvature) ligaments. For the purpose of further analysis, a parametric analysis was performed on the h-PXCM unit cells energy dissipation capabilities.

In addition, several other designs were tested such as the tetra-antichiral PXCM and the tetra chiral PXCM. Fundamentally, hexachiral geometry was chosen since this structure exhibited no plastic deformation after several loading and unloading cycles, while the other two geometries mentioned above did exhibit plastic deformation over the course of multiple loading and unloading cycles.

Finite Element Models and Parametric Analyses

To support the experimental results displayed in the previous section, a parametric analysis of the energy dissipating capability of the h-PXCM unit cell was performed using a series of twenty-one finite element (FE) models, which were designed using the two dimensionless parameters $\pi_1$ and $\pi_2$. For each of the models, the curvature was held constant, in addition to the length of the ligaments. The mass, radii of the cylindrical supports, and the angles of curvature of the cylindrical shell ligaments were varied by model. Each unit cell FE model was constructed using S4R shell elements and steel as a base material for the cylindrical shell ligaments. The cylindrical supports were modeled with a higher elastic modulus than steel to ensure that the supports were more rigid than the ligaments. A schematic of an example h-PXCM unit cell FE model can be seen in FIG. 1b. Periodic boundary conditions were applied appropriately to the unit cell FE models through the use of a dummy node that was not part of the model geometry. Whatever boundary conditions that were applied to the dummy node, were also applied in a similar way to the FE models. Additionally, it is interesting to note that the global angle considered for the finite element simulations was different than that of the repeated unit cells in the experimental samples displayed in FIG. 2a-b. The orientation of the h-PXCM unit cell FE models was chosen to simplify the unit cell modeling process. Additionally, the orientation of the h-PXCM experimental samples was chosen since this was the easiest orientation for testing in the MTS machine.

Figure 24:
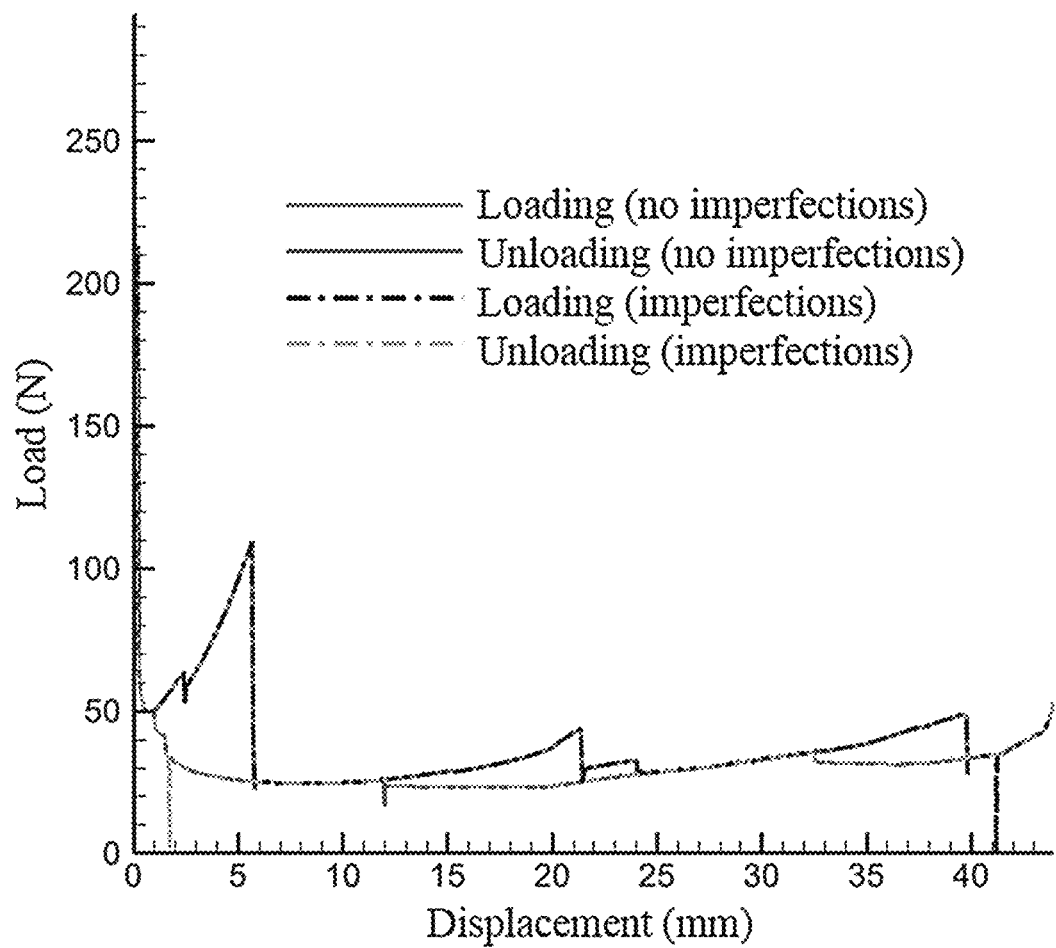
FIG. 24 graphically illustrates the load-displacement relationship for FIG. 21B for loading and unloading with and without applied frequency mode imperfections.

Violent snapping occurred when the cylindrical shell ligaments in the unit cell FE models were loaded and exhibited snap-back and snap through. These violent events would often cause the simulations to crash due to the requirement of a small time increment, thus imperfections were applied to each model in the form of a summation of the first fifteen modes of vibration of the unit cell FE model. To do this, a frequency analysis was performed on each model to extract the modes of vibration which were then weighted, summed together, and then applied to the FE models as imperfections. The purpose of the application of these imperfections was to simulate a slightly crinkled cylindrical shell that would not buckle quite as violently upon loading as a perfect cylindrical shell ligament. To ensure that the imperfections were not drastically changing the results, an unit cell FE model that finished through a loading and the unloading simulation without the imperfections, was compared to its counterpart with the appropriate frequency modes applied as imperfections. The differences in the resulting energy dissipated and the average plateau stress was found to be negligible (FIG. 24).

From these loading and unloading simulations, the energy dissipated per unit volume by each of the unit cell FE models was as well as the average plateau stress was extracted. A strain rate of 10 mm/s was applied to the dummy node, which loaded the unit cell FE model while accounting for the periodic boundary conditions. The energy dissipated per unit volume and the average plateau load were extracted as points for each of the models with different $\pi_1$ and $\pi_2$ and plotted on an Ashby Plot to compare the h-PXCM to the energy dissipating capability of other materials under displacement control. The energy dissipated by the unit cell FE modeled without imperfections was approximately 371 mJ. The same FE unit cell model applied with the frequency mode imperfections dissipated approximately 373 mJ.

Analytical Equations

Consider an h-PXCM composed of infinitely many unit cell's. The forces and moments applied to each of the unit cell's cylindrical shell ligaments can be approximated via a free body diagram. Note that in the formulation of the analytical equations for the h-PXCM unit cell, two fundamental assumptions were made:
(1) Each cylindrical shell in the h-PXCM unit cell is assumed to bend due to compressive loads applied along the axis to the ligament length before the moments take effect.

(2) Bending occurs simultaneously in each of the cylindrical shell ligaments

The load, P that is felt by the h-PXCM unit cell under a compressive loading is given by the following general expression:

$$P=F_{lig}(-\cos(\beta+\theta')+\cos(60°+\beta+\theta!)+\sin(\beta-30°+\theta')) \quad (17)$$

Where $F_{lig}$ is the axial load, which is assumed to be equivalent in each ligament, which acts on each of the ligaments in the unit cell. The angle θ' is the global offset angle between the global coordinate system and the unit cell coordinate system. In the case of the simulated h-PXCM models θ'=30 degrees. For the experimental h-PXCM samples θ'=0 degrees.

Using these assumptions and the general expression for the load, P felt by the unit cell given in Eqn. 17, it is possible to derive an expression for the peak load of the RVE. This can be done by utilizing the Euler buckling formula, which represents load force required to bend the cylindrical shell ligaments individually. The Euler Buckling Formula is given by the following:

$$P_{crit} = \frac{\pi^2 EI}{L^2} \quad (18)$$

Where the moment of inertia, I applies to the cylindrical shell and is given as the following.

$$I = \theta t R^3 \left(1 - 2\left(\frac{\sin(\theta)}{\theta}\right)^2 + \left(\frac{\sin(2\theta)}{2\theta}\right)\right) \quad (19)$$

The load required to induce bending in each of the cylindrical shells ligaments in the unit cell, which is termed the critical load, $F_{crit}$ was acquired by substituting Eqn. 18 in for $F_{lig}$ in Eqn 17.

The resulting critical load is given as the following.

$$F_{crit}=P_{crit}(-\cos(\beta+\theta')+\cos(60°-\beta+\theta')+\sin(\beta-30°+\theta')) \quad (20)$$

In addition, an expression for the plateau load, which can be used to determine the plateau stress of the h-PXCM, can be deduced. To formulate this expression, consideration was given to the moments that act on each of the ligaments due to the axial loads imposed on them. For the purposes of the analyses conducted here, the moments applied to each of the cylindrical shell ligaments, are all assumed to be equivalent. Any rotations observed in the cylindrical supports are a consequence of the moments applied to them by the ligaments. These moments also contribute to the bending that occurs in the ligaments. To fully understand the bending behavior of the cylindrical shell ligaments, the relationship between the moment M applied to the end edges of a cylindrical shell ligaments and the applied angle $\phi_a$ was analyzed. Note that $\phi_a$ is the angle between the x-axis and the axis running along the ligament's length. For our analysis, we chose to use the same sign convention introduced in for the moments and angles applied to a cylindrical shell ligament. A negative moment and applied angle induces no snap-through in the ligament whereas a positive moment and applied angle will induce a snap-through instability in the ligament (FIG. 21F). For the purpose of calculating the plateau load, the positive steady state moment, which has been previously developed in and, is considered. Here, the plateau load of the ligaments is felt by the unit cell after each of the ligaments exhibit snap-through. The positive steady state moment has the following form:

$$M^*_+=(1+v)D\theta \quad (21)$$

Where D is a variable representing the following:

$$D = \frac{Et^3}{12(1-v^2)} \quad (22)$$

In Eqn 22, E is the elastic modulus and v is the poissons ratio of the ligament base material (steel). The plateau forces corresponding to the positive steady state moment can be obtained with the positive steady state moment (Eqn 21) of the cylindrical shell ligament. Thus, the axial load applied to each of the ligaments individually post bending is given as the following according to:

$$P_{plat} = \frac{M^*_+}{[(L/2) - \phi_a R]\sin((\phi)_a) + R(1 - \cos(\phi_a))} \quad (23)$$

Thus, the total plateau load of the h-PXCM unit cell was formulated using the general expression for the load felt by the unit cell given in Eqn 16. Here $F_{lig}$ in Eqn 17 was replaced with Eqn 23.

$$F_{plat}=P_{plat}(-\cos(\beta+\theta')+\cos(60°-\beta°\theta')+\sin(\beta-30°+\theta')) \quad (24)$$

To obtain more accurate expressions for the peak load and the plateau load, more work is required to understand how the h-PXCM rotates as a global compressive load is applied in addition to an analysis of the system which considers the beams to bend individually and not simultaneously.

Analysis

Figure 25A:
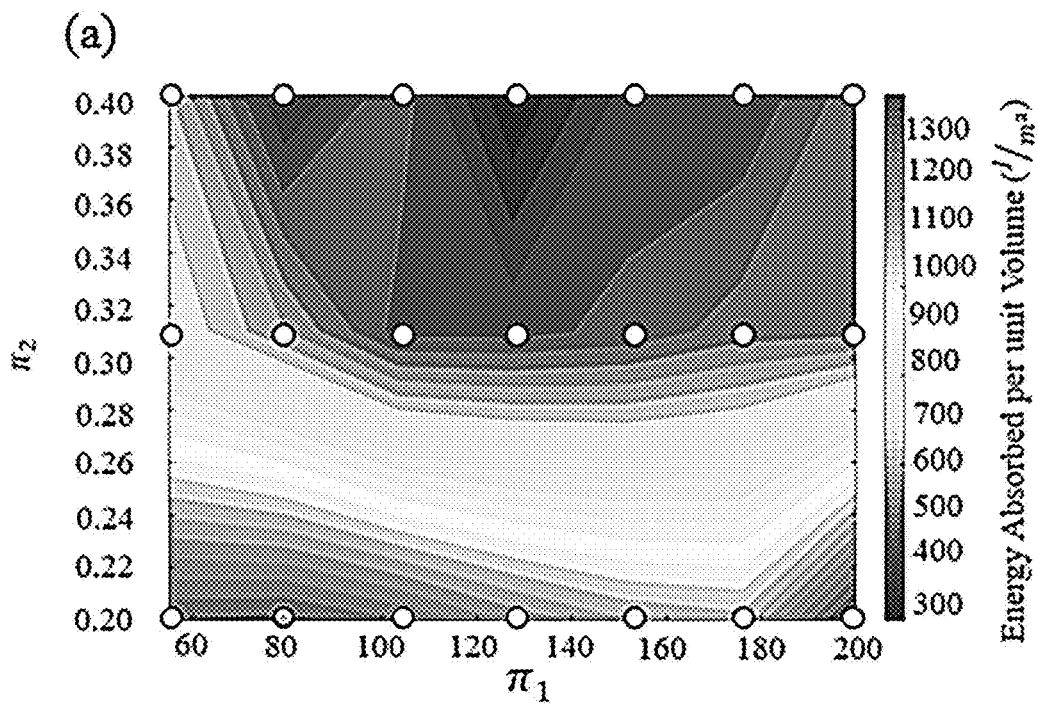
FIG. 25A graphically illustrates the $\pi_1/\pi_2$ h-PXCM design space.
Figure 25B:
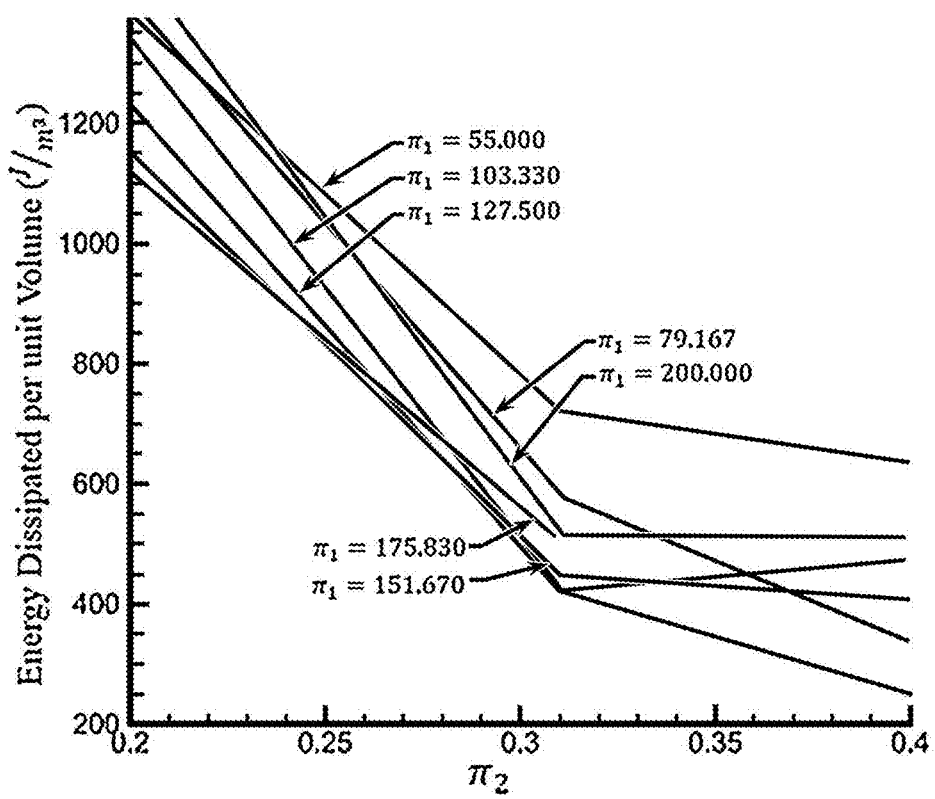
FIG. 25B graphically illustrates the energy dissipated per unit volume for h-PXCM.
Figure 25C:
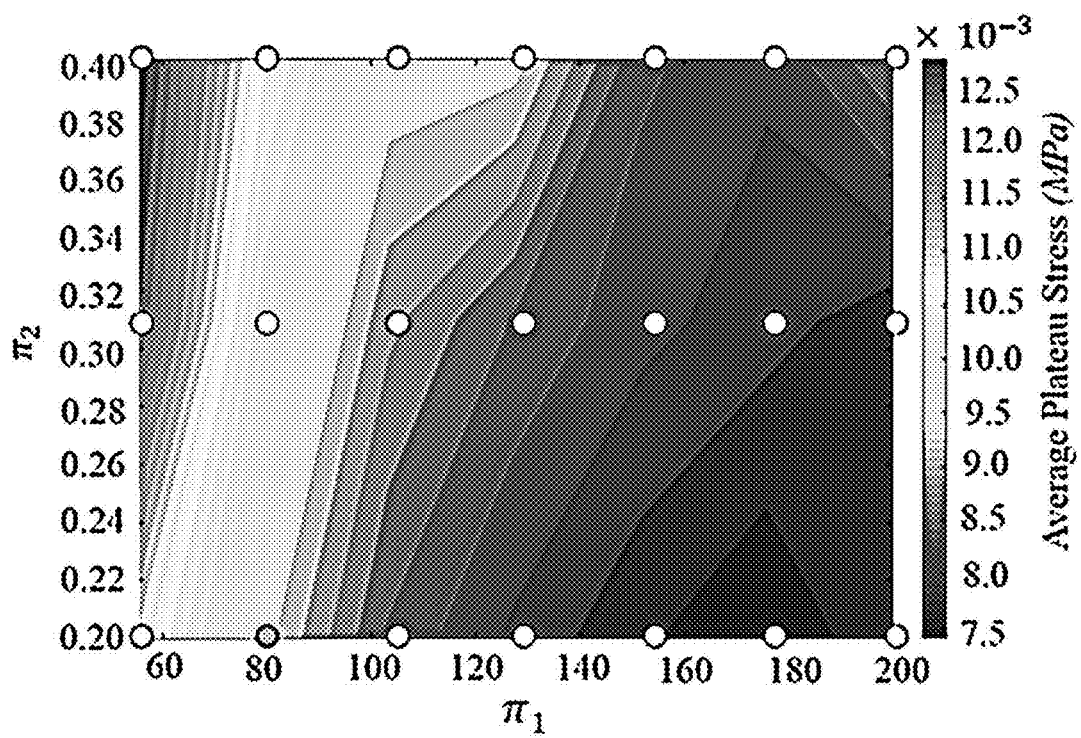
FIG. 25C graphically illustrates the relationship between h-PXCM energy dissipated and $\pi_2$.
Figure 25D:
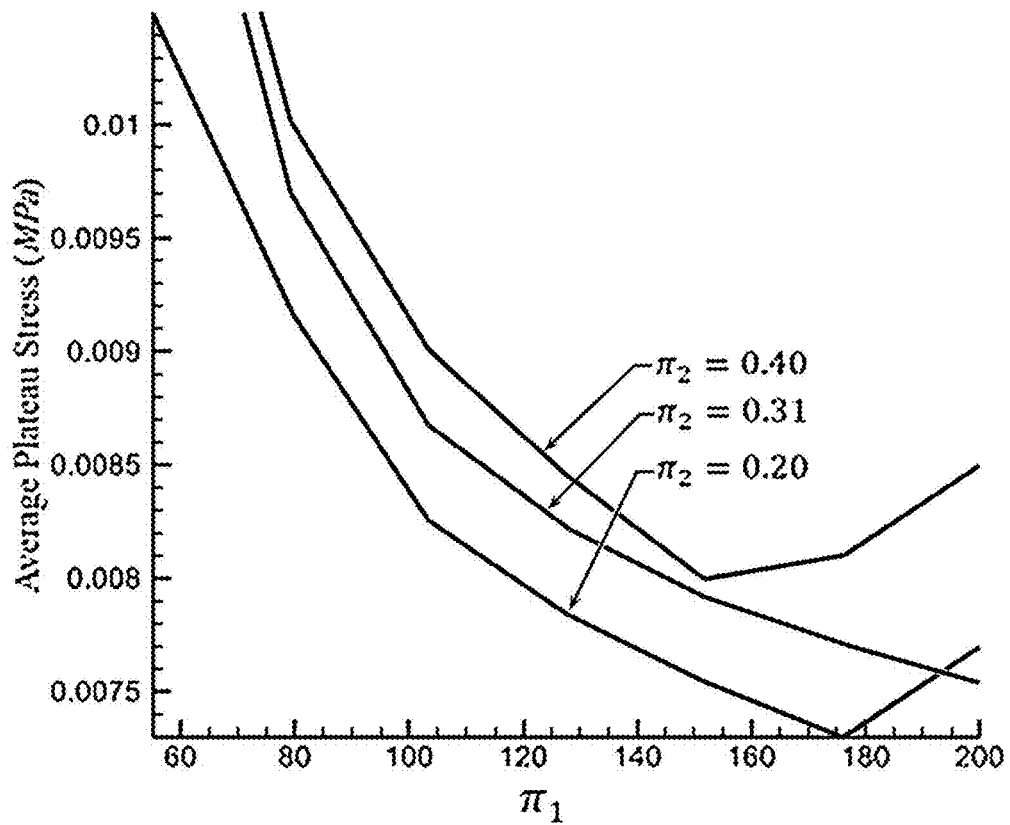
FIG. 25D is a contour plot of average plateau stress of the chiral PXCM as a function of $\pi_1$.

The design space chosen for the parametric analysis was contoured with the energy dissipated per unit volume and the average plateau stresses extracted from each of the simulations and can be observed below in FIGS. 25A, 25C. Each of the points on the contour plots represents an unit cell FE model that was used in the analysis. The green point represents the FE model shown in FIG. 1b. From the contour plots, it was observed that in the case that the curvature is held static and the mass is changed, the slenderness ratio, $\pi_1$ controlled the plateau load that is experienced by the unit cell and the ratio of circular support, $\pi_2$ controlled the energy dissipated by the unit cell (FIGS. 25B, 25D). The plots shown in FIGS. 25B, 25D show how the average plateau stress as well as the energy dissipated per unit volume are affected by $\pi_1$ and $\pi_2$ respectively.

Figure 26A:
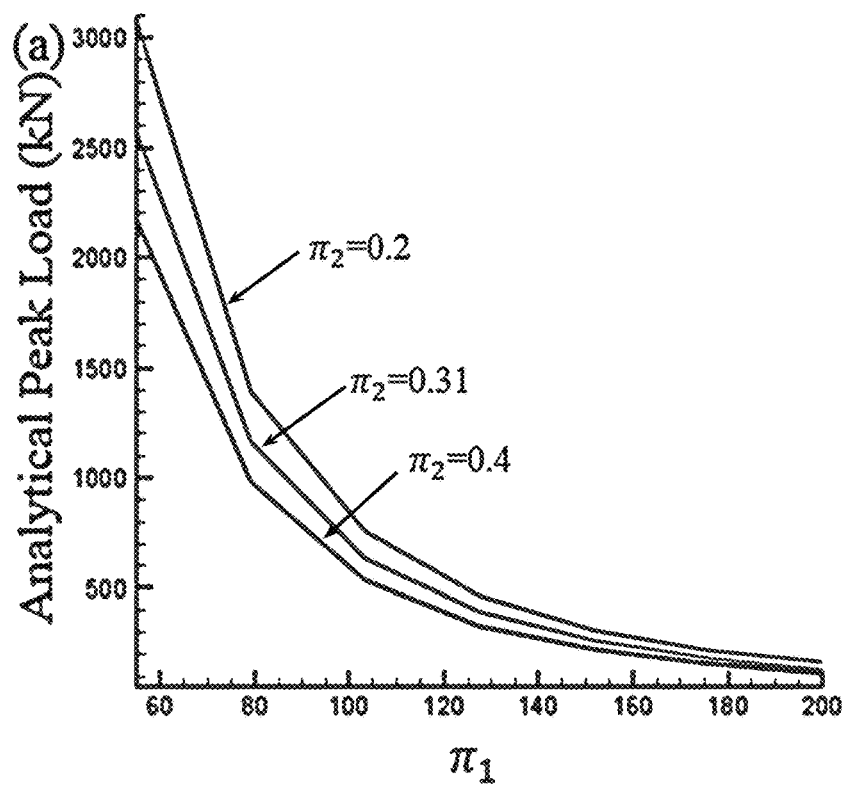
FIGS. 26A-D plot analytical peak load, simulated peak load, analytical plateau load, and simulated plateau load, respectively, as functions of $\pi_1$.
Figure 26B:
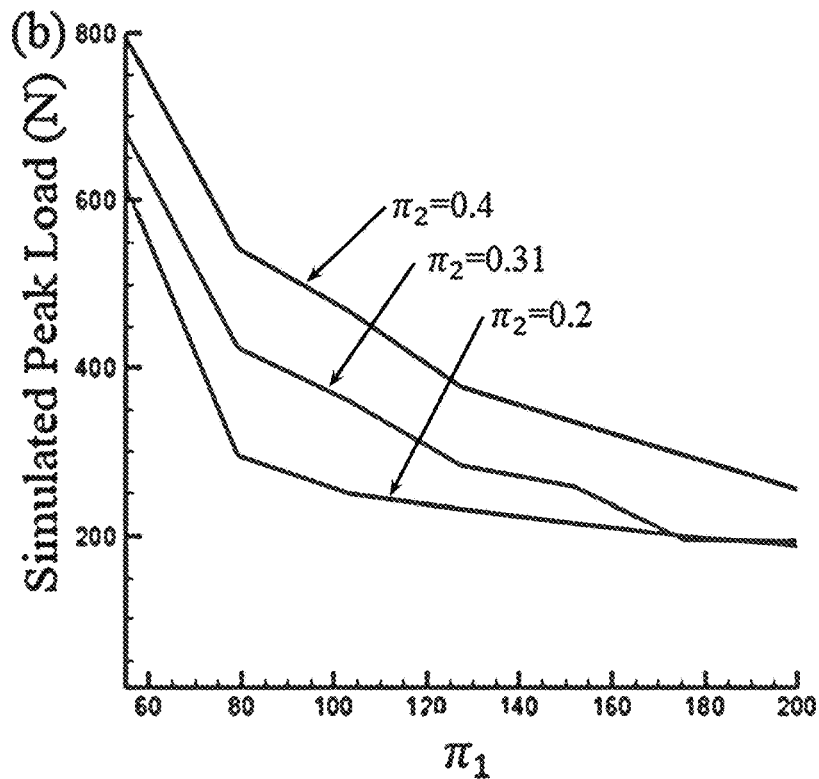
Figure 26C:
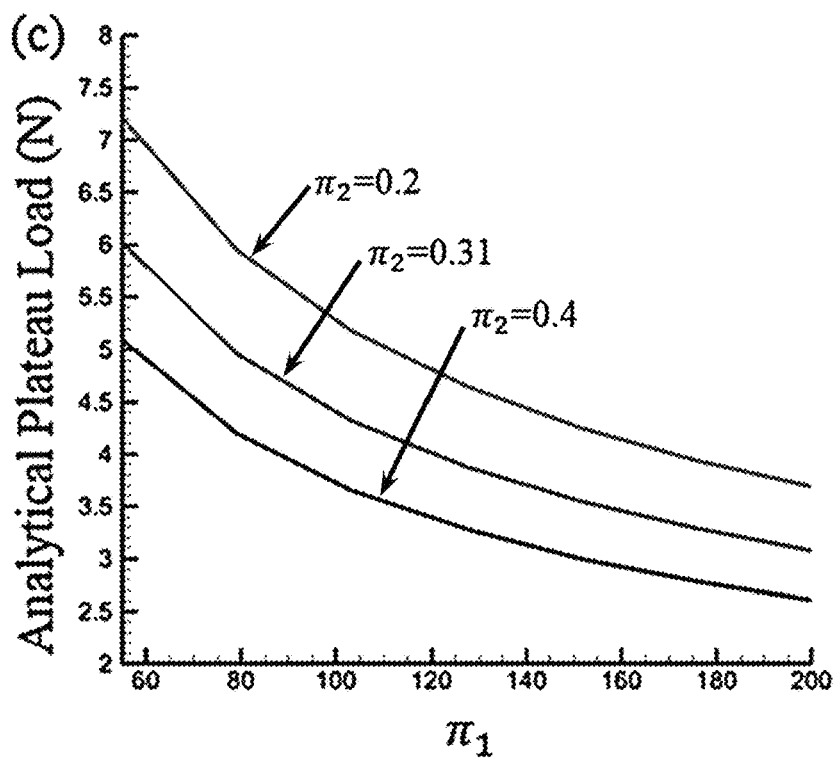
Figure 26D:
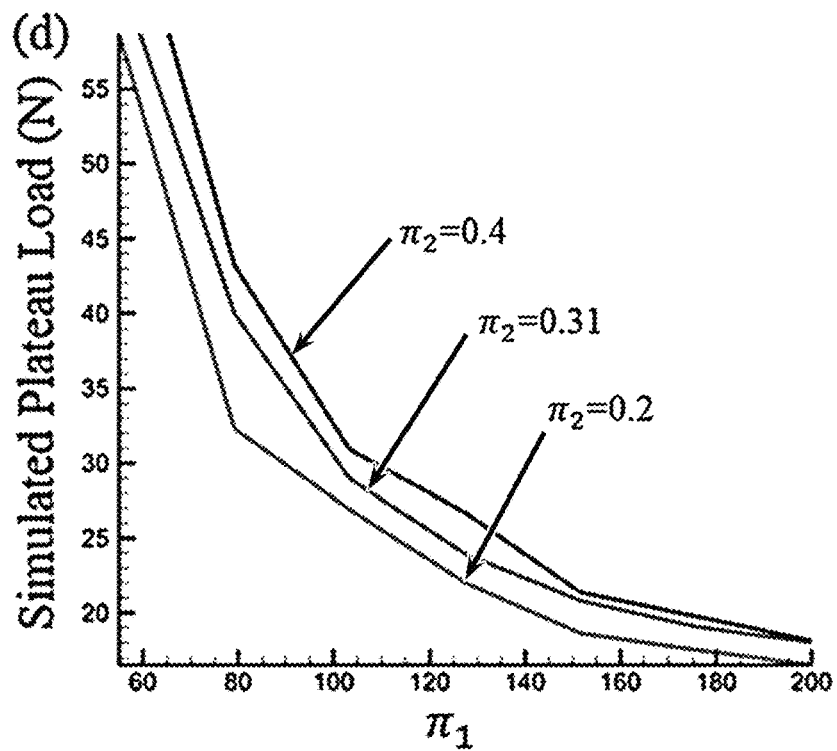

The analytical equations derived in the previous section represent our expectations of the behavior of the h-PXCM in the scenario that both assumptions 1 and 2 are satisfied. FIGS. 26A, 26C display how the analytical equations (Eqns 19,23) predict the peak and plateau loads to be exhibited by an h-PXCM unit cell for a particular design based on the values of the dimensionless parameters $\pi_1$ and $\pi_2$. The values predicted by the analytical equations are compared with the results obtained from the unit cell parametric analysis (FIGS. 26B, 26D). The analytical equation for the peak load ($F_{crit}$) predicted a decreasing trend in the peak load required to induce snap-through as a function of $\pi_1$ similar to the peak load results obtained from the parametric analysis (FIG. 26D). A similar trend was found to be true in comparing the predictions of the analytical equation for the plateau load against the results from the parametric analysis. Note that the equation we use for the plateau load does not consider the rotations applied to the cylindrical supports upon loading and that we used the same angles for the peak load equation. Additionally, the equations developed and utilized for this analysis were not equipped to handle systems in which the ligaments bend at different times. This is why the peak loads estimated by the Eqn. 19 are so much larger than those from the parametric analysis (FIGS. 26A-26B).

Figure 27:
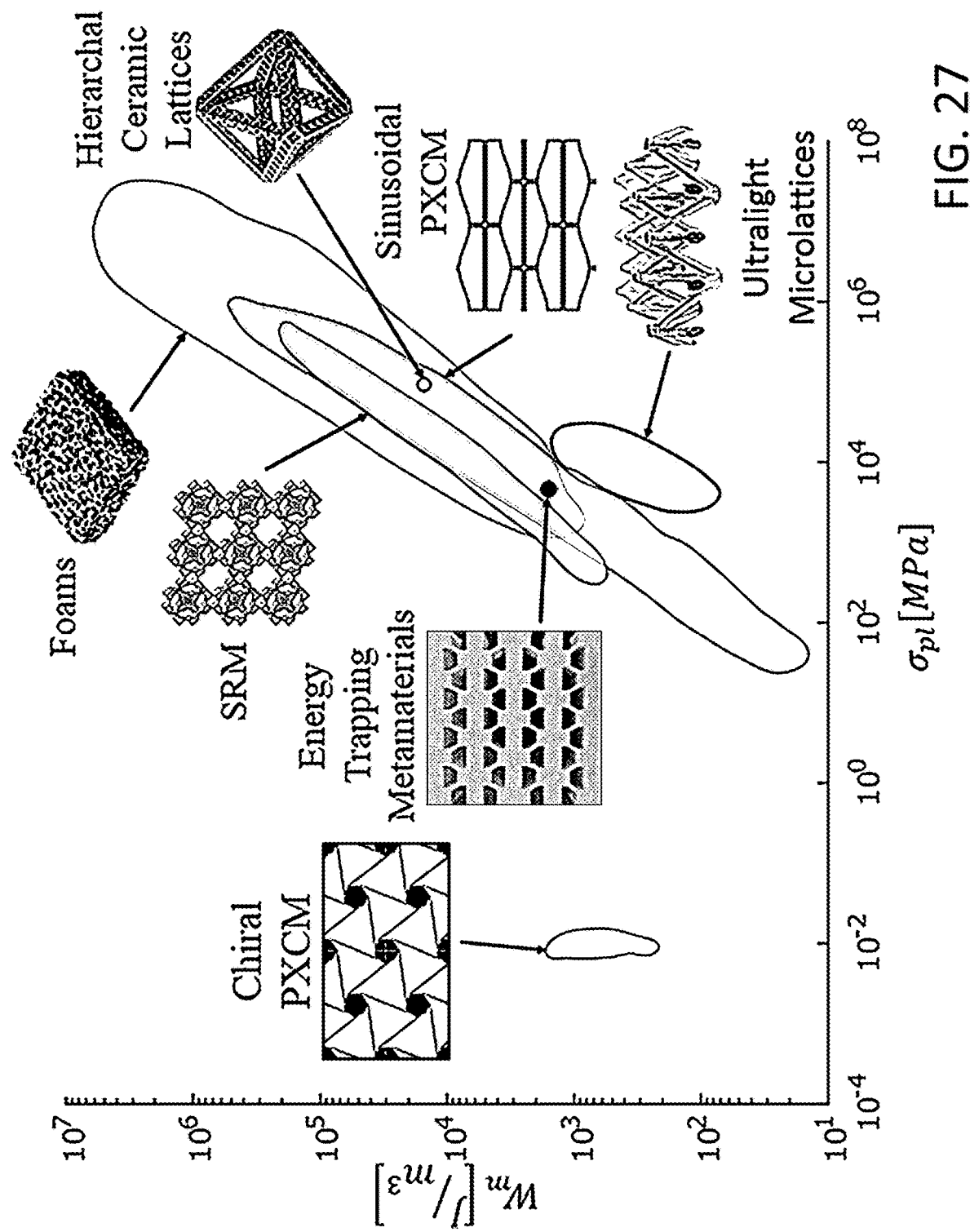
FIG. 27 graphically and schematically illustrates the space defined as applied load σ vs. work for several different PXCM configurations.

The energy dissipated per unit volume was plotted against the average plateau stress for each h-PXCM unit cell FE model on an Ashby Plot. The region housed by the h-PXCM, and regions occupied by other cellular materials, are compared and shown below in FIG. 27. Note that only one material was used to model the cylindrical shells and the cylindrical supports. If more than one material had been used to model the h-PXCM unit cell, we expect that the distribution of points on the Ashby plot would have been broader. Note that the h-PXCM unit cell modeled with steel cylindrical shell ligaments and rigid cylindrical supports was able to dissipate relatively large amounts of energy for relatively low plateau stresses as compared to other materials such as the sinusoidal PXCM and the microlattices. The region of the Ashby plot occupied by the h-PXCM suggests that the material could prove beneficial for a myriad of biomedical applications as diverse as shoe supports that enhance comfort and protect against back pain. Other applications include countermeasures that protect against pedestrian cranial injuries in vehicles, and headgear for bicyclists, those who play contact sports, and the military.

We introduced the hexachiral phase-transforming cellular material (h-PXCM) that utilizes the snap-through instabilities of elastically deforming cylindrical shell ligaments to dissipate energy for any in-plane loading direction without any dependence on size effects under quasi-static conditions. The h-PXCM can be designed with the use of two dimensionless parameters, the slenderness ratio and the ratio of circular support, $\pi_1$ and $\pi_2$ respectively. The parametric analysis of the h-PXCM unit cell, which held the curvature of the ligaments constant and changed the mass of the system, revealed the following about the dimensionless parameters: (1) the slenderness ratio, $\pi_1$ controlled the average plateau load of the unit cell model and (2) the ratio of circular support, $\pi_2$ controlled the energy dissipated by the unit cell model. Additionally, the parametric analysis revealed that an h-PXCM made of steel cylindrical ligaments and rigid circular supports, will exhibit relatively high energy dissipation for a relatively low plateau stress as compared to other architectured materials, occupying an unfilled position on the Ashby Plot.

Equations for the peak and plateau loads were developed from a free body diagram of the h-PXCM unit cell system while considering the following two assumptions: (1) That each cylindrical shell in the h-PXCM unit cell is assumed to bend due to compressive loads applied along the axis to the ligament length before the moments take effect and (2) that bending occurs simultaneously in each of the cylindrical shell ligaments. The equations for the peak and plateau loads were observed to predict similar trends compared to the results obtained from the unit cell FE models. An extension of PXCM's with three dimensional structures will be relegated to future work.

Figure 28B:
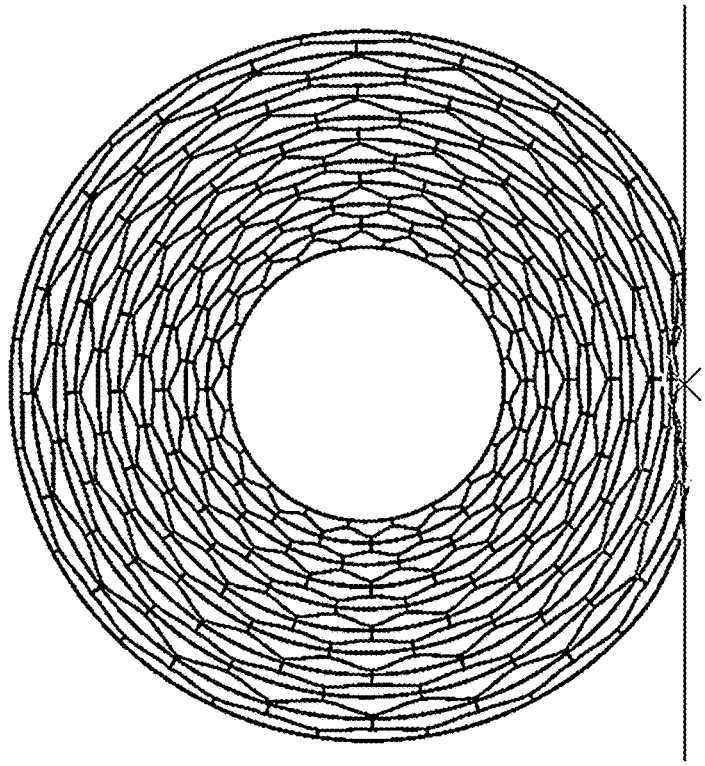
FIG. 28B schematically illustrates a tire made of adjacently-disposed curved PXCM chains.
Figure 28A:
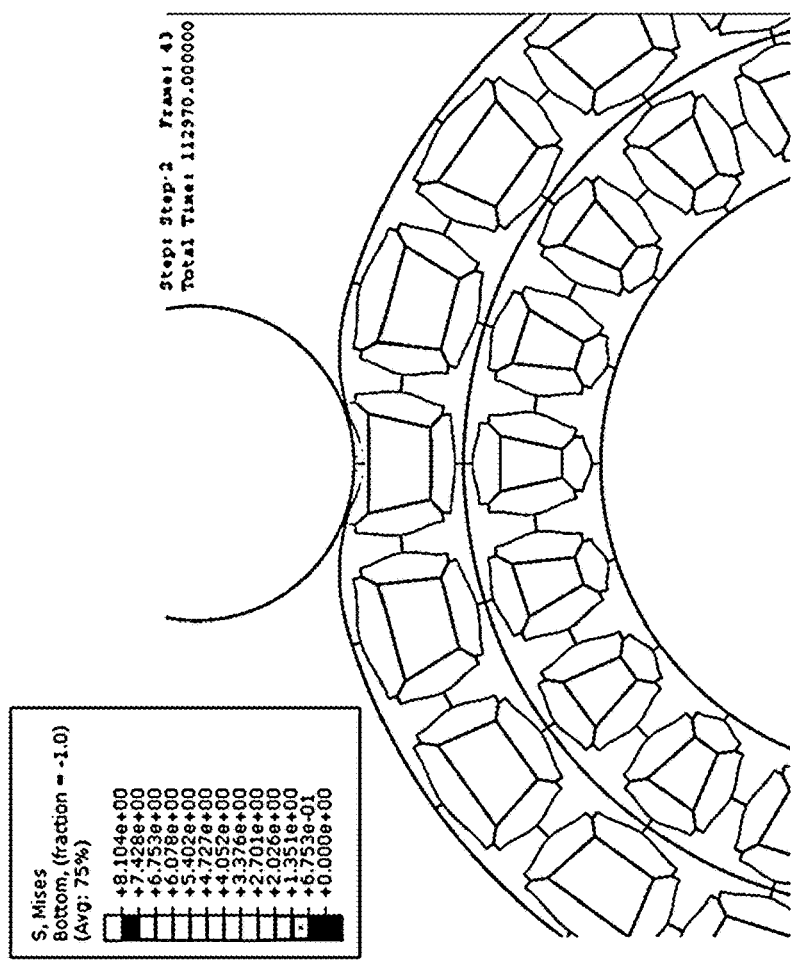
FIG. 28A schematically illustrates two adjacently-disposed curved PXCM chains.

One embodiment of the present novel technology is illustrate(in FIG. 28A-28B, an automobile or vehicle tire made of concentrically layered bands or strips of bistable cells. cells are operationally connected to define belts or layers, and the layers are operationally connected in a concentric orientation to define tires.

Figure 29:
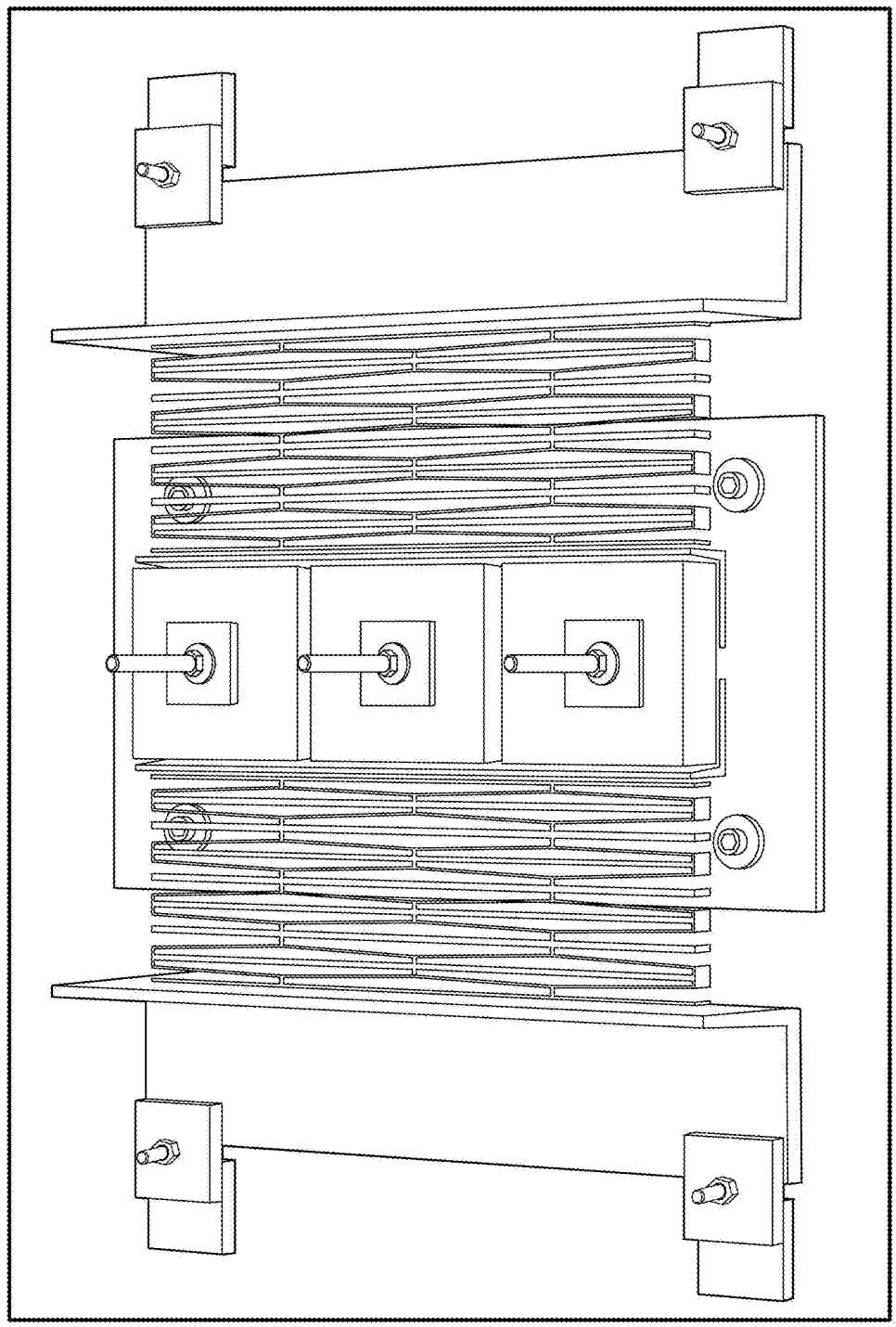
FIG. 29 is a perspective view of an earthquake-resistant plate incorporating PXCMs.

FIG. 29 illustrates another embodiment of the present novel technology, a plurality of bistable cells configured to define an energy absorbing and redistributing 'earthquake resistant' structural member.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A bistable multicellular body, comprising:
   a first phase transforming cell; and
   a second phase transforming cell operationally connected to the first phase transforming cell;
   wherein each phase transforming cell includes a rigid portion and a flexible portion having a lower stiffness than the rigid portion;
   wherein each respective phase transforming cell is configurable to a first phase defined as a first stable geometry;
   wherein each respective phase transforming cell is configurable to a second phase defined as a second, different, stable geometry;
   wherein a forward phase transformation from the first phase to the second phase occurs in response to a temperature change.

2. The multicellular body of claim 1 wherein the rigid portion is a pair of parallel rigid walls and the flexible portion is a pair of parallel, curved beams extending between the pair of rigid walls.

3. The multicellular body of claim 2 and further comprising a rigid support wall extending between each pair of parallel curved beams.

4. The multicellular body of claim 1 wherein a reverse phase transformation from the second phase to the first phase occurs in response to a thermal stimulus.

5. The multicellular body of claim 4 wherein the thermal stimulus is an increase of thermal energy in the body.

6. The multicellular body of claim 4 wherein the body is bistable at a first lower temperature and metastable at a second, higher temperature.

7. The multicellular body of claim 1 wherein the multicellular body further comprises a plurality of phase transforming cells configured as a vehicle tire.

8. The multicellular body of claim 1 wherein the multicellular body further comprises a plurality of phase transforming cells configured as an earthquake-resistant building member.

9. The multicellular body of claim 1 and further comprising:
   a plurality of phase transforming cells operationally connected to define a hexagonal pattern; and
   a plurality of cylindrical shell ligaments, each respective ligament operationally connected to two phase transforming cells;
   wherein each respective phase transforming cell exhibits hexagonal symmetry; and wherein each respective phase transforming cell connects to six respective cylindrical shell ligaments.

10. The multicellular body of claim 1 wherein each respective phase transforming cell is characterized by two regimes displaying positive stiffness and one regime displaying negative stiffness.

11. A phase transformational cellular material, comprising:
a plurality of bistable cells, each respective bistable cell operationally connected to at least one other respective bistable cell;
wherein the plurality of bistable cells is piezoresponsive;
wherein each bistable cell enjoys a first stable phase and a second stable phase;
wherein the first stable phase is a first geometric configuration;
wherein the second stable phase is a second geometric configuration different from the first geometric configuration;
wherein a thermal energy transaction is required to shift each respective cell between the second stable phases and the first stable phase.

12. The phase transformational cellular material of claim 11, wherein the plurality of bistable cells is configured into an automobile tire.

13. The phase transformational cellular material of claim 12, and further comprising a rubber shell encapsulating the plurality of bistable cells.

14. The phase transformational cellular material of claim 12, wherein the plurality of bistable cells have a square 2D cross-sectional shape.

15. The phase transformational cellular material of claim 11, wherein the plurality of bistable cells enjoys alternating regions of marked wave propagation and wave attenuation; and
wherein wave propagation through the plurality of bistable cells has favored directionality.

16. The phase transformational cellular material of claim 11, wherein the plurality of bistable cells are hydrophobic when in the first stable phase; and wherein the plurality of bistable cells are hydrophobic when in the second stable phase.

17. The phase transformational cellular material of claim 11, wherein a mechanical force is required to shift the plurality of bistable cells from the first stable phase to the second stable phase.

18. The phase transformational cellular material of claim 11 wherein the plurality of bistable cells are configured as an earthquake-resistant structural member.

19. The phase transformational cellular material of claim 11 wherein a thermal energy transaction is required to shift from the first to the second phase.

20. A phase transformational cellular material, comprising:
a plurality of bistable cells, each respective bistable cell operationally connected to at least one other respective bistable cell;
wherein each bistable cell enjoys a first stable phase and a second stable phase;
wherein the first stable phase is a first geometric configuration;
wherein the second stable phase is a second geometric configuration different from the first geometric configuration;
wherein a thermal energy transaction is required to shift each respective cell between the second stable phases and the first stable phase;
wherein the plurality of bistable cells are operationally connected to define a hexagonal pattern;
wherein each respective bistable cell enjoys a hexagonal symmetry;
wherein the phase transformational cellular material further comprises a plurality of cylindrical shell ligaments, each respective ligament operationally connected to two bistable cells; and
wherein each respective bistable cell connects to six respective cylindrical shell ligaments.

21. The phase transformational cellular material of claim 20 wherein each respective bistable cell is characterized by two regimes displaying positive stiffness and one regime displaying negative stiffness.

* * * * *